(12) United States Patent
Ruijter et al.

(10) Patent No.: US 12,472,166 B2
(45) Date of Patent: Nov. 18, 2025

(54) INHIBITION OF MYCOBACTERIAL TYPE VII SECRETION

(71) Applicants: Stichting VUmc, Amsterdam (NL); Stichting VU, Amsterdam (NL)

(72) Inventors: Eelco Ruijter, Amsterdam (NL); Mark Karsten Rong, Amsterdam (NL); Alexander Speer, Amsterdam (NL); Wilhelmus Bitter, Amsterdam (NL); Stewart Thomas Cole, Amsterdam (NL)

(73) Assignee: Stichting VUmc, Amsterdam (NL)

( * ) Notice: Subject to any disclaimer, the term of this patent is extended or adjusted under 35 U.S.C. 154(b) by 848 days.

(21) Appl. No.: 17/638,086

(22) PCT Filed: Aug. 26, 2020

(86) PCT No.: PCT/NL2020/050527
§ 371 (c)(1),
(2) Date: Feb. 24, 2022

(87) PCT Pub. No.: WO2021/040519
PCT Pub. Date: Mar. 4, 2021

(65) Prior Publication Data
US 2022/0280487 A1    Sep. 8, 2022

(30) Foreign Application Priority Data

Aug. 26, 2019  (EP) .................................... 19193612

(51) Int. Cl.
*A61K 31/433* (2006.01)
*A61P 31/06* (2006.01)
(52) U.S. Cl.
CPC ............ *A61K 31/433* (2013.01); *A61P 31/06* (2018.01)
(58) Field of Classification Search
CPC .................................................. A61K 31/433
See application file for complete search history.

(56) References Cited

U.S. PATENT DOCUMENTS

2016/0031870 A1   2/2016  Lewis et al.

FOREIGN PATENT DOCUMENTS

| EP | 1939181 A1 | 7/2008 |
| EP | 1389616 B1 | 7/2011 |
| EP | 1801108 B1 | 11/2012 |
| GB | 1328964 A | 9/1973 |
| WO | 2004037817 A1 | 5/2004 |
| WO | 2004060362 A2 | 7/2004 |
| WO | 2013074059 A3 | 5/2013 |
| WO | 2014159938 A1 | 10/2014 |
| WO | 2014161516 A1 | 10/2014 |

OTHER PUBLICATIONS

Pattan, S. R., et al. "Synthesis and Microbiological Evaluation of 2-Acetanilido-4-arylthiazole Derivatives," Indian Journal of Chemistry, vol. 45B, pp. 1929-1932 (Aug. 2006).
Brown, D. J., et al. "Unfused Heterobicycles as Amplifiers of Phleomycin. I. Some Pyridinyl-and Pyrazolyl-Pyrimidines, Bithiazoles and Thiazolylpyridines," Australian Journal of Chemistry, vol. 33, No. 10, pp. 2291-2298 (1980).
Dai, Weiyang, et al. "Structure-Based Design of N-(5-Phenylthiazol-2-yl) Acrylamides as Novel and Potent Glutathione S-transferase Omega 1 Inhibitors," Journal of Medicinal Chemistry, vol. 62, No. 6, pp. 3068-3087 (2019).

(Continued)

*Primary Examiner* — Golam M Shameem
(74) *Attorney, Agent, or Firm* — Hoffmann & Baron LLP

(57) ABSTRACT

The invention relates to compounds and pharmaceutically acceptable salts thereof, and to their medical use. Exemplary medical uses are the prevention and treatment of a bacterial infection, for example, a mycobacterial infection, such as a *Mycobacterium tuberculosis* infection, e.g., in a respiratory system and/or extrapulmonic. The invention further relates to a use of such compounds, pharmaceutically acceptable salts thereof or prodrugs of the compounds as chemotherapeutic agents. Also, the invention relates to a use of such compounds, pharmaceutically acceptable salts thereof or prodrugs of the compounds for inhibiting mycobacterial type VII secretion.

The compounds have the following formula

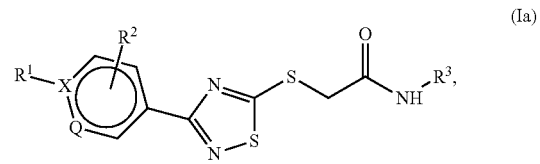

(Ia)

wherein

Q and X are, respectively, CH and C, $CR^2$ and C, CH and N, $CR^2$ and N, or N and C;

$R^1$ is hydrogen, halide or optionally substituted linear or branched alkoxy having 1 or 2 carbon atoms;

$R^2$ is independently selected from hydrogen, halide or optionally substituted linear or branched alkoxy having 1 or 2 carbon atoms, and $R^3$ is optionally substituted linear or branched alkoxy having 1-6 carbon atoms, haloalkyl having 1-6 carbon atoms, n-propyl, 2-propenyl, 2-propynyl, or n-pentyl, or a pharmaceutically acceptable salt of the compound, for use in the prevention or treatment of a bacterial infection.

13 Claims, 5 Drawing Sheets

(56) References Cited

OTHER PUBLICATIONS

Maddry, Joseph A., et al. "Antituberculosis Activity of the Molecular Libraries Screening Center Network Library," Tuberculosis, vol. 89, No. 5, pp. 354-363 (2009).
Schmeyers, Jens, et al., "Heterocycles by Cascade Reactions of Versatile Thioureido-Acetamides," Tetrahedron, vol. 58 Issue 36, pp. 7241-7250 (2002).
Yurugi, Shojiro, et al. "Studies on the Syntheses of N-Heterocyclic Compounds. III. Hypocholesterolemic 1, 2, 4-Oxadiazole Derivatives (1)," Chemical and Pharmaceutical Bulletin, vol. 21, No. 8, pp. 1641-1650 (1973).

| | Compound I-12 MIC₉₀ (μM) |
|---|---|
| Gram negative | |
| E. coli GSK12 | >80 |
| Gram positive | |
| B. subtilis | >80 |
| Mycobacterium / slow growing | |
| M. avium | >80 |
| M. bovis BCG | 10 |
| M. interjectum | >80 |
| M. kansasii | 20 |
| M. marinum | 40 |
| M. tuberculosis H37Rv | 1.25 |
| Mycobacterium / fast growing | |
| M. abscessus | >80 |
| M. chelonae | >80 |
| M. fortuitum | >80 |
| M. holsaticum | >80 |
| M. phlei | >80 |
| M. smegmatis | >80 |
| M. szulgai | >80 |
| M. triviale | >80 |
| M. vaccae | >80 |

INHIBITION OF MYCOBACTERIAL TYPE VII SECRETION

This application is the national stage filing of International Application Number PCT/NL2020/050527, filed on Aug. 26, 2020, which claims priority to Application No. EP 19193612.9, filed on Aug. 26, 2019, each of which is incorporated by reference herein in its entirety.

BACKGROUND OF THE INVENTION

*Mycobacterium tuberculosis* (*M. tuberculosis*) is the causative agent of tuberculosis (TB) and estimated to be responsible for the death of 1.5 million people each year, while more than 1 billion people are latently infected and have a high risk of developing active tuberculosis during their life time. These daunting figures from the World Health Organization seem to conflict with the fact that tuberculosis can be cured with antibiotics. The problem is that, in the last decades, there has been a steady rise in the number of tuberculosis cases with multi-drug-resistant tuberculosis (MDR-TB) and extensively drug resistant tuberculosis (XDR-TB). In recent years, even total drug-resistant tuberculosis (TDR-TB) strains have emerged. Therefore, the discovery and development of novel drugs against mycobacteria is a major priority.

An important part of the antibiotic persistence problem of tuberculosis is that *M. tuberculosis* is protected from harmful compounds by an unusual and highly impermeable cell envelope. To secrete proteins across this cell envelope, mycobacteria use specialized secretion systems known as type VII secretion (T7S) systems. These secretion systems are present in up to five variants in the genome of virulent mycobacteria, namely ESX-1 through ESX-5. They are relevant for survival by modulating the host's immune response and facilitating nutrient uptake.

Various attempts have been made to design compounds for use in treating tuberculosis.

US-A-2016/0 031 870 describes in particular substituted oxadiazoles, the synthesis thereof, and methods for treating tuberculosis by administering the oxadiazole s.

US-A-2017/0 305 895 describes substituted thiazoles, in particular substituted aminothiazoles, the synthesis thereof, and methods for treating tuberculosis with the substituted aminothiazoles.

WO-A-2014/159 938 describes a range of heteromulticyclic species, in particular substituted quinoline derivatives. The compounds act as boosters for increasing the efficiency and/or fidelity of transfection or transduction of eukaryotic cells with foreign DNA.

Maddry et al., *Tuberculosis* 2009, 89(5), 354-363 is concerned with a molecular library screening center for the development of antitubercular agents. Based on cytotoxicity, a thiophene-like compound, an azepane-like compound, a triazine-like compound, and a thiazolidinone-like compound, are held to be of most interest in respect of antituberculosis activity.

SUMMARY OF THE INVENTION

The invention relates to compounds, pharmaceutically acceptable salts thereof, and prodrugs thereof, and to their medical use. Exemplary medical uses are the prevention and treatment of a bacterial infection, for example, a mycobacterial infection, such as a *Mycobacterium tuberculosis* infection, e.g., in a respiratory system and/or extrapulmonic. The invention further relates to a use of such compounds, pharmaceutically acceptable salts, and prodrugs, as chemotherapeutic agents. Also, the invention relates to a use of such compounds, pharmaceutically acceptable salts, and prodrugs, for inhibiting mycobacterial type VII secretion.

In one aspect the invention relates to the use of compounds or pharmaceutically acceptable salts thereof, according to the invention in medical applications, such as the treatment of bacterial infections, in particular by affecting the growth of mycobacteria by inhibiting the type VII secretion, especially ESX-1 and/or ESX-5 dependent secretion.

BRIEF DESCRIPTION OF THE DRAWINGS

FIG. 5A is a graph showing dose response analysis of M. marinum WT strain expressing either LipY or LipY and aspA in presence of compound I-12. Lipase activity (DGGR) and bacterial viability (REMA) were determined. Data points show average and standard deviation of triplicates.

FIG. 5B is a secretion analysis in dose response of M. marinum WT expressing mspA.

DETAILED DESCRIPTION OF THE PRESENT INVENTION

Figure 1:
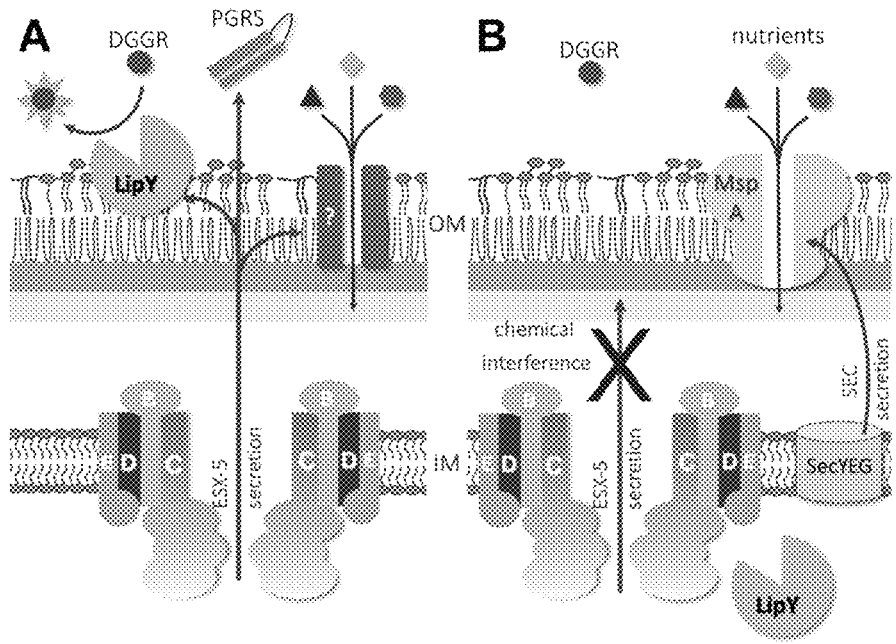
FIG. 1A is a schematic showing that lipase LipY is a substrate of ESX-5, and is transported on the bacterial surface.
FIG. 1B is a schematic showing that screening strain (M, marinum WT (wild-type)+LipY+mspA) overexpresses mspA, which is translocated into the outer membrane in an ESX5-independent manner, and rescues the essentiality of ESX-5 by facilitation of nutrient uptake.

It is an objective of the invention to provide a compound or a pharmaceutically acceptable salt thereof that is suitable for use in medical applications, in particular with respect to inhibiting the growth of mycobacteria, such as M. tuberculosis.

The inventors found that one or more of these objectives can, at least in part, be met by providing the compounds and pharmaceutical acceptable salts thereof, as described herein.

Accordingly, in a first aspect of the invention there is provided a compound of formula (Ia), wherein the formula is

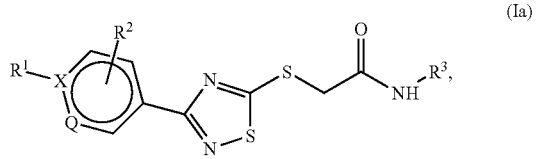

wherein
Q and X are, respectively, CH and C, $CR^2$ and C, CH and N, $CR^2$ and N, or N and C;
$R^1$ is hydrogen, halide or optionally substituted linear or branched alkoxy having 1 or 2 carbon atoms;
$R^2$ is independently selected from hydrogen, halide or optionally substituted linear or branched alkoxy having 1 or 2 carbon atoms, and $R^3$ is optionally substituted linear or branched alkoxy having 1 or 2 carbon atoms, haloalkyl having 1-6 carbon atoms, n-propyl, 2-propenyl, 2-propynyl, or n-pentyl,
or a pharmaceutically acceptable salt of the compound, for use in the prevention or treatment of a bacterial infection.

In a further aspect of the invention, there is provided the compound of formula (Ia), or a pharmaceutically acceptable salt thereof, as described herein, wherein the compound, or the pharmaceutically acceptable salt, is administered to substantially inhibit type VII secretion of a bacterium, for example, the type VII secretion of a mycobacterium, especially ESX-5 and/or ESX-1 dependent secretion.

In yet a further aspect of the invention, there is provided the use of the compound of formula (Ia), or a pharmaceutically acceptable salt thereof, as described herein, as a chemotherapeutic agent, preferably as an antimycobacterial chemotherapeutic agent.

In yet a further aspect of the invention, there is provided the compound of formula (Ia), or a pharmaceutically acceptable salt thereof, as described herein, for use in the inhibition of mycobacterial type VII secretion, especially ESX-5 and/or ESX-1 dependent secretion.

In yet a further aspect of the invention, there is provided the compound of formula (Ia) or a pharmaceutically acceptable salt thereof, as described herein, for use as a medicament.

When referring to a noun (e.g., a compound, a pharmaceutically acceptable salt, a prodrug, etc.) in the singular, the plural is meant to be included, or it follows from the context that it should refer to the singular only.

The term "alkyl" as used herein is meant to include straight (or linear) and branched chain alkyl groups that are saturated (i.e., no double or triple bonds present). The alkyl groups may be substituted. The alkyl groups may have 1-20 carbon atoms. The alkyl groups may comprise one or more heteroatoms. In particular, the alkyl groups have 1-12 carbon atoms, such as 1-8 carbon atoms. Preferably the alkyl groups have 1-6 carbon atoms. The term also encompasses n-alkyl, iso-alkyl (or i-alkyl), tert-alkyl (t-alkyl), neo-alkyl, and ante-iso-alkyl groups. Substituted alkyl groups can be substituted with one or more substituents (e.g., substituents as described herein), such as amino, hydroxyl, cyano, carboxy, nitro, thio, alkoxy and/or halogen groups.

The term "alkenyl" as used herein is meant to include linear and branched chain and (poly)cyclic alkenyl groups having one or more double bonds. The alkenyl groups may be substituted. The alkenyl groups may have 2-20 atoms. The alkenyl groups may comprise one or more heteroatoms. In particular, the alkenyl groups have 2-12 carbon atoms, such as 2-8 carbon atoms. Preferably the alkenyl groups have 2-6 carbon atoms. (Poly)cyclic alkenyl groups having one or more double bonds can have 3-12 ring members, such as 3, 5, 6, or 7. Preferably, (poly)cyclic alkenyl groups have 5, 6, or 7 ring members. The (poly)cyclic alkenyl groups may comprise one or more heteroatoms, such as oxygen, nitrogen, and/or sulfur. In particular, hetero(poly)cyclic alkenyl groups have 2-20 atoms of which 1-10 heteroatoms, such as 2-12 atoms of which 1-6 heteroatoms. Preferably, the hetero(poly)cyclic alkenyl groups have 2-8 atoms of which 1-4 heteroatoms. Examples of cycloalkenyl groups include polycyclic ring structures as described herein having at least one double bond.

The term "alkynyl" as used herein is meant to include linear and branched alkyl groups having one or more triple bonds. The alkynyl groups may be substituted. The alkynyl groups may have 2-20 carbon atoms. The alkynyl groups may comprise one or more heteroatoms. In particular, the alkynyl groups have 2-15 carbon atoms. Preferably, alkynyl groups have 2-10 carbon atoms, such as 2, 3, 4, 5, or 6.

The term "alkoxy" as used herein is meant to include alkyls, cycloalkyls, alkenyls, and alkynyls that are bonded through an oxygen atom. The alkoxy group may be connected with its oxygen atom directly to the compounds described herein or indirect, meaning the alkoxy group is connected via, for example, an alkyl, alkenyl, alkynyl, etc. to the compounds. The alkoxy groups may be substituted. The alkoxy groups may have 1-20 carbon atoms. The alkoxy groups may comprise one or more heteroatoms. In particular, the alkoxy groups have 1-15 carbon atoms, such as 10 or less, or 8 or less. Preferably, alkoxy groups have 1-6 carbon atoms.

The term "aryl" as used herein is meant to include monocyclic, bicyclic and polycyclic (e.g., having 2, 3 or 4 rings that can be fused) aromatic hydrocarbon groups. The aryl groups may be substituted. The aryl groups may comprise one or more heteroatoms. The aryl groups may have 5-20 carbon atoms. In particular, the aryl groups have 5-10 carbon atoms. Preferably, the aryl groups have 5 or 6 carbon atoms. The term "aryl" is also meant to include substituted aromatic hydrocarbons, that can be mono-substituted or substituted more than once, such as 2-, 3-, 4-, 5-, or 6-substituted, or di-substituted.

The term "aryloxy" as used herein is meant to include aryls and heteroaryls that are bonded through an oxygen atom. The aryloxy group may be connected with its oxygen atom directly to the compounds described herein or indirect, meaning the aryloxy group is connected via, for example, an alkyl, alkenyl, alkynyl, etc. to the compounds. The aryloxy groups may be substituted. The aryloxy groups may comprise one or more heteroatoms. The aryloxy groups may have 1-20 atoms. In particular, the aryloxy groups have 1-10 atoms. Preferably, the aryloxy groups have 2-10 carbon atoms, such as 3-8 carbon atoms.

The term "compound", in particular in the case of the compound according to the invention, is meant to include all possible atropisomers, stereoisomers, diastereomers, optical stereoisomers, tautomers, as well as mixtures thereof, including racemic mixtures. Depending on the desired use of the compound, a pure compound, racemic mixture, or mixture having varying isomer ratios may be selected. The term also includes solvates, such as hydrates, as well as anhydrous and non-solvated forms. Also, the term includes all isotopes of atoms occurring in the intermediate compounds and/or (final) compounds (products). The compound may also exist as a solvate, i.e., a compound in a composition with solvent molecules. In that case the composition includes solvent in stoichiometric quantities, such as a monosolvate or a disolvate, or can include solvent in random amounts. In case the solvent is water, the term "solvate" may be read as "hydrate".

The term "cycloalkyl" as used herein is meant to include, partly saturated, and completely saturated non-aromatic cyclic hydrocarbons. The cycloalkyl groups may be substituted. The cycloalkyl groups can have up to 20 ring-forming atoms. In particular, the cycloalkyl groups may predominantly comprise carbon atoms, and optionally contain one or more heteroatoms, such as oxygen, sulfur, and nitrogen as part of the cycle. The cycloalkyl groups can have 3-12 ring members, such as 3, 4, 5, 6 or 7. Cycloalkyls include mono- or polycyclic ring structures, such as fused ring systems, bridged ring systems and spiro ring systems. Cycloalkyl groups also include rings that are substituted with linear or branched chain alkyl groups as defined herein. Examples of substituted cycloalkyl groups can be mono-substituted or substituted more than once, such as 2,2-, 2,3-, 2,4-, 2,5- or 2,6-disubstituted cyclohexyl groups or mono-, di- or tri-substituted polycyclic groups, which can be substituted with, for example, amino, hydroxyl, cyano, carboxy, nitro, thio, alkoxy, and/or halogen groups.

The term "haloalkyl" as used herein is meant to include mono-halo alkyl groups and poly-halo alkyl groups wherein all halo atoms can be the same or different, and per-halo alkyl groups, wherein all hydrogen atoms are replaced by halogen atoms. The haloalkyl groups may be substituted. The haloalkyl groups may comprise one or more heteroatoms.

The term "haloalkoxy" as used herein is meant to include mono-halo alkoxy groups and poly-halo alkoxy groups wherein all halo atoms can be the same or different, and per-halo alkoxy groups, wherein all hydrogen atoms are replaced by halogen atoms. The haloalkoxy groups may be substituted. The haloalkoxy groups may comprise one or more heteroatoms.

The term "heteroatom" as used herein is meant to refer to an atom other than hydrogen or carbon. In particular, the heteroatom is an oxygen atom, sulfur atom, nitrogen atom, phosphorus atom, or boron atom. Preferably, the heteroatom is an oxygen atom, sulfur atom, nitrogen atom, or phosphorus atom. More preferably, the heteroatom is an oxygen atom, sulfur atom, or nitrogen atom.

The term "heteroalkyl" as used herein is meant to include linear or branched chain alkyl groups consisting of a number of carbon atoms and at least one heteroatom selected from the group consisting of oxygen, nitrogen, and sulfur. The heteroalkyl groups may be substituted. In particular, heteroalkyl groups have 1-20 carbon atoms and/or 1-10 heteroatoms, such as 1-12 carbon atoms and/or 1-8 heteroatoms. Preferably, the heteroalkyl groups have 1-8 carbon atoms and/or 1-4 heteroatoms. The nitrogen and sulfur atoms may be optionally oxidized and the nitrogen heteroatom may be optionally quaternized (i.e., four substituents each having a carbon bond to the nitrogen atom, substituted ammonium groups, or salts). The heteroatom may be placed at any position of the heteroalkyl group, including between the rest of the heteroalkyl group and the moiety to which it is attached, as well as attached to a distal carbon atom, such as the most distal one, in the heteroalkyl group.

The term "heteroaryl" as used herein is meant to include aromatic heterocycles having, for example, 20 ring-forming atoms (particularly mostly carbon atoms) and having at least one heteroatom ring member, such as a sulfur atom, an oxygen atom, or a nitrogen atom. The heteroaryl groups may be substituted. The term includes monocyclic and polycyclic (e.g., having 2, 3 or 4 fused rings) systems.

The term "heterocycloalkyl" as used herein is meant to include non-aromatic heterocyclic alkyls that can have up to 20 ring-forming atoms. The heterocycloalkyl groups may be substituted. Exemplary heterocycloalkyl groups are cyclic alkyls, cyclic alkenyls, and cyclic alkynyls having one or more of the ring-forming carbon atoms replaced by a heteroatom, such as oxygen, nitrogen, and/or sulfur atom. Heterocycloalkyls can be mono or polycyclic (e.g., fused, bridged, or spiro) systems. Also included by the term are functional groups that have one or more aromatic rings fused (i.e., having a bond in common) to a non-aromatic heterocyclic ring.

The terms "$IC_{50}$" and "$IC_{90}$" as used herein specifies the inhibitory concentration of a compound(s) and/or composition(s) that results in growth inhibition and/or killing of 50%, or 90%, respectively, of the population of the indicated bacteria treated with the compound(s) or composition(s). In particular, the terms are used herein in combination with a specified assay. The concentration is typically expressed as a micromolar concentration (µM).

The phrase "in need thereof" as used herein is meant to include that a subject has been identified as having a need for the particular method or treatment. The identification of such a need can be by any means of diagnostics. In particular, in any of the methods and treatments described herein, the subject is in need thereof.

The phrase "optionally substituted" as used herein is meant to refer to the optional presence of one or more substituents, such as the substituents as described herein.

The phrase "pharmaceutically acceptable" as used herein is meant to refer to, for example, compounds, materials, compositions, and dosage forms which are, within the scope of the practitioner's medical judgment, suitable for use in contact with tissues of animals, in particular humans. The term may also include the approval by a (governmental) regulatory agency for use in animals, and more in particular for use in humans.

The phrase "pharmaceutically acceptable salt" as used herein is meant to include salts of acidic or basic moieties, in particular those that form non-toxic salts to animal consumption, such as sodium and chloride salts. The term refers to salts which possess toxicity profiles within a range that affords utility in pharmaceutical applications. Pharmaceutically acceptable salts may nonetheless possess properties such as high crystallinity, which have utility in the practice of the invention as described herein, such as for example utility in the process of synthesis, purification or formulation of compounds as described herein. The compounds as described herein, their active pharmaceutical structure (i.e., active pharmaceutical ingredient, or active substance), or pharmaceutically acceptable salts of the compounds as described herein may be characterized by their chemical form, such as polymorphism, e.g., α-phase, β-phase, γ-phase, δ-phase, ε-phase, in particular by polymorphs that are soluble in water. Other chemical forms of the pharmaceutically acceptable salt may be hydrates, solvates, salts, cocrystals, amorphous solid dispersions, etc. The term further includes amorphous, semi-crystalline, and crystalline salts of the compounds as described herein. In particular, in case the compound or pharmaceutically acceptable salt is crystalline, a degree of crystallinity of 55% or more may be desired, such as 65% or more, or 75% or more, as measured with conventional means and techniques, such as x-ray (powder) diffraction. Preferably, the degree of crystallinity of the crystalline compound or pharmaceutically acceptable salt as described herein is 70-100%, such as 98.5% or less, and 80% or more, for example, 85-97.5%.

Compounds that are basic in nature are capable of forming a wide variety of salts with various inorganic and organic acids, such as sulfuric, thiosulfuric, citrate, maleic, acetic, oxalic, hydrochloric, hydrobromic, hydroiodic, nitric, nitrate, sulfate, bisulfate, bisulfite, phosphate, acid phosphate, isonicotinate, borate, acetate, lactate, salicylate, citrate, acid citrate, tartrate, oleate, tannate, pantothenate, bitartrate, ascorbate, succinate, maleate, gentisinate, fumarate, gluconate, glucaronate, saccharate, formate, benzoate, glutamate, methane sulfonate, ethane sulfonate, benzenesulfonate, p-toluenesulfonate, bicarbonate, malonate, mesylate, esylate, napsydisylate, tosylate, besylate, orthophoshate, trifluoroacetate, or pamoate (i.e., 1, 1'-methylene-bis-(2-hydroxy-3-naphthoate)). Compounds that include an amino group may form pharmaceutically acceptable salts with various acids. Compounds that are acidic in nature are capable of forming salts with various pharmacologically acceptable cations, such as alkali metals or alkaline earth metals and, particularly, calcium, magnesium, ammonium, sodium, lithium, zinc, potassium, or iron. Quaternary ammonium salts, substituted ammonium groups, or ammonium salts of the compounds as described herein are also included. Although pharmaceutically unacceptable salts may not be useful as medicaments, such salts may be useful as intermediates in the synthesis of compounds, for example, during purification by crystallization.

The terms "prevention" and "preventing" as used herein are meant to refer to a reduction of the risk of acquiring a particular disease, condition, or disorder.

The term "prodrug" as used herein is meant to include a derivative of a known direct acting drug, which derivative has enhanced delivery characteristics and/or therapeutic value as compared to the drug, and is transformed into the active drug by, for example, one or more enzymatic or chemical processes, in a host or in a pathogen. An example of a prodrug is an ester of a carboxylic acid group, which can be hydrolyzed by endogenous esterase as are found in, for example, the bloodstream of mammals.

The term "room temperature" as used herein is defined as the average indoor temperature to the geographical region where the invention is applied. In general, the room temperature is defined as a temperature of between about 18-25° C.

The term "subject" as used herein is meant to include the human and animal body, and the terms "individual" and "patient". The term "animal" is meant to include humans and nonhumans, such as vertebrates, e.g., wild, domestic, and farm animals. The terms "human", "humanoid" and "nonhuman" as used herein, are meant to include all animals, including humans. The term "individual" is meant to include any human, humanoid or nonhuman (entity). The terms "individual" and "patient" are used interchangeably.

The term "substituent" as used herein is meant to refer to an organic group, such as a heteroatomic organic group, that substitutes at least one atom or one atomic group of another molecule. For example, a hydrogen bond present in a molecule may be replaced by a bond to a non-hydrogen atom which originates from a(n) (indicated) substituent. Exemplary bonds to a non-hydrogen atom include bonds to a halogen atom, a carbon atom or an oxygen atom. These can be include or further include groups such as hydroxyl groups, alkoxy groups, aryloxy groups, arylalkoxy groups, oxo(carbonyl) groups, carboxyl groups, such as carboxylic acids, carboxylates, and carboxylate esters, a sulfur atom in groups, such as thiol groups, thioalkyl and aryl sulfide groups, sulfoxide groups, sulfone groups, sulfonyl groups, and sulfonamide groups, a nitrogen atom in groups, such as amines, hydroxylamines, nitriles, nitro groups, N-oxides, hydrazides, azides, and enamines, a carbon atom in groups, such as those described herein such as alkyl groups such as methyl, ethyl, propyl or butyl groups and aryl groups, cycloalkyl groups, alkenyl groups, alkynyl groups, alkoxy and aryloxy groups, and other atoms in various other groups. Substituted alkyl, alkenyl, alkynyl, cycloalkyl, and cycloalkenyl groups as well as other substituted groups also include groups in which one or more hydrogen bonds are replaced by one or more bonds, including double or triple bonds, to a carbon atom, or to a heteroatom, such as oxygen in (oxo)carbonyl, carboxyl, ester, amide, imide, urethane, and urea groups, and nitrogen in imines, hydroxyimines, oximes, hydrazones, amidines, guanidines and nitriles. Substituted ring groups, such as substituted cycloalkyl, heterocycloalkyl, aryl and heteroaryl groups also include rings and fused ring systems in which a bond to a hydrogen atom is replaced with a bond to a substituted alkyl, alkenyl, or alkynyl group as defined herein.

The phrase "(therapeutically) effective amount" as used herein is meant to refer to the amount of active compound, or pharmaceutical, that elicits the biological or medicinal response that is being sought in a tissue, system or subject by a researcher, veterinarian, medical doctor or other clinician (practitioner). The therapeutic effect is dependent upon the disorder being treated, the biological effect desired, or the clinical result desired. As such, the therapeutic effect can be a decrease in the severity of symptoms associated with the disorder and/or inhibition (partial or complete; at least in part) of the progression of the disorder, or improved treatment, healing, prevention or elimination of a disorder, or side-effects. The amount needed to elicit the therapeutic response can be determined, for example, based on the species, age, health, size, gender and/or sex of a subject. Optimal amounts can also be determined based on monitoring of the subject's response to treatment.

The terms "treatment" and "treating" as used herein are not meant to be limited to curing. Treating is meant to also include alleviating at least one symptom of a disease, removing at least one symptom of a disease, lessen at least one symptom of a disease, and/or delaying the course of a disease. The term "treatment" as used herein is also meant to include methods of therapy and diagnosis. Also, the terms are meant to include therapeutic treatment and prophylactic or preventative measures wherein the object is to prevent or slow down (lessen) an undesired physiological condition, disorder or disease, or obtain beneficial or desired clinical results. Beneficial or desired clinical results include, but are not limited to, alleviation of symptoms, diminishment of extent of condition, disorder or disease, stabilized (i.e., not worsening) state of condition, disorder or disease, delay in onset or slowing of condition, disorder or disease progression, amelioration of the condition, disorder or disease state or remission (whether partial or total), whether detectable or undetectable, an amelioration of at least one measurable physical parameter, not necessarily discernible by the patient; or enhancement or improvement of condition, disorder or disease. Treatment includes eliciting a clinically significant response without excessive levels of side effects. Treatment also includes prolonging survival as compared to expected survival if not receiving treatment. Thus, "treatment of tuberculosis" or "treating tuberculosis" means an activity that prevents, alleviates or ameliorates any of the primary phenomena (initiation, progression, metastasis) or secondary symptoms associated with tuberculosis.

The phrase "treating tuberculosis" or "treatment of tuberculosis" also refers to the treatment of a subject infected with *M. tuberculosis*. The treatment can (selectively) target replicating *M. tuberculosis* and non-replicating *M. tuberculosis*.

The invention provides a compound of formula (Ia), wherein the formula is

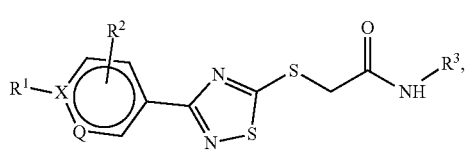

(Ia)

or a pharmaceutically acceptable salt of the compound, for use in the prevention or treatment of a bacterial infection. In said formula, Q and X are, respectively, CH and C, $CR^2$ and C, CH and N, $CR^2$ and N, or N and C. $R^1$ is selected from hydrogen, halide or optionally substituted linear or branched alkoxy having 1 or 2 carbon atoms, $R^2$ is independently selected from hydrogen, halide or optionally substituted linear or branched alkoxy having 1 or 2 carbon atoms, and $R^3$ is optionally substituted linear or branched alkoxy having 1-6 carbon atoms, haloalkyl having 1-6 carbon atoms, n-propyl, 2-propenyl, 2-propynyl, or n-pentyl.

There is further provided a compound of formula (Ia) as described herein, preferably a compound of formula (Ia) according to the first aspect of the invention.

In the case of one or more alkoxy groups on the phenyl of the compound of formula (Ia), said groups may be connected to said phenyl directly with their oxygen atom and/or via, for example, an alkyl, alkenyl, alkynyl, etc. When $R^3$ is an alkoxy, the alkoxy may be either connected to the NH with its oxygen atom or via, for example, an alkyl, alkenyl, alkynyl, etc. Preferably, when $R^1$ and/or $R^2$ are alkoxy, the alkoxy is/are connected directly to the phenyl with its/their oxygen atom, and/or when $R^3$ is alkoxy, said alkoxy is connected to NH via, for example, an alkyl, such as an alkyl having 1-6 carbon atoms or 2-4 carbon atoms.

There is further provided herein a compound of formula (I), wherein the formula is

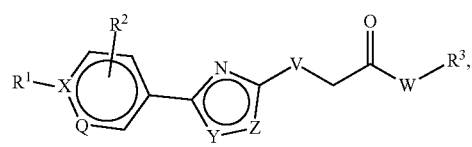

wherein

Q and X are, respectively, CH and C, $CR^2$ and C, CH and N, $CR^2$ and N, or N and C;

Y and Z are, respectively, N and S, S and N, CH and O, N and O, or CH and S;

V is O, S, or NH;

W is O, or NH, preferably NH;

$R^1$ is hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide;

$R^2$ is independently selected from hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide, and $R^3$ is hydrogen, optionally substituted linear or branched alkyl, optionally substituted linear or branched alkenyl, optionally substituted alkynyl, optionally substituted linear or branched alkoxy, optionally substituted cycloalkyl, optionally substituted heterocycloalkyl, optionally substituted aryl, or optionally substituted heteroaryl, or a pharmaceutically acceptable salt of the compound, or a prodrug of the compound, for use in the prevention or treatment of a bacterial infection.

There is also provided a use of the compound of formula (Ia) or a pharmaceutically acceptable salt thereof, or the compound of formula (I), a pharmaceutically acceptable salt thereof, or a prodrug thereof, as described herein for the treatment of a bacterial infection. There is further provided the use of the compound of formula (Ia) or a pharmaceutically acceptable salt thereof, or the compound of formula (I), a pharmaceutically acceptable salt thereof, or a prodrug thereof, as described herein for the manufacture of a medicament, such as a medicament for the treatment of a bacterial infection.

The compound of formula (I), a pharmaceutically acceptable salt thereof, or a prodrug thereof, as described herein, and the compound of formula (Ia), or a pharmaceutically acceptable salt thereof, may comprise more than one $R^2$ group, such as two, three, or four $R^2$ groups. Preferably, the compound, a pharmaceutically acceptable salt thereof, or a prodrug thereof, comprises one or two $R^2$ groups, more preferably one $R^2$ group. In particular, when the compound, a pharmaceutically acceptable salt thereof, or a prodrug thereof, comprises more than one $R^2$ group, the $R^2$ groups may be located on the ortho-position and/or meta-position, preferably on the meta-position.

With the compound of formula (I), a pharmaceutically acceptable salt thereof, or a prodrug thereof, as described herein, and the compound of formula (Ia), or a pharmaceutically acceptable salt thereof, $R^1$ and/or $R^2$ may be selected as such that these groups are no hydrogen bond acceptors. It may be that the presence of one or more heteroatom-substituents on the phenyl group linked to the 3-position of the central 5-membered heterocycle tend to increase competitive interactions with non-targeted proteins in the host, when the compound, the pharmaceutically acceptable salt thereof, or the prodrug thereof, is used as a medicament in the treatment of *M. tuberculosis*.

With the compound of formula (I), a pharmaceutically acceptable salt thereof, or a prodrug thereof, as described herein, $R^1$, $R^2$ and/or $R^3$ may be hydrogen, optionally substituted linear or branched alkyl having 1-12 carbon atoms, optionally substituted linear or branched alkenyl having 1-12 carbon atoms, optionally substituted alkynyl having 2-12 carbon atoms, optionally substituted linear or branched alkoxy having 1-12 carbon atoms, optionally substituted cycloalkyl having 3-10 carbon atoms, optionally heterocycloalkyl having 2-7 carbon atoms, optionally substituted aryl having 6-10 carbon atoms, optionally substituted heteroaryl having 4-12 carbon atoms, halide, or hydroxyl, provided that $R^3$ is no halide, or hydroxyl. Preferably, $R^3$ is no hydrogen, and/or $R^1$, $R^2$ and $R^3$ are not identical.

The W in the compound of formula (I), a pharmaceutically acceptable salt thereof, or a prodrug thereof, as described herein, may in particular be NH. The W may represent a tertiary nitrogen. A tertiary nitrogen is an N bound to three substituents other than hydrogen. W is preferably a secondary nitrogen. A secondary nitrogen is an NH bound to two substituents other than hydrogen.

The compound of formula (I) as described herein may be as follows:

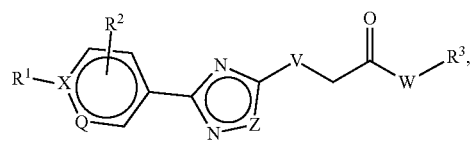

wherein Z is S, or O.

The compound of formula (I) as described herein may be any of the following:

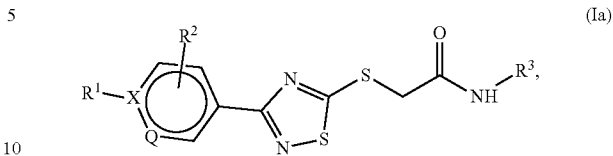

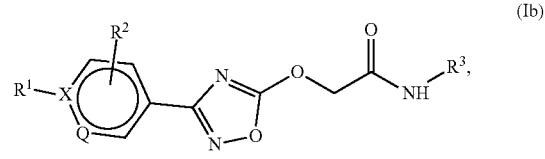

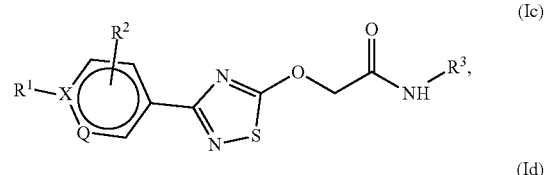

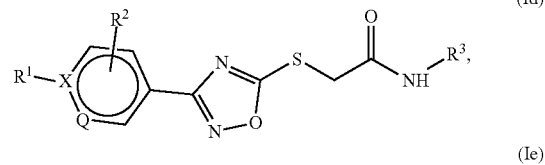

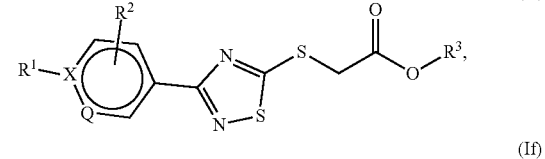

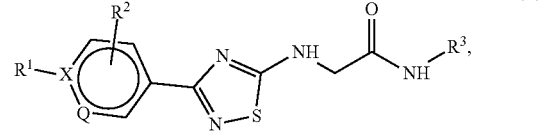

wherein $R^1$, $R^2$ and $R^3$ are as described herein, or are hydrogen, optionally substituted linear or branched alkyl having 1-6 carbon atoms, such as 1-5, optionally substituted linear or branched alkenyl having 1-6 carbon atoms, such as 1-3, optionally substituted alkynyl having 2-6 carbon atoms, such as 2 or 3, optionally substituted linear or branched alkoxy having 1-6 carbon atoms, such as 1 or 2, optionally substituted cycloalkyl having 3-8 carbon atoms, such as 3-6, optionally substituted heterocycloalkyl having 2-7 carbon atoms, such as 2-5, optionally substituted aryl having 6-10 carbon atoms, such as 6, optionally substituted heteroaryl having 4-12 carbon atoms, such as 4-7, halide, or hydroxyl, provided that $R^3$ is no halide, or hydroxyl, and preferably no hydrogen, or a pharmaceutically acceptable salt of any of (Ia)-(If), or a prodrug of any of (Ia)-(11).

The compound of formula (I) as described herein, may be in accordance with the compound of formula (Ia), wherein $R^1$ is hydrogen, optionally substituted linear or branched alkyl having 1-6 carbon atoms, optionally substituted linear or branched alkenyl having 1-6 carbon atoms, optionally substituted alkynyl having 2-6 carbon atoms, optionally substituted linear or branched alkoxy having 1-6 carbon atoms, optionally substituted cycloalkyl having 3-8 carbon atoms, optionally substituted heterocycloalkyl having 2-7 carbon atoms, halide, or hydroxyl;

$R^2$ is independently selected from hydrogen, optionally substituted linear or branched alkyl having 1-6 carbon atoms, optionally substituted linear or branched alkenyl having 1-6 carbon atoms, optionally substituted alkynyl having 2-6 carbon atoms, optionally substituted linear or branched alkoxy having 1-6 carbon atoms, optionally substituted cycloalkyl having 3-8 carbon atoms, optionally substituted heterocycloalkyl having 2-7 carbon atoms, halide, or hydroxyl, and $R^3$ is hydrogen, optionally substituted linear alkyl having 2-6 carbon atoms, optionally substituted branched alkyl having 3 or 4 carbon atoms, optionally substituted linear or branched alkenyl having 1-6 carbon atoms, optionally substituted alkynyl having 2-6 carbon atoms, optionally substituted linear or branched alkoxy having 1-6 carbon atoms, optionally substituted cycloalkyl having 3-8 carbon atoms, optionally substituted heterocycloalkyl having 2-7 carbon atoms, optionally substituted aryl having 6-10 carbon atoms, optionally substituted heteroaryl having 4-12 carbon atoms, halide, or hydroxyl, provided that $R^3$ is no optionally substituted arylalkyl, or a pharmaceutically acceptable salt of (Ia), or a prodrug of (Ia).

In an embodiment, there is provided the compound of formula (Ia) wherein $R^1$ is hydrogen, chloride or methoxy; and/or $R^2$ is independently selected from hydrogen, chloride or methoxy, and/or $R^3$ is n-propyl, n-pentyl, 2-methoxyethyl, or 3,3,3-trifluoropropyl.

There is provided herein a compound of formula (Ia) as described herein wherein the compound is selected from any of the following structures:

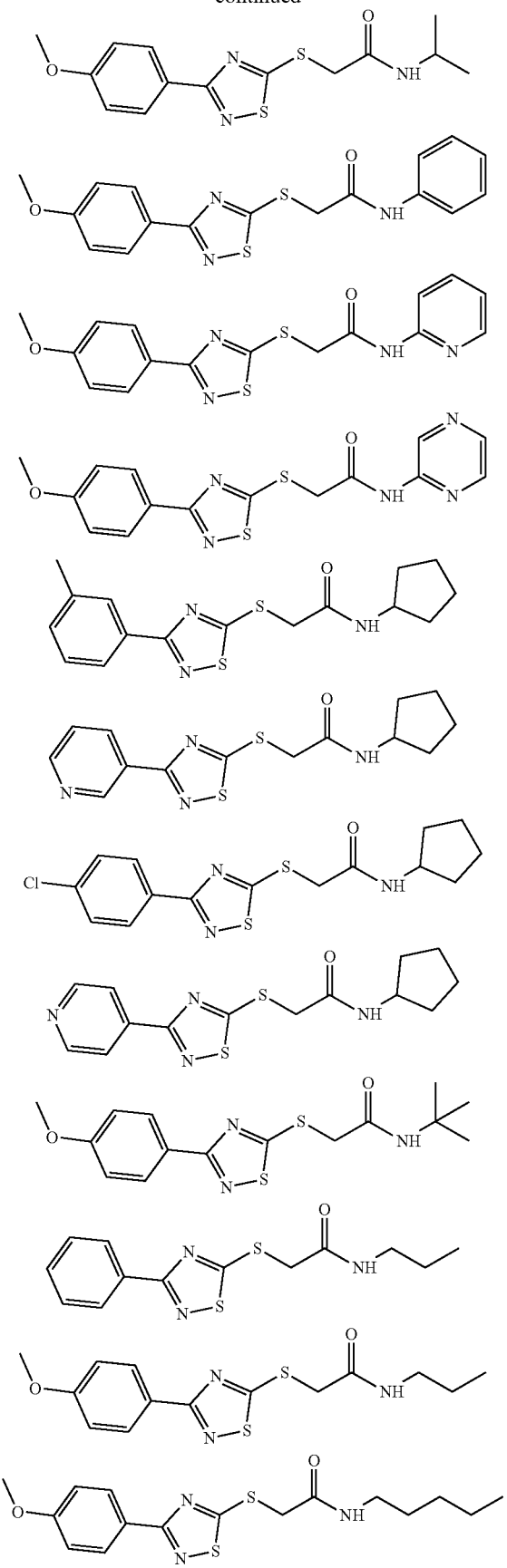

-continued

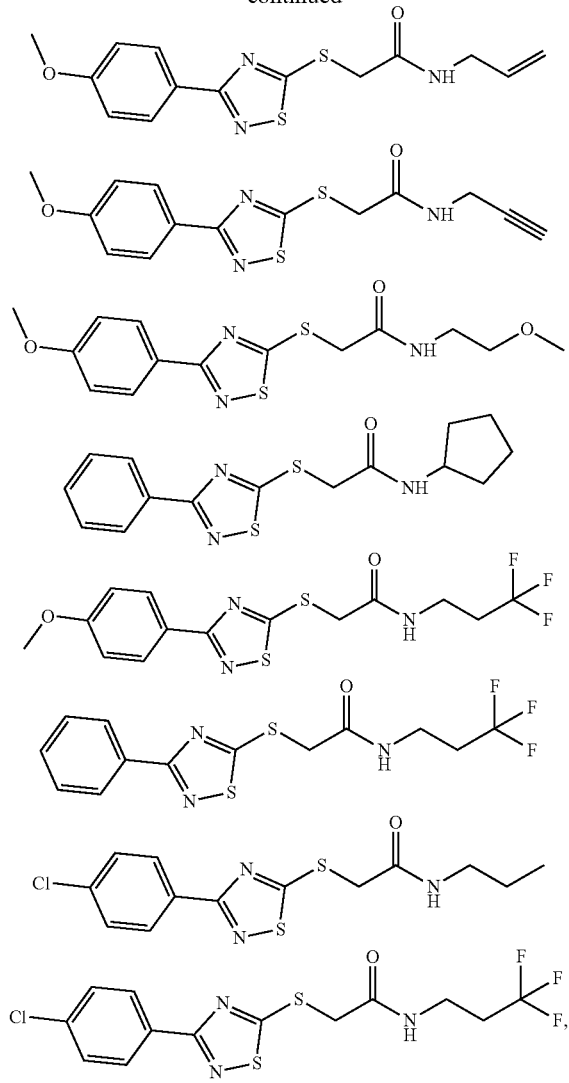

or a pharmaceutically acceptable salt of any of the compounds, or a prodrug of any of the compounds.

The compound of formula (I) as described herein may be represented by any of the compounds of formula's (Ib)-(If) which may further be any of the following:

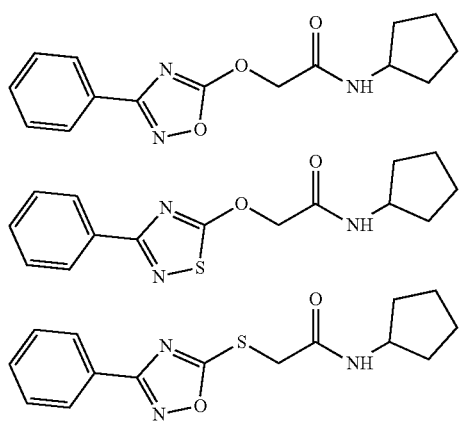

-continued

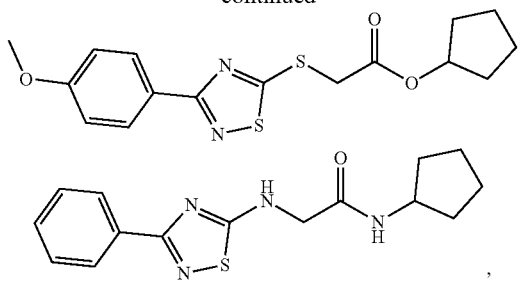

or a pharmaceutically acceptable salt of any of the compounds, or a prodrug of any of the compounds.

There is further provided herein a compound of formula (I), wherein the formula is

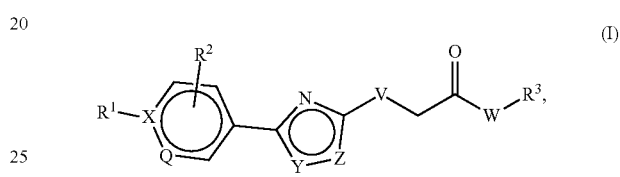

(I)

wherein

Q and X are, respectively, CH and C, $CR^2$ and C, CH and N, $CR^2$ and N, or N and C;

Y and Z are, respectively, N and S, S and N, CH and O, N and O, or CH and S;

V is O, S, or NH;

W is O, or NH, preferably NH;

$R^1$ is hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide;

$R^2$ is independently selected from hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide, and $R^3$ is hydrogen, optionally substituted linear or branched alkyl, optionally substituted linear or branched alkenyl, optionally substituted alkynyl, optionally substituted linear or branched alkoxy, optionally substituted cycloalkyl, optionally substituted heterocycloalkyl, optionally substituted aryl, or optionally substituted heteroaryl, or a pharmaceutically acceptable salt, or a prodrug of the compound, for use as a medicament, provided that the compound is not any of the following

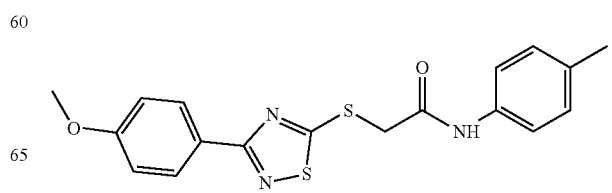

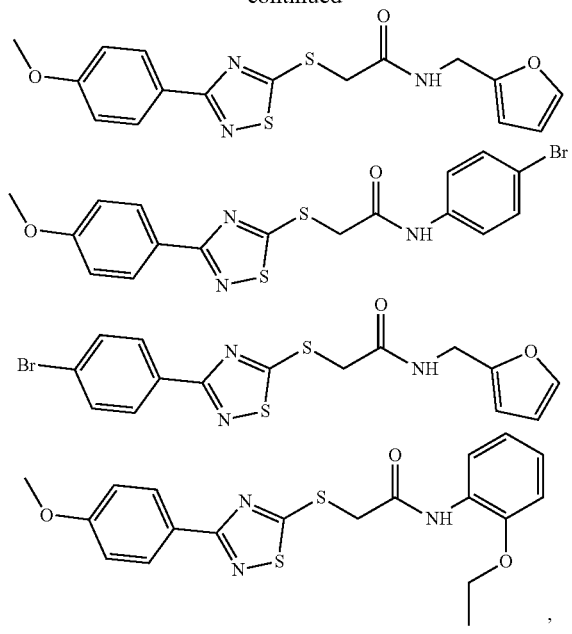

or a pharmaceutically acceptable salt thereof.

Herein, there is provided the aforementioned compound of formula (I), or a pharmaceutically acceptable salt thereof, or a prodrug thereof, for use as a medicament, wherein Y and Z are, respectively, N and S, S and N or CH and O, W is NH, and wherein $R^3$ is not hydrogen or optionally substituted heterocycloalkyl. In addition, $R^3$ may not be optionally substituted linear or branched alkyl, but instead may be linear or branched alkyl.

It is provided that the compound of formula (I) for use as a medicament is not:

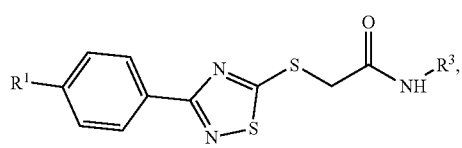

(II)

wherein
$R^1$ is methoxy and $R^3$ is para-tolyl, $R^1$ is methoxy and $R^3$ is N-methyl-2-furanyl, $R^1$ is methoxy and $R^3$ is para-bromophenyl, $R^1$ is methoxy and $R^3$ is ortho-ethoxyphenyl, or $R^1$ is bromo and $R^3$ is N-methyl-2-furanyl. Also, the compound of formula (I) may not be the compound of formula (II), wherein $R^1$ is methoxy and $R^3$ is ortho-tolyl, meta-tolyl, ortho-bromophenyl, meta-bromophenyl, meta-ethoxyphenyl, or para-ethoxyphenyl,
or a pharmaceutically acceptable salt thereof.

It is provided that the compound of formula (I), as described herein, is not according to any of compounds I-38 to I-41 as described herein.

Further, the compound of formula (I) for the use as a medicament, as described herein, may not be a prodrug of the compound of formula (II). The W in the compound of formula (I), a pharmaceutically acceptable salt thereof, or a prodrug thereof, as described herein, may in particular be NH. The W may represent a tertiary nitrogen. A tertiary nitrogen is an N bound to three substituents other than hydrogen. W is preferably a secondary nitrogen. A secondary nitrogen is an NH bound to two substituents other than hydrogen.

The compounds, as described herein, can be prepared according to any suitable method. Examples of several schemes that can be used to synthesize the compounds can be found below under "Examples". Mostly, the following general scheme is used to prepare the one or more compounds as described herein:

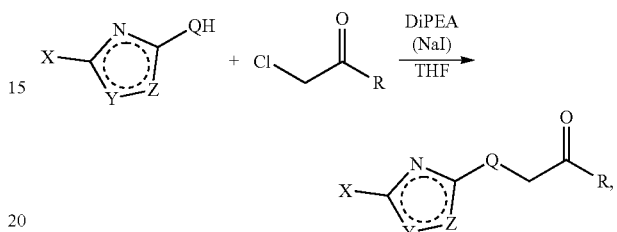

wherein Q, R, X, Y and Z represent moieties that depend on the desired (final) compound. In case NaI (sodium iodide) is used, the solvent THF (tetrahydrofuran) is replaced by acetone. The examples and the schemes described herein can also be readily modified as necessary to yield other compounds as described herein.

In particular, there is also provided herein the compound of formula (Ia) or a pharmaceutically acceptable salt thereof, or the compound of formula (I), a pharmaceutically acceptable salt thereof, or a prodrug thereof, for use as a medicament, such as a pharmaceutical. The compound of formula (Ia) or a pharmaceutically acceptable salt thereof, or the compound of formula (I), a pharmaceutically acceptable salt thereof, or a prodrug thereof, may be used in medical applications, such as in medicine.

There is further provided the compound of formula (I), a pharmaceutically acceptable salt thereof, or a prodrug thereof, as described herein, such as the compound of formula (I), wherein the formula is

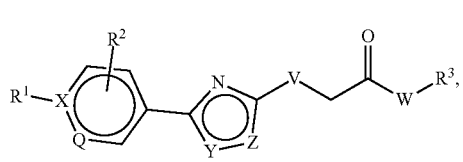

(I)

wherein
Q and X are, respectively, CH and C, $CR^2$ and C, CH and N, $CR^2$ and N, or N and C, preferably CH and C, N and C, CH and N, or $CR^2$ and C, more preferably CH and C, or $CR^2$ and C, even more preferably CH and C;
Y and Z are, respectively, N and S, S and N, CH and O, N and O, or CH and S, preferably N and S, N and O, CH and O, or CH and S, more preferably N and S, N and O, or CH and O, even more preferably N and S;
V is O, S, or NH, preferably S, or NH, more preferably S;
W is O, or NH, preferably NH;
$R^1$ is hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide;

R² is independently selected from hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide, and R³ is hydrogen, optionally substituted linear or branched alkyl, optionally substituted linear or branched alkenyl, optionally substituted alkynyl, optionally substituted linear or branched alkoxy, optionally substituted cycloalkyl, optionally substituted heterocycloalkyl, optionally substituted aryl, or optionally substituted heteroaryl, or a salt of the compound, such as a pharmaceutically acceptable salt of the compound, or a prodrug of the compound, provided that the compound is not any of the following

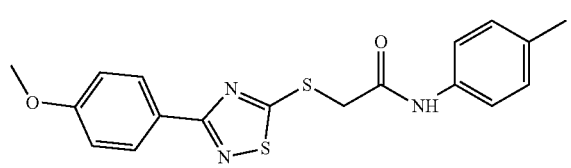

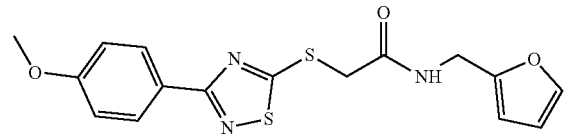

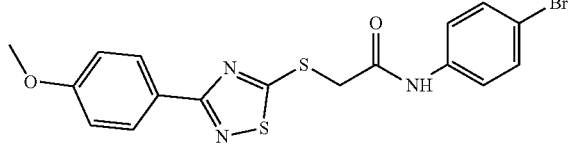

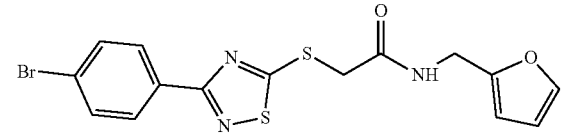

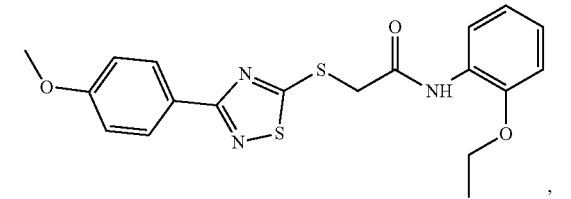

or a pharmaceutically acceptable salt thereof.

Further, the compound of formula (I), a salt thereof, such as a pharmaceutically acceptable salt thereof, or a prodrug thereof, as described herein, may not be a salt of the compound and/or not a prodrug of the compound.

There is provided herein the abovementioned compound of formula (I), a salt thereof, such as a pharmaceutically acceptable salt thereof, or a prodrug thereof, wherein Q and X are, respectively, CH and C, or CR² and C, Y and Z are, respectively, N and S, N and O, CH and O, or CH and S, V is S, or NH, and W is O, NH.

There is also provided herein the abovementioned compound of formula (I), a salt thereof, such as a pharmaceutically acceptable salt thereof, or a prodrug thereof, wherein Q and X are, respectively CH and C, Y and Z are, respectively, N and S, V is S, and W is NH.

Further provided herein is a compound of formula (I), wherein the formula is

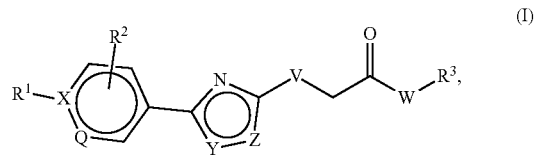

wherein

Q and X are, respectively, CH and C, CR² and C, CH and N, CR² and N, or N and C;

Y and Z are, respectively, N and S, S and N, CH and O;

V is O, S, or NH;

W is NH;

R¹ is hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide;

R² is independently selected from hydrogen, optionally substituted linear or branched alkyl, optionally substituted cycloalkyl, optionally substituted heterocycloalkyl, optionally substituted linear or branched alkoxy, optionally substituted aryl, optionally substituted heteroaryl, optionally substituted aryloxy, hydroxyl, or halide, and R³ is linear or branched alkyl, optionally substituted linear or branched alkenyl, optionally substituted alkynyl, optionally substituted linear or branched alkoxy, optionally substituted cycloalkyl, optionally substituted aryl, or optionally substituted heteroaryl, or a pharmaceutically acceptable salt of the compound, or a prodrug of the compound, provided that the compound is not any of the following

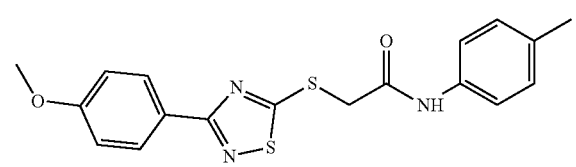

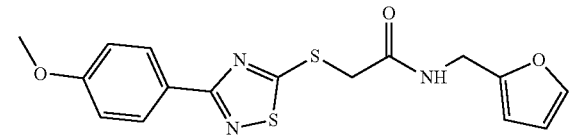

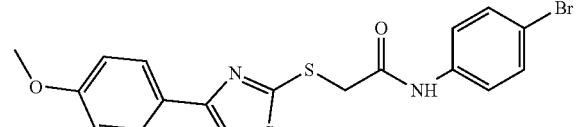

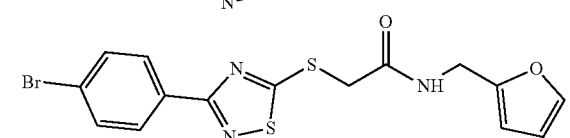

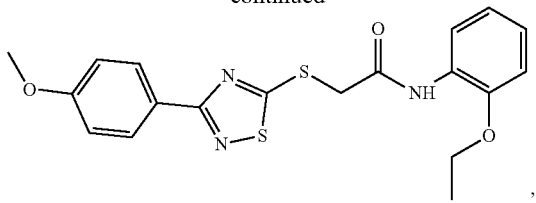

or a pharmaceutically acceptable salt thereof. The compound of formula (I), a pharmaceutically acceptable salt thereof, or a prodrug thereof, may be used as a medicament.

There is also provided compound I-11,

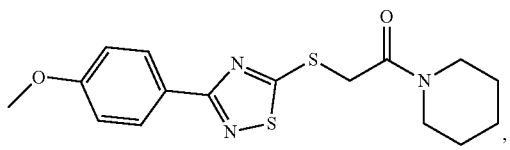

(I-11)

a salt thereof, such as a pharmaceutically acceptable salt thereof, or a prodrug thereof.

The compound, a pharmaceutically acceptable salt thereof, or a prodrug thereof, may be used as a medicament, such as a pharmaceutical. Compound I-11, salt thereof, such as a pharmaceutically acceptable salt thereof, or a prodrug thereof, may be used in medical applications, such as in medicine. The compound, a pharmaceutically acceptable salt thereof, or a prodrug thereof, may be used for treating a medical disorder (i.e., a disease, condition or symptom(s)), especially tuberculosis.

There is further provided compound I-15,

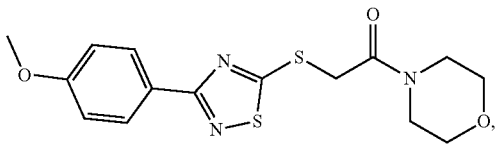

(I-15)

a salt thereof, such as a pharmaceutically acceptable salt thereof, or a prodrug thereof.

The compound, a pharmaceutically acceptable salt thereof, or a prodrug thereof, may be used as a medicament, such as a pharmaceutical. Compound I-15, a salt thereof, a pharmaceutically acceptable salt thereof, or a prodrug thereof, may be used in medical applications, such as in medicine. The compound, a pharmaceutically acceptable salt thereof, or a prodrug thereof, may be used for treating a medical disorder (i.e., a disease, condition or symptom(s)), especially tuberculosis.

The compound of formula (Ia) or a pharmaceutically acceptable salt thereof, or the compound of formula (I), a pharmaceutically acceptable salt thereof, or a prodrug thereof, as described herein, may be used for treating a medical disorder (i.e., a disease, condition or symptom(s)), especially tuberculosis. In particular, the compound of formula (Ia) or a pharmaceutically acceptable salt thereof, or the compound of formula (I), a pharmaceutically acceptable salt thereof, or a prodrug thereof, is suitable for treating tuberculosis.

The compound of formula (Ia) or a pharmaceutically acceptable salt thereof, or the compound of formula (I), a pharmaceutically acceptable salt thereof, or a prodrug thereof, may be used in a method of therapy and/or (in vivo) diagnostics. The method of therapy and/or in vivo diagnostics is a method of detecting and/or treating bacterial infection, particularly in the treatment of one or more bacterial infections caused by virulent mycobacteria, such as $M.$ $tuberculosis$. The compound of formula (Ia) or a pharmaceutically acceptable salt thereof, or the compound of formula (I), a salt thereof, such as a pharmaceutically acceptable salt thereof, or a prodrug thereof, as described herein may be used in the preparation of a medicament for detecting and/or treating bacterial infection, particularly for treating one or more bacterial infections caused by virulent mycobacteria, such as $M.$ $tuberculosis$. Any other known medicament, compound, or composition used for the treatment of a bacterial infection can be used in co-therapy, co-administration or co-formulation with the compound of formula (Ia) or a pharmaceutically acceptable salt thereof, or the compound of formula (I), a pharmaceutically acceptable salt thereof, or a prodrug thereof, as described herein.

The compound of formula (Ia) or a pharmaceutically acceptable salt thereof, or the compound of formula (I), a salt thereof, such as a pharmaceutically acceptable salt thereof, or a prodrug thereof, may be used for the manufacture of a medicament, such as a medicament for therapy and/or (in vivo) diagnostics. In particular, the compound of formula (Ia) or a pharmaceutically acceptable salt thereof, or the compound of formula (I), a salt thereof, such as a pharmaceutically acceptable salt thereof, or a prodrug thereof, is used for the manufacture of a medicament for the treatment of one or more bacterial infections caused by mycobacteria. Preferably, the compound of formula (Ia) or a pharmaceutically acceptable salt thereof, or the compound of formula (I), a salt thereof, such as a pharmaceutically acceptable salt thereof, or a prodrug thereof, is used for the manufacture of a medicament for the treatment of bacterial infections caused by virulent mycobacteria, such as $M.$ $tuberculosis$.

Just like $M.$ $tuberculosis$, $Mycobacterium$ $marinum$ is a slow-growing and virulent $mycobacterium$ and its genome shows high homology, including the conserved ESX systems (secretion systems) of $M.$ $tuberculosis$. However, $M.$ $marinum$ does not infect humans via aerosols and can therefore be safely worked with under BSL2 conditions. Hence, $M.$ $marinum$ can be chosen as a suitable model organism.

There is also provided the compound of formula (Ia) or a pharmaceutically acceptable salt thereof, or the compound of formula (I), a pharmaceutically acceptable salt thereof, or a prodrug thereof, as described herein, for use in the treatment of a bacterial infection, comprising administering to a subject the compound, a pharmaceutically acceptable salt thereof, or a prodrug thereof. The administering of the compound a pharmaceutically acceptable salt thereof, or a prodrug thereof, may be performed for a time sufficient to treat the bacterial infection. In particular, the bacterial infection may be caused by virulent mycobacteria, such as $M.$ $tuberculosis$. The subject any animal body, including or excluding the human body. The compound of formula (Ia) or a pharmaceutically acceptable salt thereof, or the compound of formula (I), a pharmaceutically acceptable salt thereof, or a prodrug thereof, may be used to treat a bacterial infection, comprising administering to a subject, preferably a subject that is in need thereof, the compound(s), pharmaceutically acceptable salt(s) thereof, or prodrug(s) thereof.

There are also provided methods of treating mycobacterial infections. The methods may comprise administering to a subject with mycobacterial infection, or a subject suspected of having a mycobacterial infection the compound of formula (Ia) or a pharmaceutically acceptable salt thereof, or the compound of formula (I), a pharmaceutically acceptable salt thereof, or a prodrug thereof. In particular, the subject is in need of treatment of mycobacterial infections, such as tuberculosis. The treatment of mycobacterial infections can be targeted against replicating and/or non-replicating bacteria. The compounds, pharmaceutically acceptable salts thereof, or prodrugs thereof, selectively target either replicating or non-replicating virulent mycobacteria.

Further provided herein is the compound, a pharmaceutically acceptable salt thereof, or a prodrug thereof, as described herein, or the compound of formula (Ia) or a pharmaceutically acceptable salt thereof for use in the diagnosis of a disease caused by bacteria, especially virulent mycobacteria, such as tuberculosis. The compound(s), pharmaceutically acceptable salt(s) thereof, or a prodrug(s) thereof, as described herein, may be used in the preparation of a medicament for diagnosing a mycobacterial disease, such as tuberculosis.

Further provided herein is a method of diagnosing a disease in a subject, comprising administering to the subject the compound of formula (Ia) or a pharmaceutically acceptable salt thereof, or the compound of formula (I), a pharmaceutically acceptable salt thereof, or a prodrug thereof, as described herein. In particular, the disease may be caused by virulent mycobacteria, such as *M. tuberculosis*.

The compounds, salts thereof, such as pharmaceutically acceptable salts thereof, or prodrugs thereof, as described herein are used, preferably as medicaments, in (a method for) the treatment of the animal body, including the human, humanoid and/or nonhuman body. The compounds, salts thereof, such as pharmaceutically acceptable salts thereof, or prodrugs thereof, as described herein, such as the compound of formula (I), a pharmaceutically acceptable salt thereof, or a prodrug thereof, as described herein, or the compound of formula (Ia) or a pharmaceutically acceptable salt thereof, may be used in the manufacture of a medicament for the treatment of the animal body, including the human, humanoid and/or nonhuman body.

The bacterial infection, as described herein, may refer to a bacterial infection in a respiratory system and/or extrapulmonic (i.e., a bacterial infection outside the lungs and/or unrelated to lungs). In particular, as used herein, the bacterial infection may comprise a pulmonary mycobacterial infection, especially pulmonary tuberculosis.

The compound for use in the treatment and/or diagnosis of a bacterial infection as described herein may be selected from any of the following

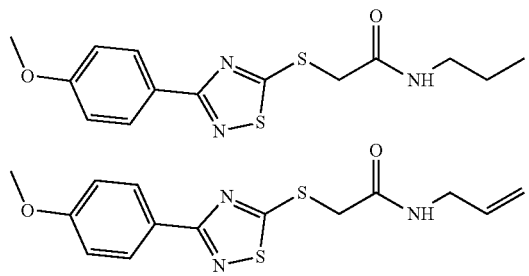

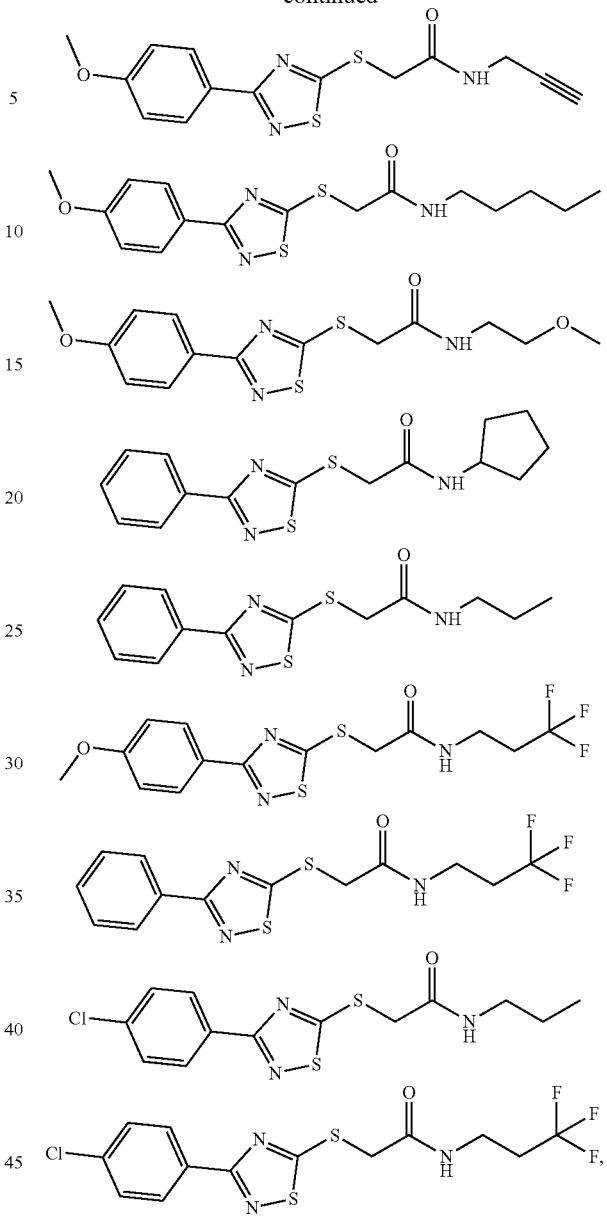

or a pharmaceutically acceptable salt thereof, or a prodrug thereof.

The compound for use in the treatment and/or diagnosis of a bacterial infection as described herein may be selected from any of the following

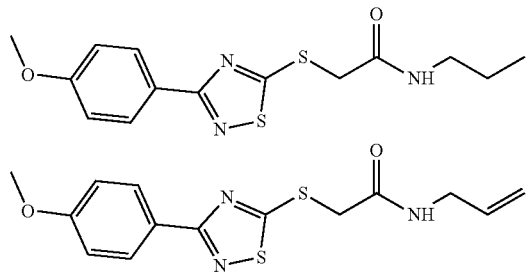

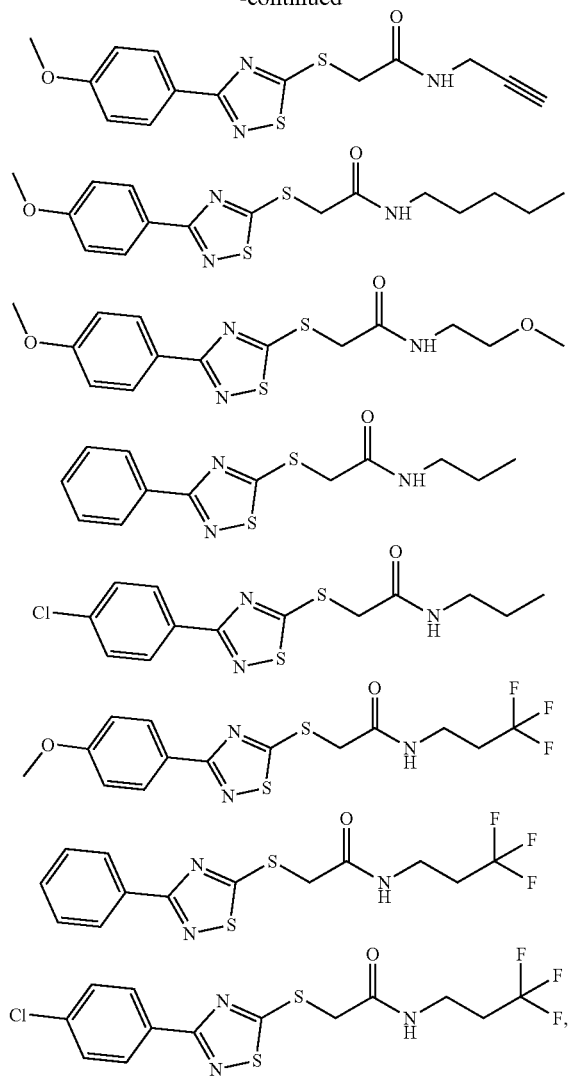

or a pharmaceutically acceptable salt thereof, or a prodrug thereof.

The compounds, pharmaceutically acceptable salts thereof, or prodrugs thereof, as described herein, can be administered in any conventional manner by any route where it is active or becomes active. Administration can be systemic, topical, or oral. For examples, administration can be, but it not limited to parenteral, subcutaneous, intravenous, intramuscular, intraperitoneal, transdermal, oral, buccal, sublingual, or ocular routes, or intravaginal, by inhalation, by depot injections, or by implants. The modus of administration can depend on the conditions or disease to be targeted or treated. The selection of the specific route of administration can be selected or adjusted by the clinician according to methods known to the clinician to obtain the desired clinical response.

It may be desirable to administer one or more of the compounds, one or more pharmaceutically acceptable salts thereof, and/or one or more prodrugs thereof, as described herein, locally to an area suitable for treatment, such as an area in need of treatment. This may be achieved, for example, by local infusion during surgery, topical application, e.g., in conjunction with a wound dressing after surgery, by injection, by means of a catheter, by means of a suppository, or by means of an implant, wherein the implant is of a porous, non/porous, or gelatinous material, including membranes, such as silastic membranes, or fibers.

The compounds, pharmaceutically acceptable salts thereof, or prodrugs thereof, as described herein, may be administered either alone or in combination (concurrently or serially) with other compounds, such as pharmaceutically acceptable compounds and/or prodrugs. For example, the compounds, pharmaceutically acceptable salts thereof, and/or prodrugs thereof, can be administered in combination with other analgesics, antidepressants, anti-anxiety compounds, anti-overactive bladder compounds, antibiotics, compounds for the treatment of tuberculosis.

There is also provided a pharmaceutical composition comprising the compound of formula (Ia) or a pharmaceutically acceptable salt thereof, or the compound of formula (I), a pharmaceutically acceptable salt thereof, or a prodrug thereof, as described herein.

The amount of compound, pharmaceutically acceptable salt thereof, or prodrug thereof, to be administered is that amount which is therapeutically effective. The dosage to be administered will depend on the characteristics of the subject being treated, e.g., the particular animal treated, age, weight, health, types of concurrent treatment, if any, and frequency of treatments, and can be easily determined by, e.g., a clinician. The dosing for the compounds as described herein can be used and adjusted depending upon the factors above. The selection of the specific dose regimen can be selected or adjusted or titrated by a clinician according to methods known in the art to obtain the desired clinical response.

The amount of the compound, pharmaceutically acceptable salt thereof, or prodrug thereof, as described herein, that will be effective in the treatment and/or prevention of a particular disease, condition, or disorder will depend on the nature and extent of the disease, condition, or disorder, and can be determined by standard clinical techniques. In addition, in vitro or in vivo assays may optionally be employed to help identify optimal dosage ranges. The precise dose to be employed in the compositions will also depend on the route of administration, and the seriousness of the disorder, and should be decided according to the judgment of the practitioner and the patient's condition(s). However, a suitable dosage range for oral administration is, generally, 0.001-200 mg/kg body weight, such as 0.01-100 mg/kg body weight, 0.1-75 mg/kg body weight, 0.2-50 mg/kg body weight, or 0.5-20 mg/kg body weight. Preferably, the dosage range for oral administration is 1-20 mg/kg body weight.

The dosage range for intravenous administration may be 0.01-500 mg per kg body weight, 0.1-100 mg per kg body weight, or 1-50 mg per kg body weight. Preferably, the dosage range for intravenous administration is 10-35 mg per kg body weight. Suitable dosage ranges for other modes of administration can be calculated based on the forgoing dosages as known by those skilled in the art. For example, recommended dosages for intranasal, transmucosal, intradermal, intramuscular, intraperitoneal, subcutaneous, epidural, sublingual, intracerebral, intravaginal, transdermal administration or administration by inhalation may be in the range of 0.001-200 mg per kg of body weight, 0.01-100 mg per kg of body weight, 0.1-50 mg per kg of body weight, or 1-20 mg per kg of body weight. Effective doses may be extrapolated from dose-response curves derived from in vitro or animal model test systems (animal models).

These animal models and systems are well known in the art such as zebra fish infection model (infection with *M. marinum*) or models in which the animals are infected with

*M. tuberculosis* (murine model, guinea pig model, rabbit model or non-human primate model). As an initial guideline, the amount that has to be administered into a subject should result in a blood serum concentration of the compound that shows growth inhibition during in vitro exposure of bacterial culture (REMA).

Useful administration tests to find the optimal dosage range include administration of the compound, pharmaceutically acceptable salt thereof, or prodrug thereof, to infected patients and track by sputum smears the bacterial load in the patient during treatment over time, with or without combination of additional antituberculotic compounds.

The compounds, pharmaceutically acceptable salts thereof, or prodrugs thereof, as described herein, can be formulated for parenteral administration by injection, such as by bolus injection or continuous infusion. The compounds, pharmaceutically acceptable salts thereof, or prodrugs thereof, can be administered by continuous infusion subcutaneously over a period of 15 minutes to 24 hours. Formulations for injection can be presented in unit dosage form, such as in ampoules or in multi-dose containers, with an optionally added preservative. The compositions can take such forms as suspensions, solutions or emulsions in oily or aqueous vehicles, and can contain formulatory agents such as suspending, stabilizing and/or dispersing agents. The injectable may be in the form of short-acting, depot, or implant and pellet forms injected subcutaneously or intramuscularly. The parenteral dosage form may be the form of a solution, suspension, emulsion, or dry powder.

For oral administration, the compounds, pharmaceutically acceptable salts thereof, or prodrugs thereof, as described herein, can be formulated by combining the compounds, pharmaceutically acceptable salts thereof, or prodrugs thereof, with pharmaceutically acceptable carriers. Such carriers enable the compounds, pharmaceutically acceptable salts thereof, or prodrugs thereof, to be formulated, for example, as tablets, pills, drageés, capsules, emulsions, liquids, gels, syrups, caches, pellets, powders, granules, slurries, lozenges, aqueous or oily suspensions, for oral ingestion by a patient to be treated. Pharmaceutical preparations for oral use can be obtained by, for example, adding a solid excipient, optionally grinding the resulting mixture, and processing the mixture of granules, after adding suitable auxiliaries, if desired, to obtain tablets or drageés. Suitable excipients include, but are not limited to, fillers such as sugars, including, but not limited to, lactose, sucrose, mannitol, and sorbitol; cellulose preparations such as, but not limited to, maize starch, wheat starch, rice starch, potato starch, gelatin, gum tragacanth, methyl cellulose, hydroxypropylmethyl-cellulose, sodium carboxymethylcellulose, and polyvinyl pyrrolidone. If desired, disintegrating agents can be added, such as, but not limited to, the cross-linked polyvinyl pyrrolidone, agar, or alginic acid or a salt thereof such as sodium alginate.

Orally administered compositions can contain one or more optional agents, for example, sweetening agents such as fructose, aspartame or saccharin; flavoring agents such as peppermint, oil of wintergreen, or cherry; coloring agents; and preserving agents, to provide a pharmaceutically palatable preparation. Moreover, where in tablet or pill form, the compositions may be coated to delay disintegration and absorption in the gastrointestinal tract thereby providing a sustained action over an extended period of time. Selectively permeable membranes surrounding an osmotically active driving compound are also suitable for orally administered compounds. Oral compositions can include standard vehicles such as mannitol, lactose, starch, magnesium stearate, sodium saccharine, cellulose, magnesium carbonate, etc. Such vehicles are suitably of pharmaceutical grade.

Drageés can be provided with suitable coatings. For this purpose, concentrated sugar solutions can be used, which can optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments can be added to the tablets or drageé coatings for identification or to characterize different combinations of active compound doses. Pharmaceutical preparations which can be used orally include, but are not limited to, push-fit capsules made of gelatin, as well as soft, sealed capsules made of gelatin and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, the active compounds can be dissolved or suspended in suitable liquids, such as fatty oils, liquid paraffin, or liquid polyethylene glycols. In addition, stabilizers can be added. For buccal administration, the compositions can take the form of, such as, tablets or lozenges formulated in a conventional manner. For administration by inhalation, the compounds, pharmaceutically acceptable salts thereof, or prodrugs thereof, described herein, can be delivered in the form of an aerosol spray presentation from pressurized packs or a nebulizer, with the use of a suitable propellant, such as dichlorodifluoromethane, trichlorofluoromethane, dichlorotetrafluoroethane, carbon dioxide or other suitable gas. In the case of a pressurized aerosol the dosage unit can be determined by providing a valve to deliver a metered amount. Capsules and cartridges of, such as gelatin for use in an inhaler or insufflator can be formulated containing a powder mix of the compound, pharmaceutically acceptable salt thereof, or prodrug thereof, and a suitable powder base such as lactose or starch.

The compounds, pharmaceutically acceptable salts thereof, or prodrugs thereof, described herein, can also be formulated in rectal compositions such as suppositories or retention enemas, such as containing conventional suppository bases such as cocoa butter or other glycerides. The compounds, pharmaceutically acceptable salts thereof, or prodrugs thereof, described herein, can also be formulated in vaginal compositions such as vaginal creams, suppositories, pessaries, vaginal rings, and intrauterine devices.

In transdermal administration, the compounds, pharmaceutically acceptable salts thereof, and/or prodrugs thereof, can be applied to a plaster, or can be applied by transdermal, therapeutic systems that are consequently supplied to the organism.

The compounds, pharmaceutically acceptable salts thereof, and/or prodrugs thereof, as described herein, may be present in creams, solutions, powders, fluid emulsions, fluid suspensions, semi-solids, ointments, pastes, gels, jellies, and foams, or in patches containing any of the same.

The compounds, pharmaceutically acceptable salts thereof, or prodrugs thereof, described herein, can also be formulated as a depot preparation. Such long acting formulations can be administered by implantation (for example subcutaneously or intramuscularly) or by intramuscular injection. Depot injections can be administered at 2 days to 1 month intervals. Thus, for example, the compounds, pharmaceutically acceptable salts thereof, or prodrugs thereof, can be formulated with suitable polymeric or hydrophobic materials (for example as an emulsion in an acceptable oil) or ion exchange resins, or as sparingly soluble derivatives, for example, as a sparingly soluble salt.

It is also known in the art that the compounds, pharmaceutically acceptable salts thereof, or prodrugs thereof, such as those described herein, can be contained in such formulations with pharmaceutically acceptable diluents, fillers, disintegrants, binders, lubricants, surfactants, hydrophobic vehicles, water soluble vehicles, emulsifiers, buffers, humectants, moisturizers, solubilizers, preservatives and the like. The pharmaceutical compositions can also comprise suitable solid or gel phase carriers or excipients. Examples of such carriers or excipients include, but are not limited to, calcium carbonate, calcium phosphate, various sugars, starches, cellulose derivatives, gelatin, and polymers such as polyethylene glycols. The compounds, pharmaceutically acceptable salts thereof, and/or prodrugs thereof, described herein, can be used with agents, such as topical analgesics, barrier devices, or rinses.

The compounds, pharmaceutically acceptable salts thereof, and/or prodrugs thereof, described herein, can be delivered in a vesicle, in particular a liposome.

The formulation can be lyophilized to a solid and reconstituted with, for example, water prior to use. When administered to a mammal (e.g., to an animal for veterinary use or to a human for clinical use) the compounds, pharmaceutically acceptable salts thereof, or prodrugs thereof, can be administered in isolated form. When administered to a human, the compounds, pharmaceutically acceptable salts thereof, and/or prodrugs thereof, can be sterile. Water is a suitable carrier when the compound, pharmaceutically acceptable salt thereof, or prodrug thereof, as described herein, is administered intravenously. Saline solutions and aqueous dextrose and glycerol solutions can also be employed as liquid carriers, particularly for injectable solutions. Suitable pharmaceutical carriers also include excipients such as starch, glucose, lactose, sucrose, gelatin, malt, rice, flour, chalk, silica gel, sodium stearate, glycerol monostearate, talc, sodium chloride, dried skim milk, glycerol, propylene, glycol, water, dimethyl sulfoxide, and ethanol. The present compositions, if desired, can also contain minor amounts of wetting or emulsifying agents, or pH buffering agents.

The compounds, pharmaceutically acceptable salts thereof, prodrugs thereof, and compositions, as described herein, can take the form of a solution, suspension, emulsion, tablet, pill, pellet, capsule, capsule containing a liquid, powder, sustained-release formulation, suppository, aerosol, spray, or any other form suitable for use.

The compounds, pharmaceutically acceptable salts thereof, and prodrugs thereof, as described herein, are formulated in accordance with routine procedures as a pharmaceutical composition adapted for administration to humans. Typically, compounds, pharmaceutically acceptable salts thereof, and prodrugs thereof, are solutions in sterile isotonic aqueous buffer. Where necessary, the compositions can also include a solubilizing agent. Compositions for intravenous administration may optionally include a local anesthetic such as lidocaine to ease pain at the site of the injection. Generally, the ingredients are supplied either separately or mixed together in unit dosage form, for example, as a dry lyophilized powder or water free concentrate in a hermetically sealed container such as an ampule or sachets indicating the quantity of active agent. Where the compound, a pharmaceutically acceptable salt thereof, or a prodrug thereof, is to be administered by infusion, it can be dispensed, for example, with an infusion bottle containing sterile pharmaceutical grade water or saline. Where the compound, a pharmaceutically acceptable salt thereof, or a prodrug thereof, is administered by injection, an ampoule of sterile water for injection or saline can be provided so that the ingredients may be mixed prior to administration.

The compounds, pharmaceutically acceptable salts thereof, and prodrugs thereof, and (pharmaceutical) compositions, comprising a compound, a pharmaceutically acceptable salt thereof, or a prodrug thereof, as described herein, can be in unit dosage form. In such form, the compound, a pharmaceutically acceptable salt thereof, or a prodrug thereof, or composition, can be divided into unit doses containing appropriate quantities of the active component. The unit dosage form can be a packaged preparation, the package containing discrete quantities of the preparations, for example, packeted tablets, capsules, and powders in vials or ampules. The unit dosage form can also be a capsule, cachet, or tablet itself, or it can be the appropriate number of any of these packaged forms.

A composition comprising the compound, a pharmaceutically acceptable salt thereof, and/or a prodrug thereof, as described herein, is in the form of a liquid wherein the active agent (i.e., for example, the compound, pharmaceutically acceptable salt thereof, and prodrug thereof, as described herein, such as the compound of formula (I), a pharmaceutically acceptable salt thereof, or a prodrug thereof), is present in solution, in suspension, as an emulsion, or as a solution/suspension. The liquid composition may be in the form of a gel. The liquid composition may be aqueous. The composition may be in the form of an ointment.

An isotope carrier is provided herein comprising a compound, a pharmaceutically acceptable salt thereof, or a prodrug thereof, as described herein, wherein the compound, pharmaceutically acceptable salt thereof, or prodrug thereof, comprises one or more stablenuclides. The isotope carrier may be suitable for diagnostics in that the presence of the isotope carrier can be detected, for example when used in vivo. Suitable stable nuclides include deuterium, $^{13}C$, $^{15}N$, $^{33}S$, $^{34}S$, $^{36}S$, $^{17}O$, and $^{18}O$. Alternatively, the isotope carrier is provided comprising the compound, a pharmaceutically acceptable salt thereof, or a prodrug thereof, as described herein, wherein the compound, pharmaceutically acceptable salt thereof, or prodrug thereof, comprises one or more radionuclides.

The invention further provides a use of the compound of formula (Ia) or a pharmaceutically acceptable salt thereof, as described herein, as a chemotherapeutic agent, preferably as an antimycobacterial chemotherapeutic agent.

Further provided herein is a use of the compound of formula (I), a pharmaceutically acceptable salt thereof, or a prodrug thereof, as described herein, as a chemotherapeutic agent, preferably as an antimycobacterial chemotherapeutic agent.

The invention also provides the compound of formula (Ia), or a pharmaceutically acceptable salt thereof, in the treatment of a bacterial infection as described herein, the compound of formula (Ia), or a pharmaceutically acceptable salt thereof, for use as a medicament as described herein, or the compound of formula (Ia), or a pharmaceutically acceptable salt thereof, as described herein for use in the inhibition of mycobacterial type VII secretion, especially ESX-1 and/or ESX-5 dependent secretion. In particular, the compounds, pharmaceutically acceptable salt thereof, or prodrugs thereof, are used for the inhibition of type VII secretion, especially ESX-1 and/or ESX-5 dependent secretion, of virulent mycobacteria, such as M. tuberculosis.

Further provided herein is the compound of formula (I), a pharmaceutically acceptable salt thereof, or a prodrug thereof, in the treatment of a bacterial infection as described herein, the compound of formula (I), a pharmaceutically acceptable salt thereof, or a prodrug thereof, for use as a medicament as described herein, or the compound of formula (I), a pharmaceutically acceptable salt thereof, or a prodrug thereof, as described herein for use in the inhibition of mycobacterial type VII secretion, especially ESX-1 and/or ESX-5 dependent secretion. In particular, the compounds, pharmaceutically acceptable salt thereof, or prodrugs thereof, may be used for the inhibition of type VII secretion, especially ESX-1 and/or ESX-5 dependent secretion, of pathogenic mycobacteria, such as *M. tuberculosis*.

A pharmaceutical kit is further provided herein comprising one or more containers filled with one or more compounds, one or more pharmaceutically acceptable salts thereof, and/or one or more prodrugs thereof, as described herein. Optionally associated with such container(s) can be a notice in the form prescribed by a governmental agency regulating the manufacture, use or sale of pharmaceuticals or biological products, which notice reflects approval by the agency of manufacture, use or sale for human administration for treating a condition, disease, or disorder described herein, preferably tuberculosis. The kit may contain more than one compound, more than one pharmaceutically acceptable salt thereof, and/or more than one prodrug thereof, as described herein. The kit may comprise a compound, a pharmaceutically acceptable salt thereof, or a prodrug thereof, described herein, in a single injectable dosage form, such as a single dose within an injectable device such as a syringe with a needle. Preferably, the kit or pharmaceutical kit comprises one or more of compounds I-1 to I-42 (table 1), especially one or more of I-1 to I-17 and/or I-19 to I-37, one or more pharmaceutically acceptable salts thereof, and/or one or more prodrugs thereof. More preferably, the kit or pharmaceutical kit comprises one or more of compounds I-1 to I-14 and I-36, or I-1 to I-7 and I-36, one or more pharmaceutically acceptable salts thereof, and/or one or more prodrugs thereof. Even more preferably, the kit or pharmaceutical kit comprises compound I-1, I-3, I-4, and/or I-36, one or more pharmaceutically acceptable salts thereof, and/or one or more prodrugs thereof.

The individual compounds as depicted herein, such as the compounds in table 1, salts thereof, such as pharmaceutical acceptable salts thereof, and/or prodrugs thereof are provided herein. Mixtures (compositions) comprising one or more of these compounds, one or more salts thereof, such as pharmaceutical acceptable salts thereof, and/or one or more prodrugs thereof, are also provided. These compounds, pharmaceutically acceptable salts thereof, and/or prodrugs thereof, may be used as medicaments, such as pharmaceuticals, and may be used in medical applications, such as in medicine. The compounds, pharmaceutically acceptable salts thereof, and/or prodrugs thereof, may be used for treating medical disorders (i.e., diseases, conditions or symptom(s)), especially tuberculosis. The compounds, pharmaceutically acceptable salts thereof, and/or prodrugs thereof, may be used in a method of therapy and/or (in vivo) diagnostics, in particular to detect and/or treat bacterial infection, especially in the treatment of one or more bacterial infections caused by virulent mycobacteria, such as *M. tuberculosis*.

The compounds, pharmaceutically acceptable salts thereof, or prodrugs thereof, such as the compound of formula (I), a pharmaceutically acceptable salt thereof, or a prodrug thereof, as described herein, are suitable for use in the treatment of a bacterial infection that is caused by a *mycobacterium*, such as a bacterial infection caused by *M. tuberculosis*. The compound(s), pharmaceutically acceptable salt(s) thereof, or prodrug(s) thereof, such as the compound of formula (I), a pharmaceutically acceptable salt thereof, or a prodrug thereof, as described herein, surprisingly inhibit the growth of mycobacteria, in particular virulent mycobacteria. The compound(s), pharmaceutically acceptable salt(s) thereof, or prodrug(s) thereof, of the invention, such as the compounds of formula (I), pharmaceutically acceptable salt(s) thereof, or prodrug(s) thereof, showed surprisingly positive results with respect to the inhibition of protein secretion of bacteria. In particular, the compounds, pharmaceutically acceptable salts thereof, or prodrugs thereof, of the invention (as well as the compound of formula (I), a pharmaceutically acceptable salt thereof, or a prodrug thereof) are well suitable for inhibition of type VII secretion of mycobacteria. More in particular, the compounds of formula (Ia) or pharmaceutically acceptable salts thereof, including the compound of formula (I), a pharmaceutically acceptable salt thereof, or a prodrug thereof, as described herein, are surprisingly effective in the inhibition of ESX-1 and ESX-5 dependent secretion of mycobacteria.

Mycobacteria use specialized secretion systems known as T7S to secrete proteins across their cell envelope. The T7S called ESX-5 is predominantly found in virulent mycobacteria. ESX-5 secretes a large subset of proteins onto the bacterial surface, including many that have been implicated in immune-modulation. In *M. tuberculosis* ESX-5 dependent secretion is essential in vitro and in vivo. Previously it has been shown that the essentiality of ESX-5 can be overcome by increasing the outer membrane permeability after deletion of the outer membrane lipid phthiocerol dimycocerosate (PDIM), or by overexpression of an outer membrane channel (mspA), suggesting that one of the essential roles of ESX-5 lies in nutrient acquisition. ESX-1 is present in several pathogenic mycobacteria. Due to the essential role of ESX-1 during infection, it can also be considered as a promising drug target. The compound class of molecules as described herein was identified as efficient in the inhibition of T7S, in particular ESX-1 and ESX-5 dependent secretion of mycobacteria. The compounds described herein rivalled clinically used antibiotics in significantly reducing the bacterial burden in zebrafish and macrophages infected with *M. marinum* and macrophages infected with *M. tuberculosis*, respectively. Inhibition of two target systems simultaneously may significantly reduce the development of antibiotic resistance.

It is suspected that ESX-5 dependent secretion inhibitors would not only directly block growth or kill *M. tuberculosis* due to the essentiality of the ESX-5, but also reduce virulence and synergize with the immune system during an infection to effectively neutralize the pathogen. Furthermore, although each type of ESX has a dedicated specific function, the core components of these secretion systems are highly conserved. This may make it possible for certain compounds to inhibit several types of ESX systems, which is highly advantageous since this makes it significantly harder for the bacterium to develop resistance.

The new class for antimycobacterial drugs (i.e., the compounds of formula (I)) was identified by means of inhibition of mycobacterial T7S secretion. In particular, the focus was placed on ESX-5, since this system is essential for *M. tuberculosis* growth and the only type of ESX exclusively found in slow-growing mycobacteria. These compounds also inhibit ESX-1 dependent secretion, and could possibly also affect ESX-2 dependent secretion, ESX-3 dependent secretion and/or ESX-4 dependent secretion.

In order to develop the assay able to identify ESX-5 dependent secretion inhibitors, it was important to at least in part overcome the essentiality of ESX-5 dependent secretion during the screening conditions to be able to distinguish a potential ESX-5 dependent secretion inhibitor from compounds that generally inhibit bacterial growth. It was previously shown that the essential physiological role of ESX-5 during in vitro growth lies in porin-mediated nutrient uptake. The same study showed that ESX-5 is dispensable in M. marinum in the presence of the mycobacterial porin mspA (Plos Genet. 2015, PMID: 25938982). Therefore, mspA was expressed constitutively in the screening strain (FIG. 1). A compound that inhibits ESX-5 dependent secretion would not affect viability of this bacterial strain. FIG. 1A: The lipase LipY is a substrate of ESX-5, and is transported on the bacterial surface. Functionality of ESX-5 is determined by lipase activity of LipY after addition of the substrate DGGR (1,2-di-O-lauryl-rac-glycero-3-(glutaric acid 6-methylresorufin ester)), which is converted into a highly fluorescent substrate. The ESX-5 secretion system additionally secretes outer membrane channel proteins required for nutrient uptake, which renders ESX-5 essential. FIG. 1B: The screening strain (M. marinum WT (wild-type)+LipY+mspA) overexpresses mspA, which is translocated into the outer membrane in an ESX5-independent manner, and rescues the essentiality of ESX-5 by facilitation of nutrient uptake. During chemical interference of ESX-5, the reporter lipase LipY is no longer translocated onto the bacterial surface and DGGR is not processed into a fluorescent substrate.

Figure 2:
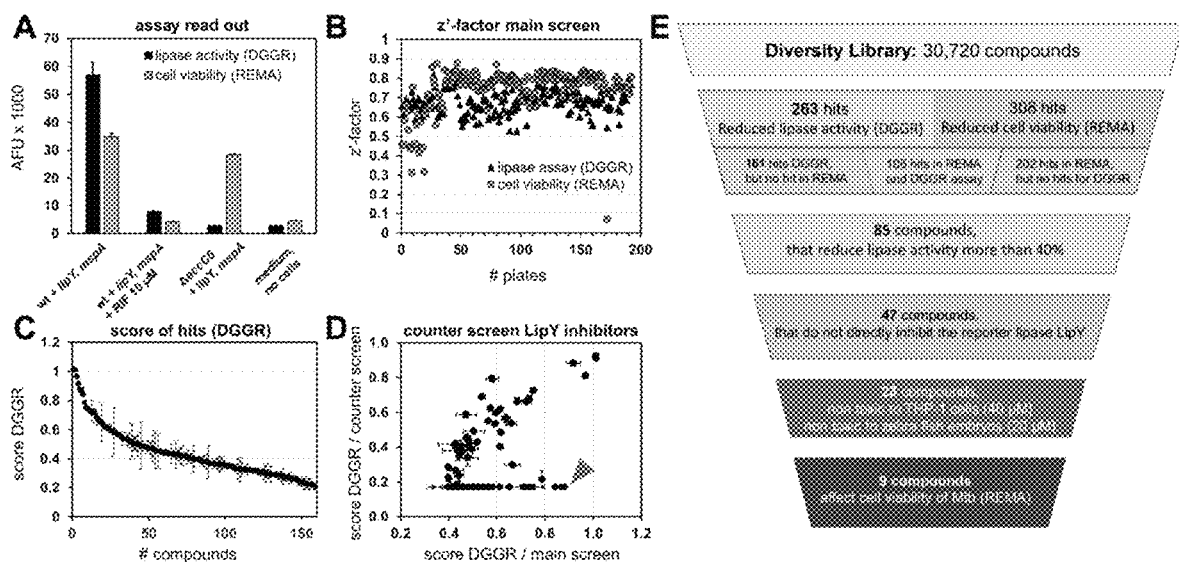
FIG. 2A is a graph showing that in the absence of ESX-5, the reporter LipY is not secreted and no lipase activity can be detected using DGGR as a substrate. The screening strain (WT+LipY, mspA) is positive. The antibacterial compound Rifampin (RIF) is negative, the $\Delta eccC_5$ deletion strain resembles a hit-condition and is positive for REMA and negative for DGGR.
FIG. 2B is a graph showing lipase activity (DGGR) and bacterial viability (REMA) readout for the control conditions. The screening strain (WT+LipY, mspA) is positive. The antibacterial compound Rifampin (RIF) is negative. The $\Delta eccC_5$ deletion strain resembles a hit-condition and is positive for REMA and negative for DGGR.
FIG. 2C is a graph showing that the 161 hits of the screen sorted and scored by lipase activity (DGGR). A score of 1.0 is equivalent to 100% lipase inhibition. Data points are averages and error bars indicate standard deviation of duplicates.
FIG. 2D is a graph of the counterscreen to remove lipase inhibitors acting directly on the reporter lipase LipY. The results of the main screen are plotted against the results of the counter screen. Compounds acting directly on LipY show activity in both assays and are found in the middle of the graph. Potential ESX-5 secretion inhibitors are located parallel to the X-axis with a DGGR score of 0.17, the cut-off value of the counter screen. Data point are averages and error bars indicate standard deviation of duplicates.
FIG. 2E is a flow chart of the screening campaign.

To identify the compounds that inhibit ESX-5 dependent secretion activity it was needed to be able to assess activity of ESX-5 in a high through-put (HT) multi well plate compatible manner. Hence, there was opted for an enzymatic assay using the triacylglycerol lipase LipY as a reporter. This lipase was shown to be specifically secreted by ESX-5 onto the bacterial surface. The presence of this enzyme was measured on the bacterial surface by addition of the fluorescent lipase substrate DGGR. Importantly, in the absence of ESX-5 the reporter LipY is not secreted and no lipase activity can be detected using DGGR as a substrate (FIG. 2A). FIG. 2B: Lipase activity (DGGR) and bacterial viability (REMA) readout for the control conditions. The screening strain (WT+LipY, mspA) is positive in both assays. The antibacterial compound Rifampin (RIF) is negative in both assays, while the ΔeccC5 deletion strain resembles a hit-condition and is positive for REMA and negative for DGGR. Medium control shows low background fluorescence. During the high throughput screen the z'-factors were calculated for each of the 192,384-well plates. All z'-factors of the lipase assay are above 0.5. The cell viability assay shows a z'-factor above 0.5 for 94% of all plates. FIG. 2C: The 161 hits of the screen sorted and scored by lipase activity (DGGR). A score of 1.0 is equivalent to 100% lipase inhibition. Data points are averages and error bars indicate standard deviation of duplicates. FIG. 2D: Counterscreen to remove lipase inhibitors acting directly on the reporter lipase LipY. The results of the main screen are plotted against the results of the counter screen. Compounds acting directly on LipY show activity in both assays and are found in the middle of the graph. Potential ESX-5 secretion inhibitors are located parallel to the X-axis with a DGGR score of 0.17, the cut-off value of the counter screen. Data point are averages and error bars indicate standard deviation of duplicates. FIG. 2E: Flow chart of the screening campaign.

In the screening strain ESX-5 is non-essential and the enzymatic lipase activity is proportional to ESX-5 activity. The screening strain M. marinum carries the plasmid pSMT3::mspA LipY to overexpress mspA and LipY, in order to overcome essentiality of ESX-5 and to assess ESX-5 dependent secretion activity, respectively. A hit compound that specifically inhibits ESX-5 dependent secretion, would not affect growth of the M. marinum strain but reduce lipase activity. The ability of the screening plasmid was successfully tested to rescue ESX-5 essentiality by deleting the essential ESX-5 core component $eccC_5$ in presence of the plasmid in WT M. marinum (FIG. 2A).

Figure 3:
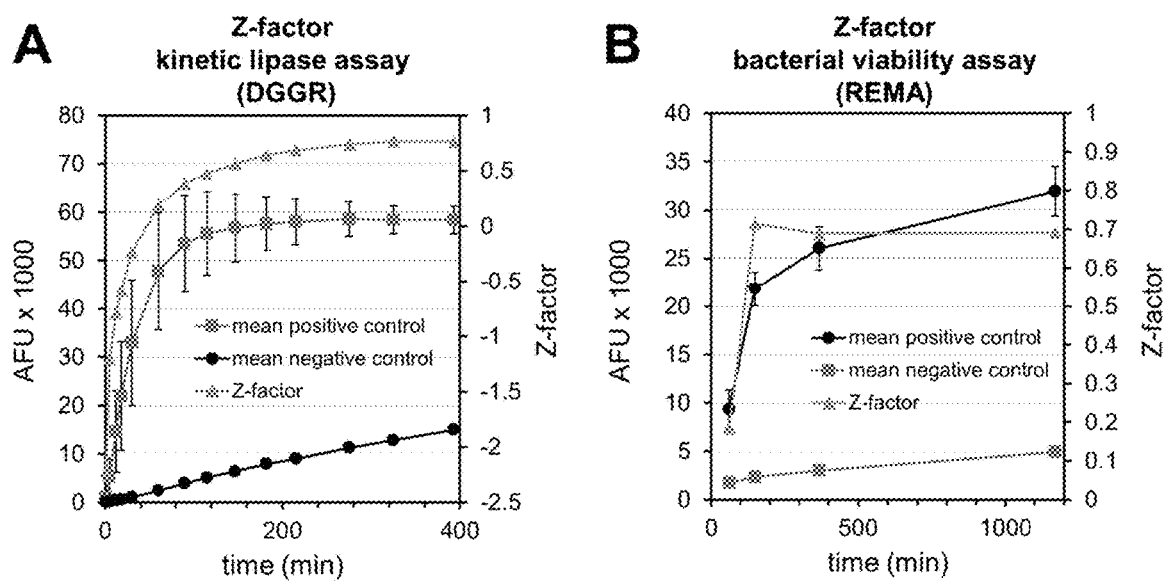
FIG. 3A is a graph showing evaluation of the high throughput capability of the screening assays: the lipase assay using the substrate DGGR.
FIG. 3B is a graph showing evaluation of the high throughput capability of the screening assays: the bacterial viability assay (REMA) using the dye resazurin.
Figure 4:
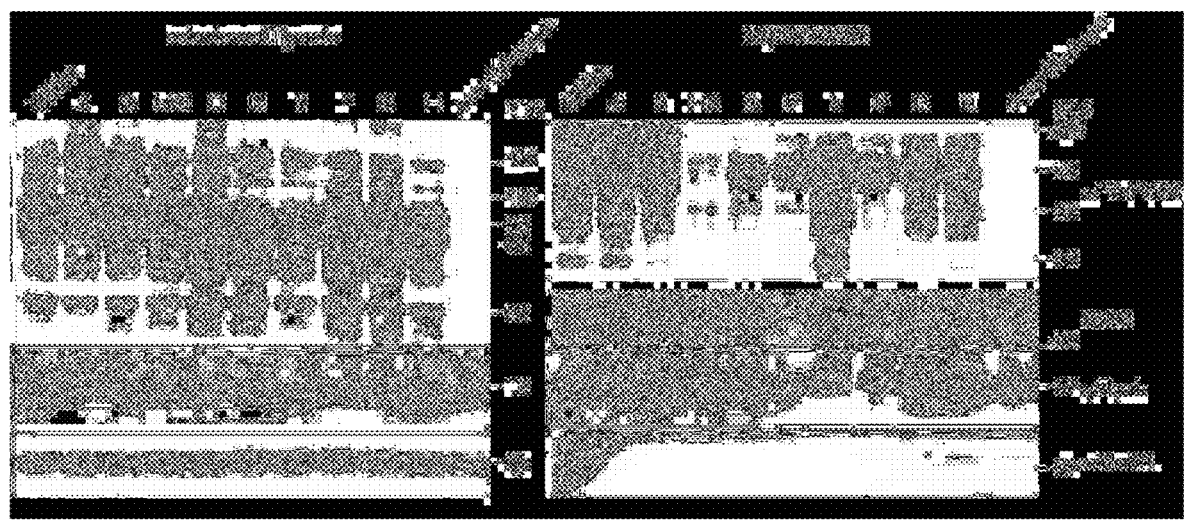
FIG. 4 is a secretion analysis of M. marinum WT by Western blotting for representative proteins of secretions pathways: PE PGRS—ESX-5 dependent Apa—SEC dependent, EsxA—ESX-1 dependent, GroEL served as control for bacterial lysis. The strain $\Delta eccC_5$+mspA was a control for ESX-5 dependent secretion.
Figures 5, 6:
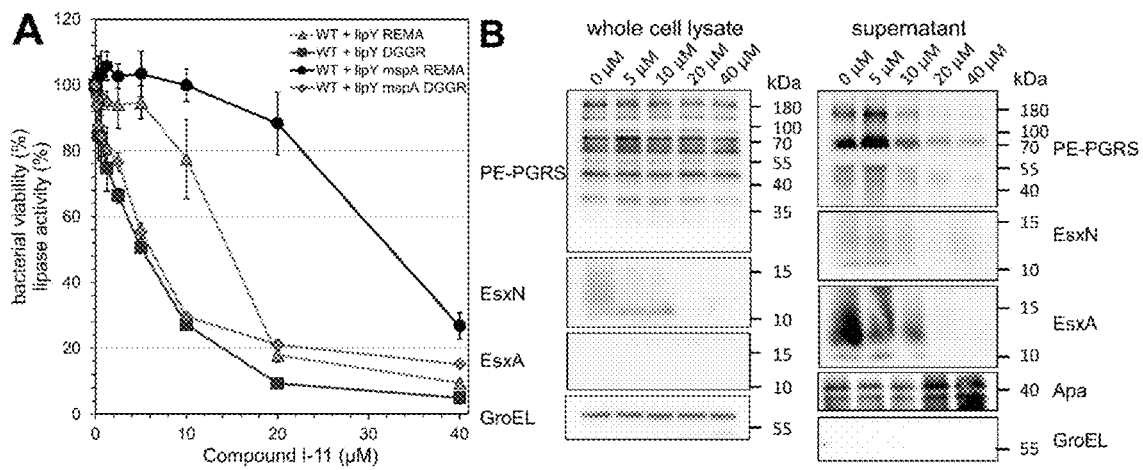
FIG. 6 is a chart showing a cell viability assay determining susceptibility of bacterial cultures to compound i-12 using REMA.

The detectable lipase activity of the rifampin-killed screening strain (FIG. 2A, WT+LipY, mspA+RIF 10 µM) was consistently higher than the $eccC_5$ mutant. This could be caused by residual amount of LipY on the surface given into the wells when bacteria are seeded into the plates. Although the bacteria never grew in the well due to the rifampin, the amount of lipase properly located on the bacterial surface appears to be sufficient to cause a higher signal as compared to the $eccC_5$+LipY that never produced functional LipY. Although finding compounds that cause the phenotype of an $eccC_5$+LipY strain had the focus, it became apparent that it was more challenging to obtain a consistently high window of detection between live and dead bacteria, i.e., WT+RIF. Therefore, the assay was optimized and tested further for HT compatibility using WT (negative control: signal in REMA and DGGR) and WT+RIF (positive control: no signal for REMA and DGGR) (FIG. 2A). After multiple optimization steps adjusting growth time, bacterial inoculum and reducing evaporation, z-factors were achieved above 0.5 and adopted the assay to 96 and 384 well plates. The DGGR and REMA assay achieved z-factors over 0.5 after 120 min, which were stable for DGGR till 400 min and for REMA overnight (FIG. 3). FIG. 3: Evaluation of the high throughput capability of the screening assays, (A) the lipase assay using the substrate DGGR and (B) the bacterial viability assay (REMA) using the dye resazurin. WT M. marinum (+LipY, mspA) cells were grown in 96 well plates with either 10 µM RIF (negative control) or DMSO (positive control). Data points indicate averages and standard deviations of 48 positive and negative control in an interleafed column layout.

The screen was performed with 30,720 compounds in duplicate using a diversity library. The z'-factor in all screened plates for the lipase assay (DGGR) above 0.5. The z'-factor for the bacterial viability assays was in 94% of the plates above 0.5 and in 6% between 0 and 0.5 (FIG. 2B). 308 hits were obtained that reduced bacterial viability and 263 hits with reduced lipase activity. Focus was placed on hits that showed reduction in lipase activity without interfering with bacterial viability. Hits that showed reduced lipase activity in presence of reduced bacterial viability likely target other essential bacterial processes. In total 161 compounds fulfilled these requirements (FIG. 2C, 2E). The most promising compounds, showing a reduction of more than 40% (85 compounds, FIG. 2E), were chosen to continue with. The screening assay was not designed to distinguish between compounds that inhibit ESX-5 dependent secretion and compound that directly act on the reporter lipase. Therefore, a counter screen was conducted to sort out lipase inhibitors. During the high throughput screening conditions, the bacteria were grown in the presence of the compounds for four days. In this counter screen the bacteria of the screening strain were only incubated for 2 h in the presents of the active compounds, before the lipase activity was measured. During the short incubation time in the counter screen ESX-5 secretion inhibitors would not affect bacterial secretion. Approximately 45% of active compounds in the counter screen caused reduced lipase activity compared to the DMSO control and were considered a lipase (LipY)

inhibitor (FIG. 2D, 2E). These lipase inhibitors were removed from the list, resulting at 47 potential ESX-5 secretion inhibitors.

The list of active compounds was further refined by removing compounds with unfavorable toxicological properties. To examine this the compounds were incubated with human cell culture (THP-1) at 40 µM and added them to zebra fish embryos (20 µM). About half the compounds showed high toxicity, resulting in 23 compounds (FIG. 2E), of which nine compounds showed an effect directly on *M. tuberculosis* growth (FIG. 2E).

Compounds were re-ordered in order to retest the observed effects and to perform additional biochemical analysis. Next, the effect of the compounds on T7 secretion was examined. For this, *M. marinum* cells were grown in the presence of the nine compounds to perform protein secretion analysis. The bacteria were grown for four days in the presence of 20 μM test compounds before the bacteria were harvested to analyze the protein profile of whole cells lysates and proteins secreted into the bacterial culture supernatant. As control bacteria were used treated with DMSO and an esx5 mutant (ΔeccC$_5$+mspA). PE_PGRSs proteins were used as a representative group of ESX-5 substrates, since they represent the largest subclass of PE_proteins, which are secreted by ESX-5. A monoclonal antibody was used that recognizes the repetitive C-terminal domain of these proteins. The cytosolic chaperon GroEL was also included as a marker for bacterial cell lysis, and Apa, which is secreted in an ESX-independent manner.

Out of the nine tested compounds six showed a reduced amount of secreted PE_PGRS proteins (A, I-12, C, D, F and G) as compared to the DMSO control; with compound I-12 having the most drastic decrease (FIG. 4). FIG. 4: Secretion analysis of *M. marinum* WT. Bacterial cells were grown in presence of DMSO or compounds at a concentration of 20 μM for several days. The bacteria were removed by centrifugation and protein content of both fractions was analyzed by Western blotting for representative proteins of secretions pathways: PE_PGRS—ESX-5 dependent, Apa—SEC dependent, EsxA—ESX-1 dependent. GroEL served as control for bacterial lysis. The strain ΔeccC$_5$+mspA was a control for ESX-5 dependent secretion.

Compound I-12 showed a secretion inhibition similar to the non-functional ESX-5 mutant (ΔeccC$_5$+mspA). Compound I-12 did not affect secretion of the ESX independent substrate Apa. On the other hand, compounds D, F and G did show significant reduced amount of Apa, indicating a more general effect on protein secretion. Two of the compounds (A, H) did not show an effect on PE_PGRS secretion, whereas the final compound (E) showed increased secretion of PE_PGRS proteins. Interestingly, also Apa was present in higher amounts for the E-treated sample. Why these compounds show a reduction in surface LipY activity remains somewhat unclear. None of the compounds induced cell leakage, as increased amounts of cytosolic localized GroEL in the supernatant could not be detected.

To investigate whether, in addition to ESX-5, also other ESX systems are affected, the ESX-1 substrate EsxA was probed (FIG. 4). The compounds I-12, D, E, F, G reduced secretion of EsxA (FIG. 4). This means that compound I-12 is the only compound that reduces secretion of the two types T7S secretion (ESX-1 dependent secretion and ESX-5 dependent secretion) without influencing Apa secretion, suggesting a specific mode of action. This compound was therefore chosen for further investigation.

In order to study the effect of compound I-12 on type VII secretion in more detail, the first look was directed at dose response analysis under different conditions. Also, the *M. marinum* WT strain was compared with a strain that is producing the porin mspA (FIG. 5A). FIG. 5A: Dose response analysis of *M. marinum* WT strain expressing either LipY or LipY and mspA in presence of compound I-12. Lipase activity (DGGR) and bacterial viability (REMA) were determined. Data points show average and standard deviation of triplicates. FIG. 5B: Secretion analysis in dose response of *M. marinum* WT expressing mspA. Bacteria were grown in presence of indicated amount of compound I-12. All cultures contain equal amounts of DMSO. Protein content of bacterial fraction and culture supernatant was analyzed by Western blotting. Proteins representative of secretion pathways: PE_PGRS and EsxN—ESX-5 dependent, Apa—SEC dependent, EsxA—ESX-1 dependent. GroEL served as control for bacterial lysis.

Since the expression of mspA alleviates ESX-5 essentiality, it is also expected that mspA would be able to rescue the antibacterial effect of ESX-5 secretion inhibitors. Using WT *M. marinum*, the activity of ESX-5 dependent secretion and bacterial viability were measured using the enzymatic lipase assay and resazurin reduction assay (REMA), respectively. At a concentration of 0.3 μM a significant reduction of lipase secretion as compared to the DMSO treated control was detected. This reduction continued in a dose depended manner. At 10 μM the ESX-5 activity was reduced to 27% of the DMSO treated control and also a significant reduction in bacterial viability (77%) was observed. Importantly, the MIC of compound I-12 towards *M. marinum* increased 2-fold and it requires 4-fold more compound I-12 to significantly reduce viability of *M. marinum* when mspA was over-produced, while the effect on secretion of the reporter lipase LipY showed no changes (FIG. 5A). This indicated that compound I-12 is indeed disrupting the function of ESX-5 dependent secretion. This effect is highly specific, as previous genome-wide transposon mapping on *M. marinum* and *M. marinum* expressing mspA indicated that the ESX-5 dependent secretion system was the only gene cluster that showed a major change in essentiality.

Next, the secretion profile of *M. marinum* overproducing mspA was checked in dose response (FIG. 5B). At a concentration of 10 μM a reduction of ESX-5 substrates EsxN and PE_PGRS proteins was observed. This concentration is different from the activity of compound I-12 in the lipase reporter assay, but these differences were attributed to the relative insensitivity of the secretion analysis assays. Additionally, the reporter lipase LipY belongs to a different class of ESX-5 substrates, which could be affected at a different concentration.

From these experiments it was concluded that compound I-12 inhibits ESX-mediated protein secretion in *M. marinum* and bacterial growth in WT cells. The next question was whether the same activity in other slow-growing mycobacteria and especially *M. tuberculosis* is observable. *M. tuberculosis* is even more sensitive to compound I-12 than *M. marinum* (FIG. 6). Six out of eight slow-growing mycobacteria showed reduced growth in presence of compound I-12. Among the slow-growing mycobacteria *M. avium* and *M. interjectum* are resistant, while *M. marinum, M. kansasii, M. bovis* (BCG) and also *M. tuberculosis* are susceptible to compound I-12 (FIG. 6). FIG. 6: Cell viability assay determining susceptibility of bacterial cultures to compound I-12 using REMA.

If the effect of compound I-12 is specific for ESX dependent secretion systems, this would mean that this compound does not affect fast-growing mycobacteria and other bacteria. For solubility reasons compound I-12 was tested up to a concentration of 80 µM. All tested fast-growing mycobacteria are resistant to the compound up to 80 µM. Furthermore, also *Escherichia coli* and *Bacillus subtilis*, as representative for gram-negative and gram-positive bacteria, respectively, are resistant to the highest tested amount of compound I-12.

For optimization, the structure of compound I-12 was subdivided into three core features. A 4-methoxyphenyl group which is linked to the 3-position of the central thiadiazole heterocycle, which is linked via its thioether-linker to a N-(cyclopentyl)-substituted acetamide on the adjacent side. Removal of the methoxy-moiety on the phenyl group (I-5) resulted in an increase of activity by two-fold. Since the polar methoxy-group is able to form hydrogen bridges, its removal might reduce competitive interactions with non-targeted proteins or it may render the whole molecule more apolar, which would be beneficial for its diffusion through the *M. tuberculosis* cell envelope. When the amide-cyclopentyl ring was reduced to a linear n-propyl group, an activity increase by four-fold (I-3) was achieved. This effect was attributed to the reduction in size/steric bulk, which would improve the uptake of these compounds. Both modification of I-3 and I-5 were combined to obtain compound I-1, which showed an increased activity by eight-fold as compared to compound I-12 when tested on *M. tuberculosis*. All three improved compounds showed a similar increased activity profile in *M. marinum* when tested in the ESX-5 dependent secretion inhibition reporter assay.

Figure 7:
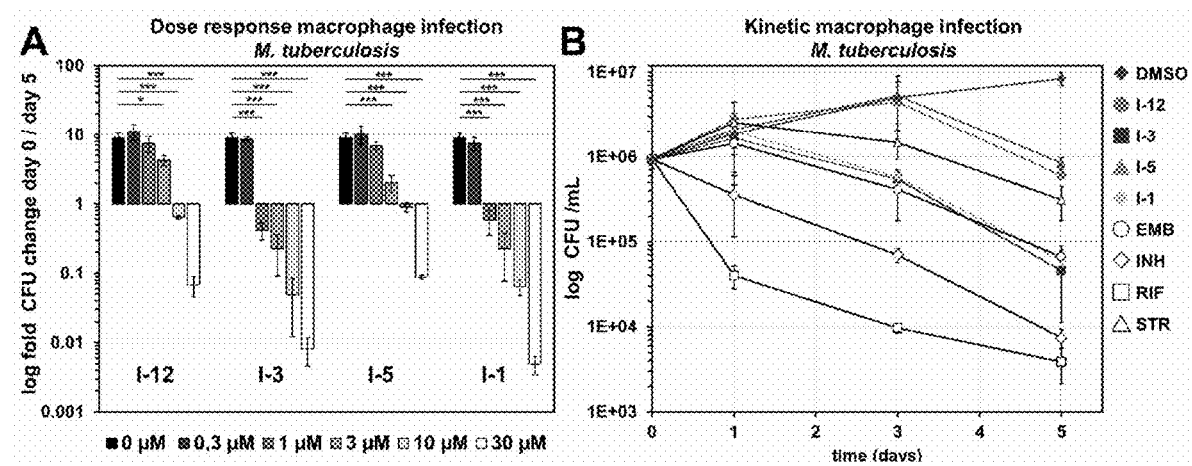
FIG. 7A is a graph showing dose response macrophage infection M. Tuberculosis. Graph shows log fold changes of day 0 (3 h) to day 5.
FIG. 7B is a graph showing CFU kinetic of THP-1 macrophage infection study with M. tuberculosis H37Rv WT at an MOI of I. Macrophages were lysed and plated for CFU count 3 h, 1 day, 3 days and 5 days post infection. As control served the antibiotics ethambutol (EMB), isoniazid (INH), rifampin (RIF) and streptomycin (STR). All compounds and antibiotics were tested at 10 μM.

To determine the anti-bacterial activity of compound I-12 and its derivatives towards intracellular *M. tuberculosis* macrophage infection experiments were conducted. THP-1 monocytes were matured to macrophages and infected with *M. tuberculosis* at an MOI 1. The bacterial load was determined during the time of infection on day 0, 1, 3 and 5 by lysing the macrophages and CFU plating (FIG. 7A,B). FIG. 7A: Macrophage infection study. THP-1 monocytes were differentiated with PMA for 48 h and infected with *M. tuberculosis* H37Rv WT at an MOI of I. Non-phagocytosed bacteria were killed with gentamycin and washed away. Compounds or DMSO were added to the medium 3 h post infection at indicated concentration. The macrophages were lysed after 3 h or 5 days and plated for CFU counting. Graph shows log fold changes of day 0 (3 h) to day 5. Data points represents triplicates with standard deviation. Significant changes in each group compared to DMSO treated control were determined by ANOVA testing. $p>0.05$, not significant, not indicated. $p<0.05=*$, $p<0.01=$, $p<0.001=*$. (B) CFU kinetic of THP-1 macrophage infection study with *M. tuberculosis* H37Rv WT at an MOI of I. Macrophages were lysed and plated for CFU count 3 h, 1 day, 3 days and 5 days post infection. As control served the antibiotics ethambutol (EMB), isoniazid (INH), rifampin (RIF) and streptomycin (STR). All compounds and antibiotics were tested at 10 µM.

As a control served DMSO treated wells. During the time of infection, the amount of bacteria increased by eight-fold compared to the initial inoculum on day 0. In these experiments the activity of compound I-12 and its derivatives followed the same trend as when tested in culture, with compound I-3 and I-1 as the most active compounds. Compound I-12 and I-5 show a significant decrease of bacterial load as compared to the DMSO control at 3 µM. But it required 10 µM of compound to reduce the bacterial load below the initial amount of bacteria that the macrophages were infected with on day 0. The more active derivatives I-3 and I-1 already show a statistical difference to the DMSO control at 1 µM. At 10 µM it was observed that approximately 100-fold reduction of bacteria as compared to the DMSO control. Although, compound I-1 reduced the bacterial load more than I-3, a statistical difference between the intracellular activities of these two compounds could not be found. As additional controls the established first line anti-TB drugs Ethambutol (EMB), Isoniazid (INH), Rifampin (RIF) and Streptomycin (STR) were used. The derivatives I-3 and I-1 showed a higher activity than STR and were as active as EMB.

Figure 8:
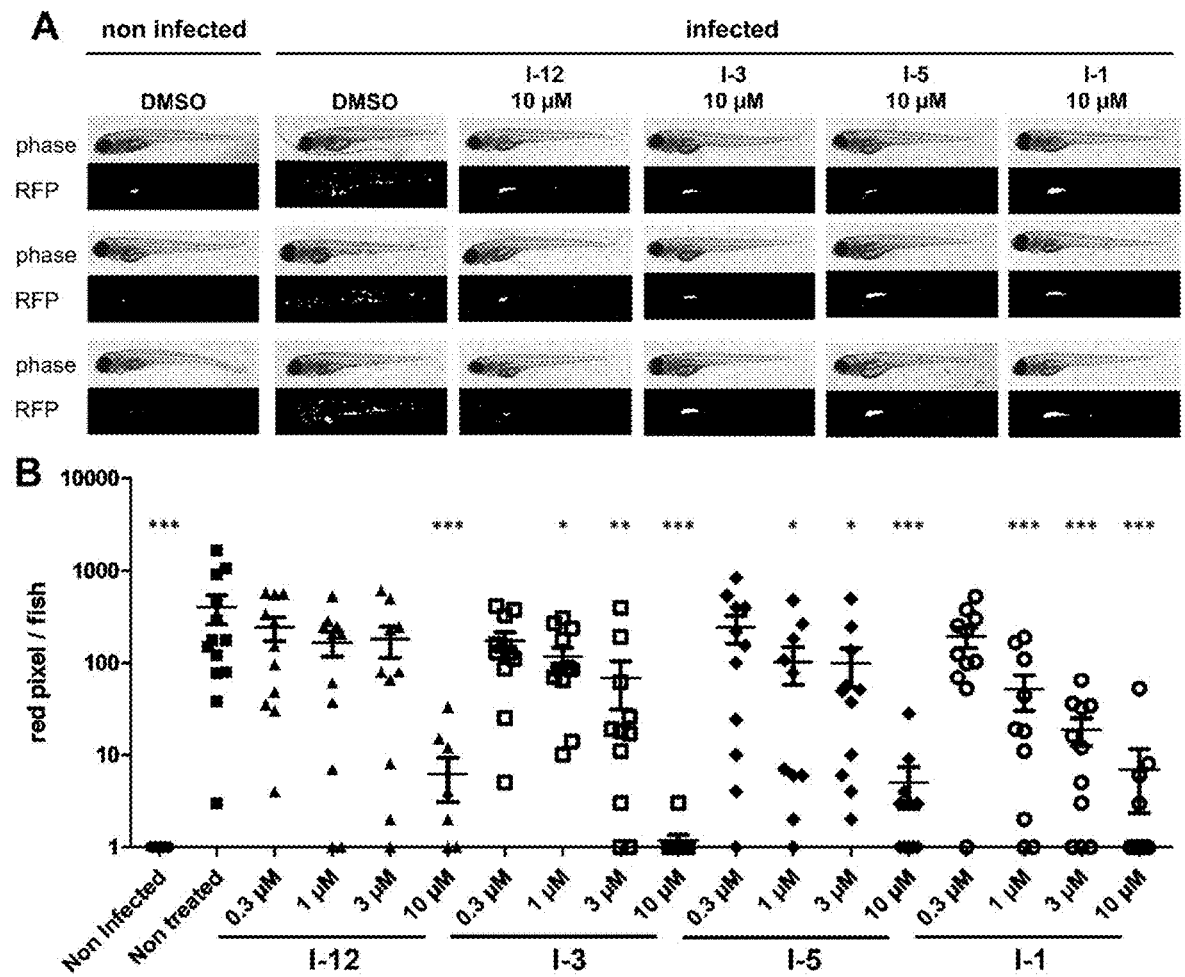
FIG. 8A shows results of zebra fish embryo infection experiments. After 4 days post infection, the fish were imaged on a fluorescent microscope.
FIG. 8B is a graph showing results of zebra fish embryo infection experiments. After 4 days post infection, red pixels were quantified.

To assess anti-bacterial activity of the compounds in an animal model, zebra-fish embryos were infected by injection of WT *M. marinum* into the cardinal vein. The bacteria express rfp, which enables the quantification of infection in vivo by measuring red fluorescence. After injection of the bacteria into the fish, the infection was allowed to establish for 20 h. Then, the test compounds or DMSO control were added for three days before the infection was quantified by measuring fluorescence in each fish. For compound I-12 a significant 50-fold reduction of infection could not be observed as compared to DMSO treated fish when we added 10 µM to the water (FIG. 8A,B). FIG. 8: Zebra fish embryo infection experiments. Dechorionated zebra fish embryos were one day post fertilization infected by microinjection into the cardinal vein with 70 *M. marinum* WT bacteria expressing rfp. 20 h after infection, the compounds were added to the fish water at the indicated concentrations. After 4 days post infection the fish were imaged on a fluorescent microscope (A) and red pixels were quantified (B). As control served non-treated fish and non-infected fish. The fish water of all groups contained equal amounts of DMSO. Each data point represents a single fish. Average of each group and standard error is displayed. Statistical analysis was determined by ANOVA testing by comparing each group to the non-treated group of fish. $p>0.05$, not significant, not indicated. $p<0.05=*$, $p<0.01=$, $p<0.001=*$.

This shows that compound I-12 is active in vivo. The derivatives I-1, I-3, and I-5 showed an even higher in vivo activity, with significant reduction of infection starting from 1 µM. It was also observed that a dose responsive in vivo activity of these compounds in fish. The best results were observed for 10 µM of compound I-3, which resulted in reduction of bacterial fluorescence to background levels, suggesting a complete clearance of the infection.

Figure 9:
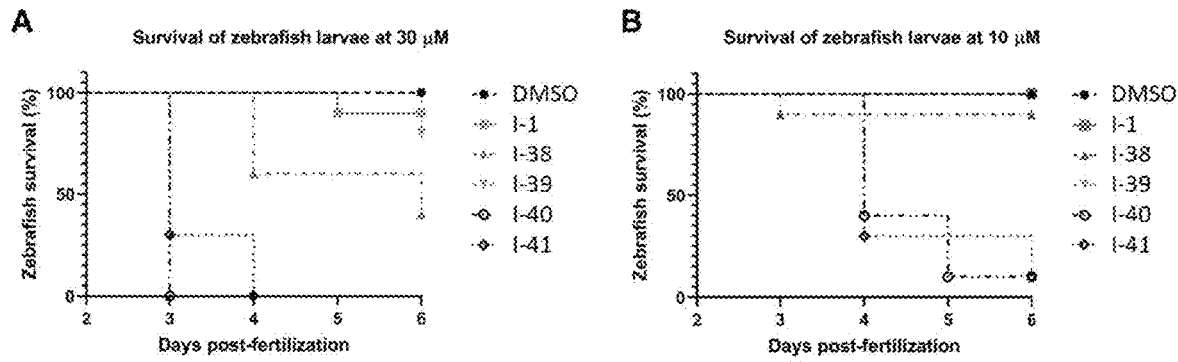
FIG. 9A is a graph showing results of exposing zebrafish larvae to control or compounds (I-38, I-39, I-40, I-41) diluted in water after 1 day post-fertilization at 30 μM.
FIG. 9B is a graph showing results of exposing zebrafish larvae to control or compounds (I-38, I-39, I-40, I-41) diluted in water after 1 day post-fertilization at 10 μM.

To assess the toxicity of several compounds known in the art, four compounds from Maddry et al. (2009) were selected for use in an animal model. These compounds are I-38, I-39, I-40 and I-41. The toxicity was compared to a DMSO control and compound I-1. Ten zebrafish embryos per group were exposed to control or compound(s) diluted in water after 1 day post-fertilization at 10 µM (FIG. 9B) or 30 µM (FIG. 9A). Survival of the zebra fish embryos was tracked daily over 5 days and scored by heartbeat. As can be concluded from both figures, comparative compounds I-40 and I-41 are toxic. Whereas comparative compound I-38 is somewhat less toxic than I-40 and I-41, I-39 is the least toxic of the comparative compounds. Despite I-39 being the least toxic of the comparative compounds, it is outperformed by I-1, for example, in terms of activity.

Figure 10:
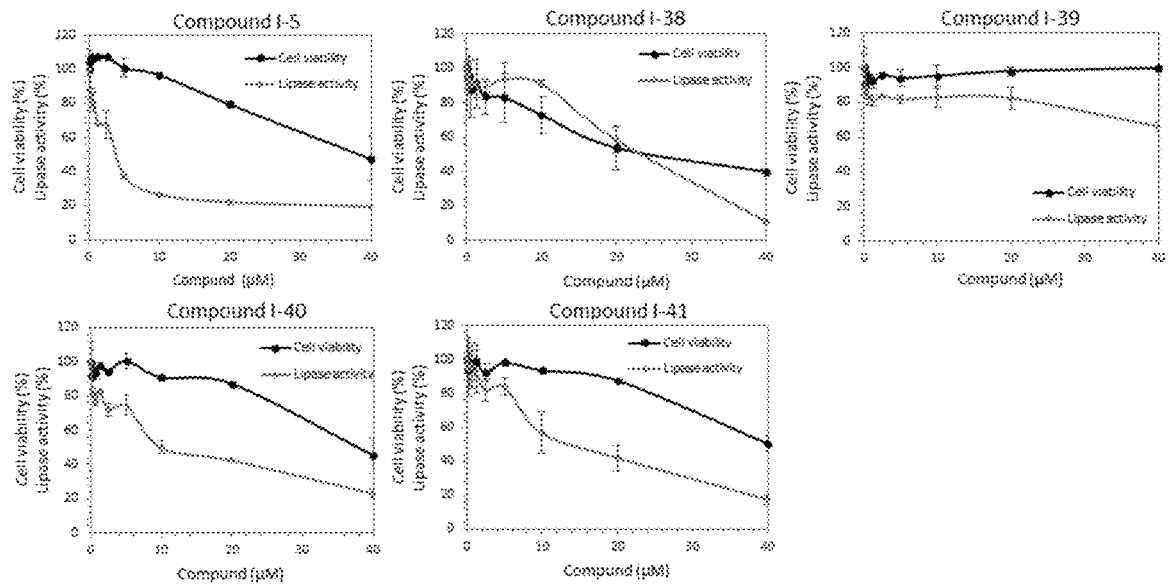
FIG. 10 are graphs showing results of M. marinum overexpressing the reporter lipase LipY cultured in the presence of compounds I-5, I-38, I-39, I-40 and I-41 in dose response for 4 days.

To assess how several compounds known in the art affect ESX-5 dependent secretion, four compounds: I-38, I-39, I-40 and I-41 from Maddry et al. (2009), were synthesized and subjected to an ESX-5 activity assay. *M. marinum* overexpressing the reporter lipase LipY was cultured in the presence of compounds I-5, I-38, I-39, I-40 and I-41 in dose response for 4 days (FIG. 10). An ESX-5 inhibitor should first show a significant reduction in lipase activity (substrate DGGR) before the bacterial viability (REMA) is affected, as can be seen for positive control compound I-5. Compounds I-40 and I-41 affect ESX-5 secretion activity as well. However, compounds I-38 and I-39 do not affect the activity of ESX-5, which indicates that they act via a different mode of action, i.e., affect a non-ESX related target. In FIG. 10, the error bars represent standard deviations of duplicates.

In order to identify the molecular target of compound I-12, the resistant mutants in *M. tuberculosis* was raised by exposing the bacteria to sub-lethal concentrations of compound I-12, which were stepwise increased when observing growth of bacteria. After several rounds of sub culturing, *M. tuberculosis* strains were grown in presence of 80 μM compound I-12, an increase of 64-fold compared to the susceptible WT strain of *M. tuberculosis*. Three strains were streaked for single colonies, grown to high density and chromosomal DNA was isolated. The bacterial genome was sequenced and compared to WT. All three strains contained mutations in the gene ru3854c, ethA. In order to investigate whether mutations in ethA is the predominant mechanism of resistance, the genomic region of ethA and its regulator ethR (promotor ethA/CDS ethA, promotor ethR/CDS ethR) was amplified and sequenced in 12 additional resistant *M. tuberculosis* strains. The genome of all sequenced strains contained mutations in the ethA/ethR region. In parallel, a random transposon library of *M. bovis BCG* (30,000 Tn mutants) was exposed to compound I-12 and resistant transposon mutants were selected on solid medium containing 80 μM compound I-12. The transposon insertion site of 12 mutants was determined. All strains contained transposon insertions in the gene ethA.

The gene product EthA is Baeyer Villiger monooxygenase, well characterized and known to oxidize the sulfur atoms of small molecules such as the anti TB drugs ethionamide (ETH). Since compound I-12 contains sulfur atoms it seemed that also compound I-12 is a prodrug, activated by EthA. These findings were confirmed by overexpression of ethA in *M. marinum* and *M. tuberculosis*. In both strains this led to an increased susceptibility by at least 4-fold as compared to the parent WT strains. Interestingly, overexpression of ethA in *M. smegmatis* did not render this strain susceptible to compound I-12, suggesting that the molecular target of compound I-12 is not encoded in the genome of fast-growing mycobacteria or is not essential for bacterial growth.

Each molecule of compound I-12 and its derivatives with increased activity (I-1, I-3, I-5) contain two sulfur atoms that could possibly get oxidized by ethA, one exocyclic sulfur atom and one endocyclic sulfur atom in the thiadiazole moiety. In order to investigate which sulfur atom is oxidized by EthA, each sulfur atom was iteratively replaced with an oxygen and determined the antibacterial activity of those compounds in WT *M. tuberculosis* and WT overexpressing ethA. Only compounds containing the exocyclic sulfur atoms (I-28) showed an increased activity in the ethA overexpression strain compared to WT *M. tuberculosis*, indicating that EthA is oxidizing and activating compound I-12 on the exo-cyclic sulfur atom.

As a control a sulfur free compound in which both sulfur atoms were replaced with oxygens was synthesized (I-31) and tested. This compound did not show an increased activity in the ethA overexpression strain. However, compound I-31 still inhibited growth of *M. tuberculosis* at 10 μM indicating that compound I-12 is still showing anti-bacterial activity in its non-ethA-activated form.

To assess the pharmacokinetic properties of the described compounds, the solubility of compounds I-1 to I-42 was calculated (Table 2). The method used is ALOGPS 2.1, VCCLAB, Virtual Computational Chemistry Laboratory (http://www.vcclab.org, 2005; Tetko, I. V. et al., *J. Comput. Aid. Mol. Des.* 2005, 19, 453-63). The obtained LogP values, the partition coefficients in 1-octanol/water, are used as a measure to determine drug distribution in the human body. The calculated values range from 2.27 for compound I-4 to 4.12 for compound I-25, and conform to the reported guidelines for LogP values, which are optimally smaller than 5 for oral bioavailability (Lipinski, C. A. et al., *Adv. Drug Deliv. Rev.* 1997, 23(1-3), 3-25).

To assess the metabolic stability of the drugs in the human body, selected compounds I-1, I-3, I-5, I-33, I-35, I-36 and I-37 were incubated with human liver microsomes for 30 minutes at 37° C., after which the remaining amount of compound was quantitatively determined by LC-MS (Table 3). It shows that these compounds are relatively slowly converted by the human liver enzymes, with the exception of I-3.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

Hereinafter, the invention will be illustrated in more detail, according to specific examples. However, the invention may be embodied in many different forms and should not be construed as being limited to the embodiments set forth herein. Rather, these example embodiments are provided so that this description will be thorough and complete, and will fully convey the scope of the invention to those skilled in the art.

EXAMPLES

Assay Used to Measure Inhibition of Tuberculosis

The inhibitory properties of the compounds to T7S protein secretion, especially ESX-mediated protein secretion, in slow growing mycobacteria were measured. In particular, the antibacterial activity was tested against replicating *M. tuberculosis* in culture/resazurin microtiter assay (REMA). The bacteria were grown in medium (Middlebrook 7H9 glycerol, supplemented with 10% (v/v) ADS (bovine serum albumin (50 g/l), dextrose (20 g/l), sodium chloride (8.5 g/l)) and 0.02% (v/v) tyloxapol) to mid-logarithmic phase ($OD_{600}$ 0.6-1.8). Compound stock solutions (10 mM) in DMSO were serial diluted in medium in microtiter plates and bacteria were added into each microtiter well to a final optical density ($OD_{600}$) of 0.001. Control wells contained either no compounds or only medium and no bacteria. The lids of the microtiter plates were sealed using adhesive tape and the plates were incubated static at 37° C. for seven days. Development solution (resazurin sodium salt in purified water 0.1% (w/v)) was added to each well (1:10) and incubation continued at 37° C. overnight. Then, medium containing dye was transferred into a microtiter plate containing 10% buffered formalin. The fluorescence in each well was determined using a plate reader (Synergy H1 BioTek, monochromators, excitation 560 nm/emission 590 nm, bottom reading mode). The average background fluorescence of wells containing only medium was subtracted from all wells containing bacteria. Bacterial viability in each well was determined by setting the average of the control containing no compounds to 100% bacterial viability and calculating the bacterial viability in the other wells assuming proportionality. The $IC_{50}$ values were determined by non-linear regression. The highest compound concentration that reduced bacterial viability to lower than 10% was called $IC_{90}$.

Compound Synthesis

Commercially available reagents and solvents were used as received, unless stated otherwise. Experiments under an atmosphere of dry nitrogen were performed using standard Schlenk-line techniques. Nuclear magnetic resonance (NMR) spectra were recorded on a Bruker Avance 500 ($^{1}H$, 500.23 MHz; $^{13}C$, 125.78 MHz; $^{19}F$, 470.66 MHz; room temperature) or a Bruker Avance 600 instrument ($^{1}H$, 600.13 MHz; $^{13}C$, 150.90 MHz; room temperature). $^{1}H$ spectra and $^{13}C\{^{1}H\}$ spectra were internally referenced to residual solvent resonances ($CDCl_3$, $\delta(^{1}H)$ 7.26, $\delta(^{13}C\{^{1}H\})$ 77.16). Chemical shifts (δ) are reported in ppm and coupling constants (J) are quoted in hertz (Hz). Melting points were recorded on a Büchi M-565 melting point apparatus and are uncorrected. High-resolution electrospray ionization (ESI) mass spectrometry was carried out with a Bruker micrO-TOF-Q instrument in positive ion mode (capillary potential of 4500 V). Infrared spectra were recorded neat on a Shimadzu FT-IR 8400S spectrophotometer and wavelengths are reported in $cm^{-1}$. Signal intensities are described as weak (w; >80%), medium (m; >80%, <60%) and strong (s; >60%). Flash chromatography was performed on Silicycle Silica-P Flash Silica Gel (particle size 40-63 μm, pore diameter 60 Å) using the indicated eluent. Thin Layer Chromatography (TLC) was performed using TLC plates from Merck (SiO2, Kieselgel 60 F254 neutral, on aluminium with fluorescence indicator). 2-Chloroacetamides (Van Dijk, T. et al., *Organometallics* 2016, 35(5), 827-835) and 3-aryl-1,2,4-thiadiazole-5-thiols (WO-A-2013/074059, DE-A-2 050 346) were prepared according to procedures common in literature. 2-Iodoacetamides were prepared from 2-chloroacetamides by chloride/iodide exchange (Dufour, M. et al., *Synth. Commun.* 1992, 22(2), 189-200).

I-1

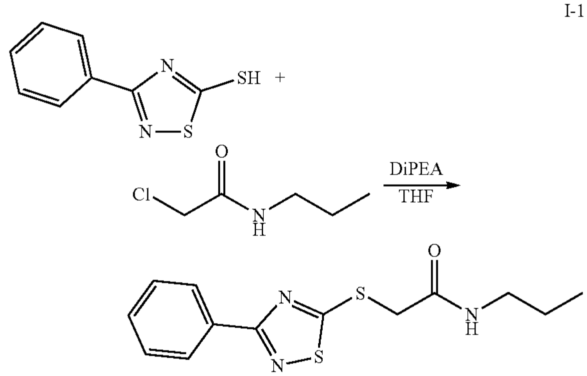

(N-(n-propyl))-2-chloroacetamide (16 mg, 0.12 mmol, 1.0 eq.) was dissolved in THF (3 mL), to which 3-phenyl-1,2,4-thiadiazole-5-thiol (23 mg, 0.12 mmol, 1.0 eq.) was added, after which N,N-diisopropylethylamine (0.03 mL, 0.17 mmol, 1.4 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-1 as an off-white solid (29 mg, 0.10 mmol, 82%). If necessary, any remaining impurities may be washed off with pentane (10 mL). Mp: 103.7° C. $^{1}H$-NMR (500.23 MHz, $CDCl_3$): δ 8.29-8.19 (m, 2H, m-ArH), 7.52-7.44 (m, 3H, o,p-ArH), 7.01 (br. s, 1H, NH), 4.00 (s, 2H, S—$CH_2$), 3.23 (dd, 14.5, 6.8 Hz, 2H, N—$CH_2$), 1.46 (sex., 7.3 Hz, 2H, $CH_2$—$CH_3$), 0.81 (t, 7.5 Hz, 3H, $CH_2$—$CH_3$). $^{13}C\{^{1}H\}$-NMR (125.78 MHz, $CDCl_3$): δ 186.2 (s, SCS), 171.9 (s, NCN), 167.2 (s, CO), 132.0 (s, C—$CN_2$), 130.9 (s, p-ArC), 129.0 (s, o-ArC), 128.2 (s, m-ArC), 41.8 (s, NH—$CH_2$), 37.1 (s, S—$CH_2$), 22.7 (s, NH—$CH_2$—$CH_2$), 11.4 (s, $CH_2$—$CH_3$). FT-IR: ν s 3286.5 (w), 3078.2 (w), 2966.3 (w), 2958.6 (w), 2918.1 (w), 1651.0 (m), 1546.8 (m), 1465.8 (m), 1433.0 (s), 1380.9 (w), 1319.2 (m), 1296.1 (w), 1278.7 (m), 1249.8 (w), 1224.7 (w), 1172.6 (w), 1153.4 (w), 1110.9 w), 1070.4 (w), 1043.4 (m), 1026.1 (w), 999.1 (w), 947.0 (w), 927.7 (w), 896.8 (w), 856.3 (w), 815.8 (w), 779.2 w), 748.3 (w), 704.0 (s), 690.5 (s), 657.7 (w), 646.1 (m), 624.9 (w), 574.8 (w), 559.3 (w), 520.7 (w), 486.0 (w), 476.4 (w), 455.2 (w), 428.2 (w). HRMS (ESI-Q-TOF): calcd. for [Na ($C_{13}H_{15}N_3OS_2$)]: 316.0549; found: 316.0535.

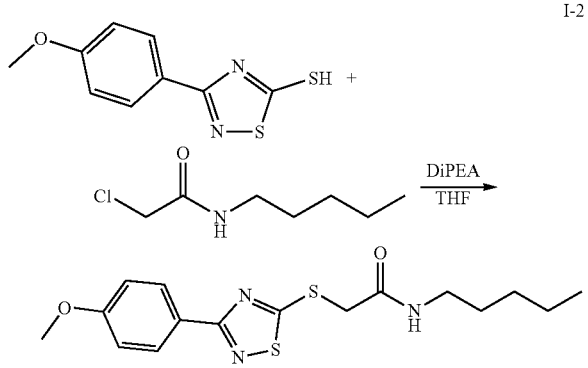

I-2

(N-(n-pentyl))-2-chloroacetamide (16 mg, 0.10 mmol, 1.0 eq.) was dissolved in THF (3 mL), to which 3-(4-methoxyphenyl)-1,2,4-thiadiazole-5-thiol (22 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-2 as a white solid (24 mg, 0.07 mmol, 68%). If necessary, any remaining impurities may be washed off with pentane (10 mL). $^1$H-NMR (500.23 MHz, CDCl$_3$): δ 8.20-8.14 (m, 2H, m-ArH), 7.05 (br. s, 1H, NH), 7.01-6.96 (m, 2H, o-ArH), 3.99 (s, 2H, S—CH$_2$), 3.88 (s, 3H, O—CH$_3$), 3.25 (dd, J$_{HH}$=5.7 Hz, 7.0 Hz, 2H, N—CH$_2$), 1.46-1.39 (m, 2H, CH$_2$CH$_2$), 1.23-1.10 (m, 4H, CH$_2$CH$_2$), 0.78-0.74 (m, 3H, CH$_2$—CH$_3$). $^{13}$C{$^1$H}-NMR (125.78 MHz, CDCl$_3$): δ 185.8 (s, SCS), 171.7 (s, NCN), 167.3 (s, CO), 161.7 (s, CH$_3$—O—C), 129.9 (s, m-ArC), 125.0 (s, C—CN$_2$), 114.3 (s, o-ArC), 55.5 (s, O—CH$_3$), 40.1 (s, NH—CH$_2$), 37.0 (s, S—CH$_2$), 29.1 (s, CH$_2$CH$_2$), 29.0 (s, CH$_2$CH$_2$), 22.4 (s, CH$_2$CH$_2$), 14.0 (s, CH$_2$—CH$_3$). HRMS (ESI-Q-TOF): calcd. for [C$_{16}$H$_{22}$N$_3$O$_2$S$_2$]: 352.1148; found: 352.1140.

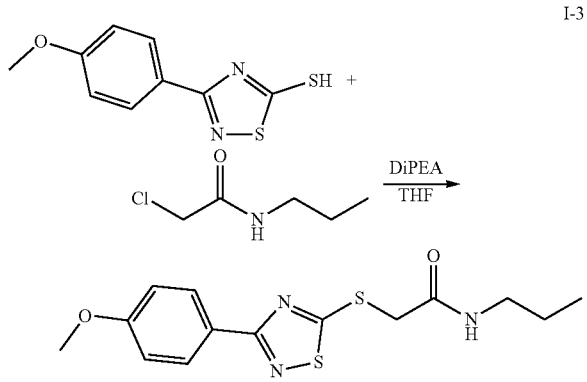

I-3

(N-(n-propyl))-2-chloroacetamide (15 mg, 0.11 mmol, 1.0 eq.) was dissolved in THF (3 mL), to which 3-(4-methoxyphenyl)-1,2,4-thiadiazole-5-thiol (25 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-3 as a light orange solid (33 mg, 0.10 mmol, 93%). If necessary, any remaining impurities may be washed off with pentane (10 mL). Mp: 112.3-115.7° C. $^1$H-NMR (500.23 MHz, CDCl$_3$): δ 8.20-8.15 (m, 2H, ArH), 7.05 (br. s, 1H, NH), 7.00-6.96 (m, 2H, ArH), 3.99 (s, 2H, S—CH$_2$), 3.88 (s, 3H, O—CH$_3$), 3.23 (dd, J$_{HH}$=14.3, 7.0 Hz, 2H, NH—CH$_2$), 1.46 (sex., J$_{HH}$=7.3 Hz, 2H, NH—CH$_2$—CH$_2$), 0.81 (t, J$_{HH}$=7.3 Hz, 3H, CH$_2$—CH$_3$). $^{13}$C{$^1$H}-NMR (125.78 MHz, CDCl$_3$): δ 185.8 (s, SCS), 171.7 (s, NCN), 167.3 (s, CO), 161.7 (s, CH$_3$—O—C), 129.9 (s, ArCH), 125.0 (s, C—CN$_2$), 114.3 (s, ArCH), 55.5 (s, O—CH$_3$), 41.8 (s, NH—CH$_2$), 37.0 (s, S—CH$_2$), 22.7 (s, NH—CH$_2$—CHO), 11.4 (s, CH$_2$—CH$_3$). FT-IR: v=3290.3 (m), 3085.9 (w), 2972.1 (w), 2923.9 (w), 2875.7 (w), 2858.3 (w), 2841.0 (w), 1647.1 (s), 1606.6 (s), 1581.5 (w), 1550.7 (m), 1519.8 (m), 1454.2 (s), 1415.7 (s), 1392.5 (m), 1328.9 (m), 1301.9 (m), 1276.8 (s), 1244.0 (s), 1168.8 (s), 1149.5 (m), 1105.1 (m), 1078.1 (w), 1047.3 (s), 1028.0 (s), 958.6 (w), 893.0 (w), 835.1 (s), 810.1 (m), 785.0 (m), 744.5 (s), 725.2 (m), 696.3 (s), 684.7 (m), 646.1 (w), 594.0 (s), 572.8 (m), 557.4 (m), 528.5 (m), 513.0 (m), 491.8 (w). HRMS (ESI-Q-TOF): calcd. for [Na(C$_{14}$H$_{17}$N$_3$O$_2$S$_2$)]: 346.0654; found: 346.0644.

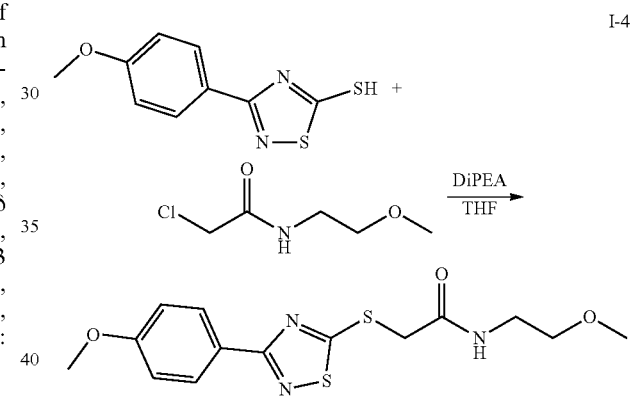

I-4

(N-(2-methoxyethyl))-2-chloroacetamide (16 mg, 0.11 mmol, 1.0 eq.) was dissolved in THF (3 mL), to which 3-(4-methoxyphenyl)-1,2,4-thiadiazole-5-thiol (25 mg, 0.11 mmol, 1.0 eq.) was added, after which N,N-diisopropylethylamine (0.03 mL, 0.17 mmol, 1.5 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-4 as a light-yellow solid (23 mg, 0.07 mmol, 64%). If necessary, any remaining impurities may be washed off with pentane (10 mL). $^1$H-NMR (500.23 MHz, CDCl$_3$): δ 8.22-8.18 (m, 2H, m-ArH), 7.30 (br. s, 1H, NH), 7.00-6.96 (m, 2H, o-ArH), 4.01 (s, 2H, S—CH$_2$), 3.88 (s, 3H, ArO—CH$_3$), 3.45 (q, J$_{HH}$=4.5 Hz, 2H, N—CH$_2$), 3.38-3.35 (t, 2H, N—CH$_2$CH$_2$), 3.11 (s, 3H, N—CH$_2$OCH$_3$). $^{13}$C{$^1$H}-NMR (125.78 MHz, CDCl$_3$): δ 185.6 (s, SCS), 171.8 (s, NCN), 167.5 (s, CO), 161.7 (s, CH$_3$—O—C), 130.0 (s, m-ArC), 125.1 (s, C—CN$_2$), 114.2 (s, o-ArC), 70.9 (s, N—CH$_2$CH$_2$), 58.8 (s, N—CH$_2$OCH$_3$), 55.5 (s, ArO—CH$_3$), 39.8 (s, N—CH$_2$), 6.9 (s, S—CH$_2$). HRMS (ESI-Q-TOF): calcd. for [C$_{14}$H$_{18}$N$_3$O$_3$S$_2$]: 340.0784; found: 340.0771.

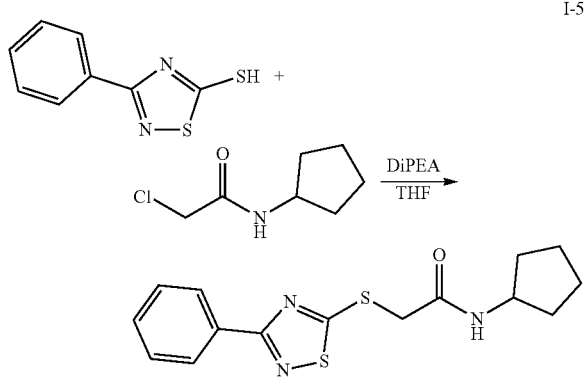

(N-cyclopentyl)-2-chloroacetamide (20 mg, 0.12 mmol, 1.0 eq.) was dissolved in THF (3 mL), to which 3-phenyl-1,2,4-thiadiazole-5-thiol (24 mg, 0.12 mmol, 1.0 eq.) was added, after which N,N-diisopropylethylamine (0.03 mL, 0.17 mmol, 1.4 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-5 as a white solid (37 mg, 0.12 mmol, 97%). If necessary, any remaining impurities may be washed off with pentane (10 mL). Mp: 138.9° C. $^1$H-NMR (500.23 MHz, CDCl$_3$): δ 8.28-8.21 (m, 2H, m-ArH), 7.51-7.46 (m, 3H, o,p-ArH), 7.02 (br. s, 1H, NH), 4.23-4.15 (m, 1H, N(H)—CH), 3.96 (s, 2H, S—CH$_2$), 1.94-1.86 (m, 2H, CH—(C(H)H)$_2$), 1.54-1.44 (m, 4H, CH—(CH$_2$—CH$_2$)$_2$), 1.37-1.27 (m, 2H, CH—(C(H)H)$_2$)). $^{13}$C{$^1$H}-NMR (125.78 MHz, CDCl$_3$): δ 186.3 (s, SCS), 171.8 (s, NCN), 166.8 (s, CO), 132.0 (s, C—CN$_2$), 130.9 (s, p-ArC), 129.0 (s, o-ArC), 128.2 (s, m-ArC), 51.8 (s, N(H)—CH), 37.2 (s, S—CH$_2$), 33.0 (s, CH—CH$_2$), 23.7 (s, CH—(CH$_2$—CH$_2$)$_2$). FT-IR: ν=3286.5 (m), 3240.2 (w), 3072.4 (w), 2960.5 (w), 2943.2 (w), 2922.0 (w), 2868.0 (w), 1635.5 (s), 1544.9 (s), 1467.7 (s), 1434.9 (s), 1386.7 (w), 1321.2 (s), 1294.2 (w), 1280.7 (s), 1230.5 (w), 1190.0 (w), 1176.5 (w), 1114.8 (m), 1070.4 (w), 1047.3 (s), 1028.0 (m), 979.8 (w), 925.8 (w), 898.8 (m), 810.1 (w), 779.2 (m), 734.8 (w), 698.2 (s), 686.6 (s), 648.0 (m), 567.0 (w), 553.5 (m), 516.9 (w), 501.5 (w), 472.5 (w), 457.1 (w). HRMS (ESI-Q-TOF): calcd. for [Na(C$_{15}$H$_{17}$N$_3$OS$_2$)]: 342.0705; found: 342.0688.

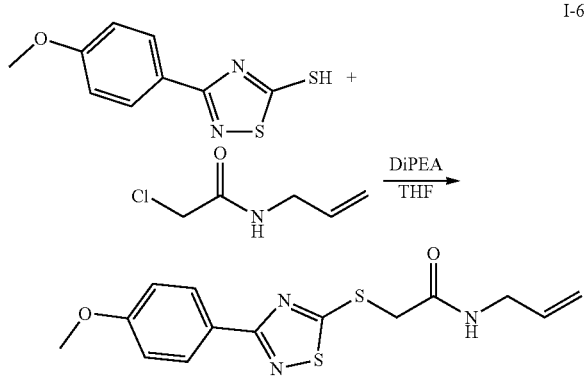

(N-allyl)-2-chloroacetamide (16 mg, 0.12 mmol, 1.0 eq.) was dissolved in THF (3 mL), to which 3-(4-methoxyphenyl)-1,2,4-thiadiazole-5-thiol (27 mg, 0.12 mmol, 1.0 eq.) was added, after which N,N-diisopropylethylamine (0.03 mL, 0.17 mmol, 1.4 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-6 as a white solid (16 mg, 0.06 mmol, 45%). If necessary, any remaining impurities may be washed off with pentane (10 mL). $^1$H-NMR (500.23 MHz, CDCl$_3$): δ 8.18-8.13 (m, 2H, m-ArH), 7.20 (br. s, 1H, NH), 7.00-6.95 (m, 2H, o-ArH), 5.78 (ddt, $J_{HH}$=17.2, 10.2, 5.6 Hz, 1H, CH$_2$—CH), 5.12 (dq, $J_{HH}$=17.2, 1.4 Hz, 1H, CH—CH$_2$), 5.07 (dq, $J_{HH}$=10.2 Hz, 1.4 Hz, 1H, CH—CH$_2$), 4.01 (s, 2H, S—CH$_2$), 3.91, (tt, $J_{HH}$=5.7, 1.5 Hz, 2H, N—CH$_2$), 3.88 (s, 3H, O—CH$_3$). $^{13}$C{$^1$H}-NMR (125.78 MHz, CDCl$_3$): δ 185.7 (s, SCS), 171.8 (s, NCN), 167.3 (s, CO), 161.8 (s, CH$_3$—O—C), 133.6 (s, CH$_2$—CH), 130.0 (s, m-ArC), 125.0 (s, C—CN$_2$), 116.9 (s, CH—CH$_2$), 114.3 (s, o-ArC), 55.6 (s, O—CH$_3$), 42.4 (s, N—CH$_2$), 37.1 (s, S—CH$_2$). HRMS (ESI-Q-TOF): calcd. for [C$_{14}$H$_{16}$N$_3$O$_2$S$_2$]: 322.0678; found: 322.0663.

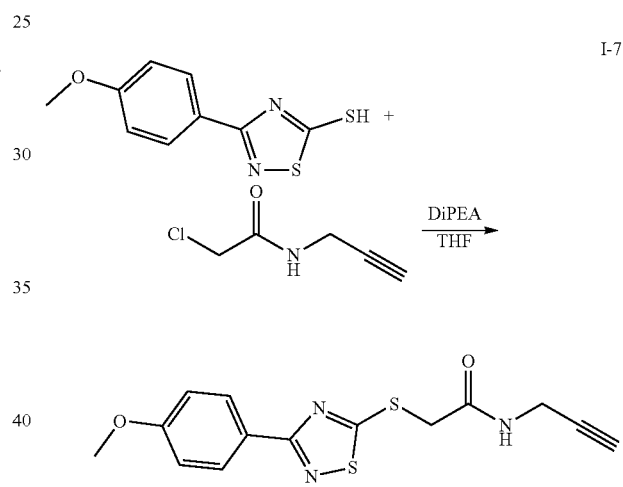

(N-propargyl)-2-chloroacetamide (17 mg, 0.12 mmol, 1.0 eq.) was dissolved in THF (3 mL), to which 3-(4-methoxyphenyl)-1,2,4-thiadiazole-5-thiol (27 mg, 0.12 mmol, 1.0 eq.) was added, after which N,N-diisopropylethylamine (0.03 mL, 0.17 mmol, 1.4 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-7 as a white solid (21 mg, 0.07 mmol, 57%). If necessary, any remaining impurities may be washed off with pentane (10 mL). $^1$H-NMR (500.23 MHz, CDCl$_3$): δ 8.21-8.16 (m, 2H, m-ArH), 7.53 (br. s, 1H, NH), 7.00-6.95 (m, 2H, o-ArH), 4.07 (dd, $J_{HH}$=2.6 Hz, 1H, NCH$_2$), 3.99 (s, 2H, S—CH$_2$), 3.88 (s, 3H, O—CH$_3$), 2.15 (t, $J_{HH}$=2.6 Hz, 1H, CCH). $^{13}$C{$^1$H}-NMR (125.78 MHz, CDCl$_3$): δ 185.7 (s, SCS), 171.7 (s, NCN), 167.4 (s, CO), 161.8 (s, CH$_3$—O—C), 130.0 (s, m-ArC), 124.9 (s, C—CN$_2$), 114.2 (s, o-ArC), 78.9 (s, CCH), 72.3 (s, CCH), 55.5 (s, O—CH$_3$), 36.8 (s, S—CH$_2$), 29.9 (s, N—CH$_2$). HRMS (ESI-Q-TOF): calcd. for [C$_{14}$H$_{14}$N$_3$O$_2$S$_2$]: 320.0522; found: 320.0507.

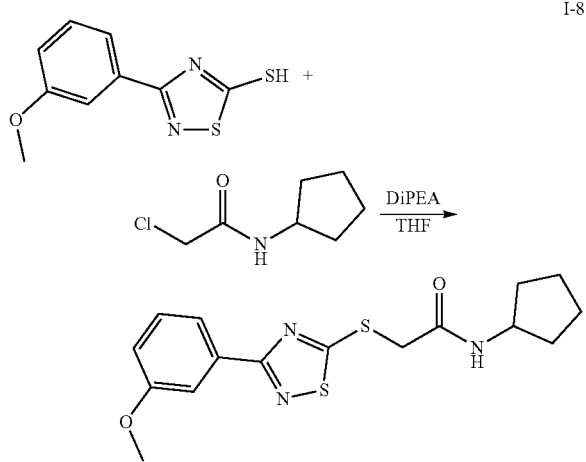

(N-cyclopentyl)-2-chloroacetamide (16 mg, 0.10 mmol, 1.0 eq.) was dissolved in THF (3 mL), to which 3-(3-methoxyphenyl)-1,2,4-thiadiazole-5-thiol (23 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated. The resulting solid was purified by column chromatography (eluent: 3:7 EtOAc:cyclohexane; R$_f$=0.23) and evaporated to provide I-8 as a white solid (2 mg, 0.01 mmol, 6%). If necessary, any remaining impurities may be washed off with pentane (10 mL). $^1$H-NMR (500.23 MHz, CDCl$_3$): δ 7.83 (dt, J$_{HH}$=7.8, 1.1 Hz, 1H, ArCH), 7.78 (dd, J$_{HH}$=2.7, 1.5 Hz, 1H, ArCH), 7.40 (t, J$_{HH}$=8.0 Hz, 1H, ArCH), 7.04 (ddd, J$_{HH}$=8.3, 2.7, 0.9 Hz, 1H, ArCH), 6.98 (br. d, J$_{HH}$=4.7 Hz, 1H, NH), 4.23-4.15 (m, 1H, N(H)—CH), 3.96 (s, 2H, S—CH$_2$), 3.90 (s, 3H, O—CH$_3$), 1.96-1.86 (m, 2H, CH—(C(H)H)$_2$), 1.54-1.46 (m, 4H, CH—(CH$_2$—CH$_2$)$_2$), 1.37-1.27 (m, 2H, CH—(C(H)H)$_2$)). $^{13}$C{$^1$H}-NMR (125.78 MHz, CDCl$_3$): δ 186.3 (s, SCS), 171.7 (s, NCN), 166.8 (s, CO), 160.0 (s, C—OCH$_3$), 133.2 (s, C—CN$_2$), 130.0 (s, ArC), 120.8 (s, ArC), 117.2 (s, ArC), 113.0 (s, ArC), 130.9 (s, p-ArC), 129.0 (s, o-ArC), 128.2 (s, m-ArC), 55.6 (s, OCH$_3$), 51.8 (s, N(H)—CH), 37.2 (s, S—CH$_2$), 33.0 (s, CH—CH$_2$), 23.7 (s, CH—(CH$_2$—CH$_2$)$_2$). HRMS (ESI-Q-TOF): calcd. for [C$_{16}$H$_{20}$N$_3$O$_2$S$_2$]: 350.0991; found: 350.0975.

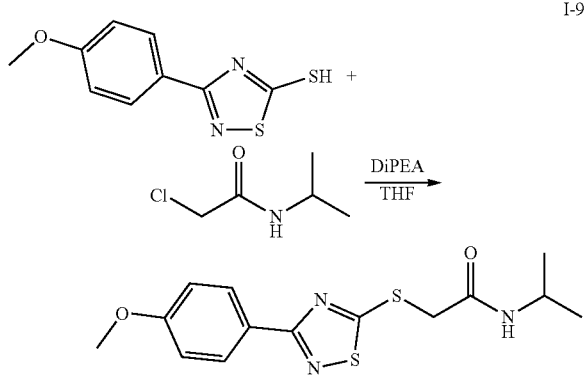

(N-(iso-propyl))-2-chloroacetamide (15 mg, 0.11 mmol, 1.0 eq.) was dissolved in THF (3 mL), to which 3-(4-methoxyphenyl)-1,2,4-thiadiazole-5-thiol (25 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-9 as a white solid (32 mg, 0.10 mmol, 90%). If necessary, any remaining impurities may be washed off with pentane (10 mL). $^1$H-NMR (500.23 MHz, CDCl$_3$): δ 8.20-8.16 (m, 2H, m-ArH), 7.01-6.96 (m, 2H, o-ArH), 6.89 (br. s, 1H, NH), 4.06 (sext, J$_{HH}$=6.7 Hz, 1H, N—CH), 3.95 (s, 2H, S—CH$_2$), 3.88 (s, 3H, O—CH$_3$), 1.09 (d, J$_{HH}$=6.6 Hz, 6H, CH—CH$_3$). $^{13}$C{$^1$H}-NMR (125.78 MHz, CDCl$_3$): δ 185.8 (s, SCS), 171.7 (s, NCN), 166.4 (s, CO), 161.8 (s, CH$_3$—O—C), 129.9 (s, m-ArC), 125.0 (s, C—CN$_2$), 114.3 (s, o-ArC), 55.6 (s, O—CH$_3$), 42.1 (s, N—CH), 37.3 (s, S—CH$_2$), 22.7 (s, CHCH$_3$). HRMS (ESI-Q-TOF): calcd. for [C$_{14}$H$_{18}$N$_3$O$_2$S$_2$]: 324.0835; found: 324.0827.

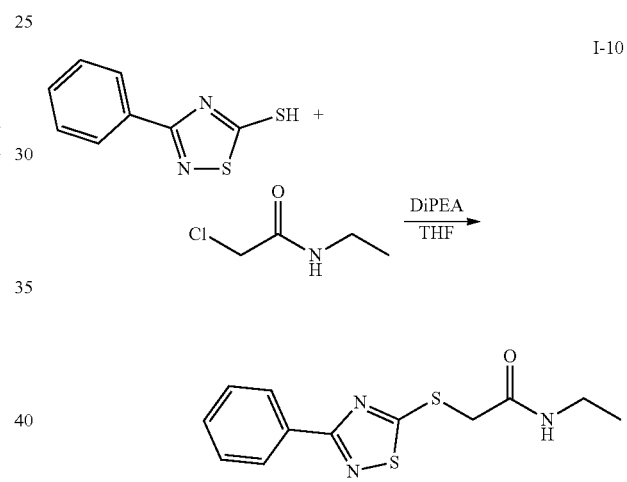

(N-(ethyl))-2-chloroacetamide (13 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.04 mL, 0.22 mmol, 1.7 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-10 as a light brown solid (32 mg, 0.11 mmol, 97%). If necessary, any remaining impurities may be washed off with pentane (10 mL). $^1$H-NMR (500.23 MHz, CDCl$_3$): δ 8.19-8.15 (m, 2H, ArH), 7.02 (br. s, 1H, NH), 7.00-6.95 (m, 2H, ArH), 3.98 (s, 2H, S—CH$_2$), 3.87 (s, 3H, O—CH$_3$), 3.34-3.27 (m, 2H, NH—CH$_2$), 1.08 (sex., J$_{HH}$=7.3 Hz, 3H, CH$_2$—CH$_3$). $^{13}$C{$^1$H}-NMR (125.78 MHz, CDCl$_3$): δ 185.7 (s, SCS), 171.7 (s, NCN), 167.1 (s, CO), 161.7 (s, CH$_3$—O—C), 129.9 (s, ArCH), 125.0 (s, C—CN$_2$), 114.3 (s, ArCH), 55.5 (s, O—CH$_3$), 37.1 (s, S—CH$_2$), 35.0 (s, NH—CH$_2$), 14.7 (s, CH$_2$—CH$_3$). HRMS (ESI-Q-TOF): calcd. for [C$_{13}$H$_{16}$N$_3$O$_2$S$_2$]: 310.0678; found: 310.0668.

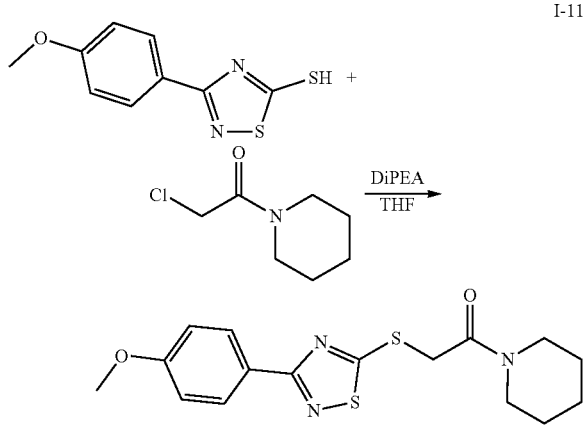

I-11

2-chloro-1-(piperidinyl)ethanone (18 mg, 0.11 mmol, 1.0 eq.) was dissolved in THF (3 mL), to which 3-(4-methoxyphenyl)-1,2,4-thiadiazole-5-thiol (25 mg, 0.11 mmol, 1.0 eq.) was added, after which N,N-diisopropylethylamine (0.03 mL, 0.17 mmol, 1.5 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-11 as a white solid (33 mg, 0.10 mmol, 94%). If necessary, any remaining impurities may be washed off with pentane (10 mL). $^1$H-NMR (500.23 MHz, CDCl$_3$): δ 8.22-8.16 (m, 2H, m-ArH), 7.00-6.93 (m, 2H, o-ArH), 4.35 (s, 2H, S—CH$_2$), 3.87 (s, 3H, O—CH$_3$), 3.63-3.58 (m, 2H, N(H)—CH$_2$), 3.56-3.52 (m, 2H, N(H)—CH$_2$), 1.72-1.49 (m, 6H, (CH$_2$—CH$_2$)$_2$—CH$_2$). $^{13}$C{$^1$H}-NMR (125.78 MHz, CDCl$_3$): δ 185.9 (s, SCS), 172.0 (s, NCN), 164.7 (s, CO), 161.5 (s, CH$_3$—O—C), 130.0 (s, m-ArC), 125.5 (s, C—CN$_2$), 114.1 (s, o-ArC), 55.5 (s, O—CH$_3$), 47.6 (s, N—(CH$_2$)), 43.6 (s, N—(CH$_2$)), 37.9 (s, S—CH$_2$). 26.6 (s, N—CH$_2$—CH$_2$) 25.6 (s, N—CH$_2$—CH$_2$) 24.4 (s, N—CH$_2$CH$_2$—CH$_2$). HRMS (ESI-Q-TOF): calcd. for [C$_{16}$H$_{20}$N$_3$O$_2$S$_2$]: 350.0991; found: 350.0983.

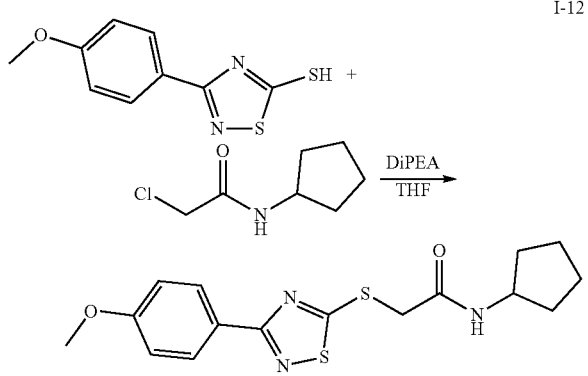

I-12

(N-cyclopentyl)-2-chloroacetamide (163 mg, 1.01 mmol, 1.00 eq.) was dissolved in THF (10 mL), to which 3-(4-methoxyphenyl)-1,2,4-thiadiazole-5-thiol (226 mg, 1.01 mmol, 1.00 eq.) was added, after which N,N-diisopropylethylamine (0.18 mL, 1.03 mmol, 1.02 eq.) was added dropwise. The resulting solution was stirred for 18 h at room temperature. After evaporation, the residue was redissolved in DCM (30 mL) and washed with H$_2$O (3×30 mL) and brine (1×30 mL). The organic fraction was dried over Na$_2$SO$_4$ and evaporated to provide I-12 as a white solid (293 mg, 0.87 mmol, 86%). If necessary, any remaining impurities may be washed off with pentane (30 mL). Mp: 140.6-143.6° C. $^1$H-NMR (500.23 MHz, CDCl$_3$): δ 8.19-8.15 (m, 2H, ArH), 7.04 (br. s, 1H, NH), 7.00-6.96 (m, 2H, ArH), 4.22-4.14 (m, 1H, N(H)—CH), 3.94 (s, 2H, S—CH$_2$), 3.88 (s, 3H, OCH$_3$), 1.94-1.84 (m, 2H, CH—(C(H)H)$_2$), 1.54-1.44 (m, 4H, CH—(CH$_2$—CH$_2$)$_2$), 1.37-1.27 (m, 2H, CH—(C(H)H)$_2$)). $^{13}$C{$^1$H}-NMR (125.78 MHz, CDCl$_3$): δ 185.9 (s, SCS), 171.6 (s, NCN), 166.9 (s, CO), 161.7 (s, CH$_3$—O—C), 129.9 (s, ArCH), 124.9 (s, C—CN$_2$), 114.2 (s, ArCH), 55.5 (s, OCH$_3$), 52.0 (s, N(H)—CH), 37.1 (s, S—CH$_2$), 33.0 (s, CH—CH$_2$), 23.7 (s, CH—(CH$_2$—CH$_2$)$_2$). FT-IR: ν=3294.2 (m), 3246.0 (w), 3085.9 (w), 3072.4 (w), 2952.8 (m), 2923.9 (w), 2898.8 (w), 2868.0 (w), 2833.2 w), 1635.5 (s), 1608.5 (s), 1581.5 (m), 1541.0 (s), 1521.7 (s), 1456.2 (s), 1442.7 (s), 1406.0 (s), 1390.6 (m), 1359.7 (w), 1311.5 (s), 1274.9 (w), 1253.6 (s), 1232.4 (s), 1188.1 (s), 1166.9 (s), 1114.8 (m), 1103.2 (m), 1033.8 (m), 977.8 (m), 964.3 (w), 950.8 (w), 921.9 (w), 900.7 (m), 831.3 (s), 813.9 (m), 786.9 (m), 744.5 (s), 719.4 (m), 696.3 (s), 686.6 (s), 636.5 (w), 597.9 (s), 565.1 (m), 551.6 (s), 509.2 (m), 459.0 (w), 401.2 (w). HRMS (ESI-Q-TOF): calcd. for [Na(C$_{16}$H$_{19}$N$_3$O$_2$S$_2$)]: 372.0811; found: 372.0797. calcd. for C$_{16}$H$_{20}$N$_3$O$_2$S$_2$: 350.0991; found: 350.0981.

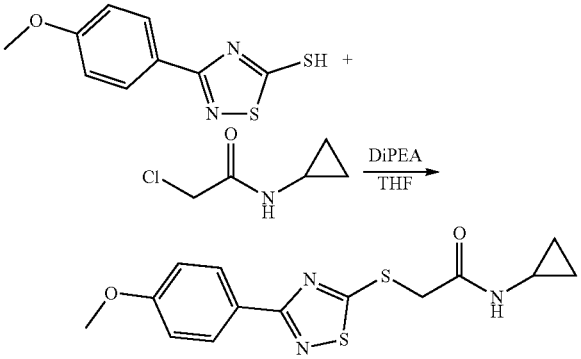

I-13

(N-(cyclopropyl))-2-chloroacetamide (14 mg, 0.10 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-13 as a light-yellow solid (33 mg, 0.10 mmol, quant.). If necessary, any remaining impurities may be washed off with pentane (10 mL). $^1$H-NMR (500.23 MHz, CDCl$_3$): δ 8.18-8.13 (m, 2H, m-ArH), 7.29 (br. s, 1H, NH), 7.02-6.97 (m, 2H, o-ArH), 3.94 (s, 2H, S—CH$_2$), 3.89 (s, 3H, O—CH$_3$), 2.76-2.70 (m, 1H, N—CH), 0.78-0.73 (m, 2H, CHCH$_2$), 0.47-0.42 (m, 2H, CHCH$_2$). $^{13}$C{$^1$H}-NMR (125.78 MHz, CDCl$_3$): δ 185.8 (s, SCS), 171.6 (s, NCN), 168.9 (s, CO), 161.8 (s, CH$_3$—O—C), 129.8 (s, m-ArC), 124.9 (s, C—CN$_2$), 114.3 (s, o-ArC), 55.6 (s, O—CH$_3$), 36.9 (s, S—CH$_2$), 23.1 (s, CHCH$_2$) 6.7 (s, CHCH$_2$), 6.7 (s, CHCH$_2$). HRMS (ESI-Q-TOF): calcd. for [C$_{14}$H$_{16}$N$_3$O$_2$S$_2$]: 322.0678; found: 322.0674.

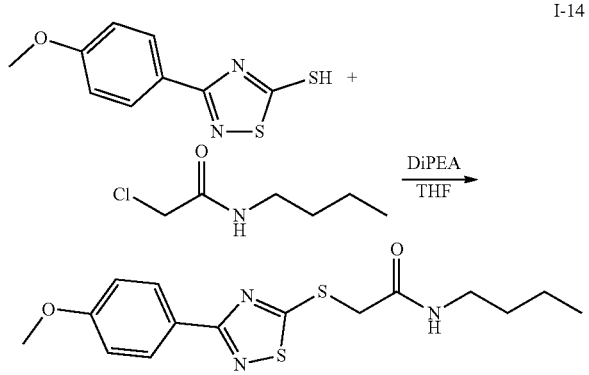

I-14

(N-(n-butyl))-2-chloroacetamide (16 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-14 as a light-yellow solid (34 mg, 0.10 mmol, 94%). If necessary, any remaining impurities may be washed off with pentane (10 mL). $^1$H-NMR (500.23 MHz, CDCl$_3$): δ 8.19-8.15 (m, 2H, m-ArH), 7.01 (br. s, 1H, NH), 7.00-6.96 (m, 2H, o-ArH), 3.99 (s, 2H, S—CH$_2$), 3.88 (s, 3H, O—CH$_3$), 3.29-3.23 (m, 2H, N—CH$_2$), 1.45-1.37 (m, 2H, N—CH$_2$—CH$_2$), 1.26-1.17 (m, 2H, CH$_2$—CH$_2$—CH$_2$), 0.79 (t, $J_{HH}$=7.9 Hz, 3H, CH$_2$—CH$_3$). $^{13}$C{$^1$H}-NMR (125.78 MHz, CDCl$_3$): δ 185.8 (s, SCS), 171.8 (s, NCN), 167.3 (s, CO), 161.8 (s, CH$_3$—O—C), 129.9 (s, m-ArC), 125.0 (s, C—CN$_2$), 114.3 (s, o-ArC), 55.6 (s, O—CH$_3$), 39.8 (s, N—CH$_2$), 37.0 (s, S—CH$_2$), 31.5 (s, N—CH$_2$—CH$_2$), 20.1 (s, CH$_2$—CH$_2$—CH$_2$), 13.8 (s, CH$_2$—CH$_3$). HRMS (ESI-Q-TOF): calcd. for [C$_{15}$H$_{20}$N$_3$O$_2$S$_2$]: 338.0991; found: 338.0985.

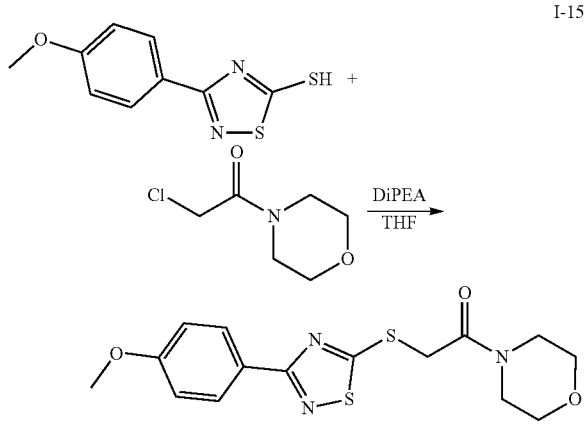

I-15

2-chloro-1-(morpholino)ethanone (18 mg, 0.11 mmol, 1.0 eq.) was dissolved in THF (3 mL), to which 3-(4-methoxyphenyl)-1,2,4-thiadiazole-5-thiol (25 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-15 as a yellow solid (33 mg, 0.09 mmol, 85%). If necessary, any remaining impurities may be washed off with pentane (10 mL). $^1$H-NMR (500.23 MHz, CDCl$_3$): δ 8.19-8.15 (m, 2H, m-ArH), 6.99-6.95 (m, 2H, o-ArH), 4.34 (s, 2H, S—CH$_2$), 3.87 (s, 3H, O—CH$_3$), 3.79-3.60 (m, 8H, N(CH$_2$CH$_2$)$_{2O}$). $^{13}$C{$^1$H}-NMR (125.78 MHz, CDCl$_3$): δ 185.4 (s, SCS), 171.9 (s, NCN), 165.3 (s, CO), 161.6 (s, CH$_3$—O—C), 130.0 (s, m-ArC), 125.4 (s, C—CN$_2$), 114.1 (s, o-ArC), 66.9 (s, (CH$_2$)$_2$—O), 66.7 (s, (CH$_2$)$_2$—O), 55.5 (s, O—CH$_3$), 46.8 (s, N—(CH$_2$)), 42.7 (s, N—(CH$_2$)), 37.0 (s, S—CH$_2$). HRMS (ESI-Q-TOF): calcd. for [C$_{15}$H$_{18}$N$_3$O$_3$S$_2$]: 352.0784; found: 352.0778.

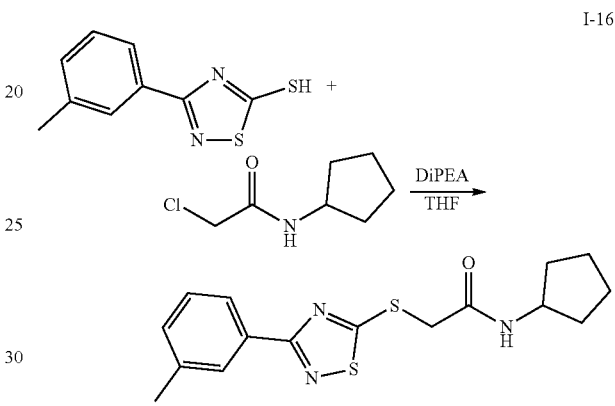

I-16

(N-(cyclopentyl))-2-chloroacetamide (16 mg, 0.10 mmol, 1.0 eq.) was dissolved in THF (3 mL), to which 3-(3-methylphenyl)-1,2,4-thiadiazole-5-thiol (21 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-16 as a light-yellow solid (31 mg, 0.09 mmol, 93%). If necessary, any remaining impurities may be washed off with pentane (10 mL). $^1$H-NMR (500.23 MHz, CDCl$_3$): δ 8.05 (s, 1H, CH$_3$—C—CH), 8.03 (d, $J_{HH}$=7.7 Hz, 1H, p-ArH), 7.37 (t, $J_{HH}$=7.6 Hz, 1H, m-ArH), 7.30 (d, $J_{HH}$=7.6 Hz, 1H o-ArH), 7.10 (br. d, $J_{HH}$=4.7 Hz, 1H, NH), 4.24-4.16 (m, 1H, N(H)—CH)), 3.96 (s, 2H, S—CH$_2$), 2.44 (s, 3H, Ar-CH$_3$), 1.96-1.86 (m, 2H, CH—(C(H)H)$_2$), 1.58-1.42 (m, 4H, CH—(CH$_2$—CH$_2$)$_2$), 1.39-1.28 (m, 2H, CH—(C(H)H)$_2$)). $^{13}$C{$^1$H}-NMR (125.78 MHz, CDCl$_3$): δ 186.3 (s, SCS), 172.0 (s, NCN), 166.9 (s, CO), 138.7 (s, CH$_3$—C—CH), 131.9 q (s, C—CN$_2$), 131.8 (s, o-ArCH), 128.9 (s, m-ArCH), 128.7 (s, CH$_3$—C—CH), 125.4 (s, p-ArCH), 51.8 (s, N(H)—CH), 37.2 (s, S—CH$_2$), 33.0 (s, CH—CH$_2$), 23.7 (s, CH—(CH$_2$—CH$_2$)$_2$), 21.6 (s, Ar-CH$_3$). HRMS (ESI-Q-TOF): calcd. for [C$_{16}$H$_{20}$N$_3$OS$_2$]: 334.1042; found: 334.1029.

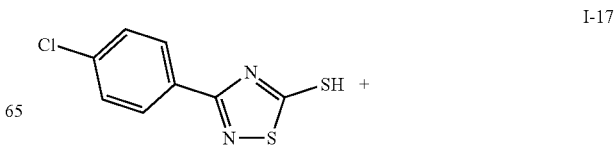

I-17

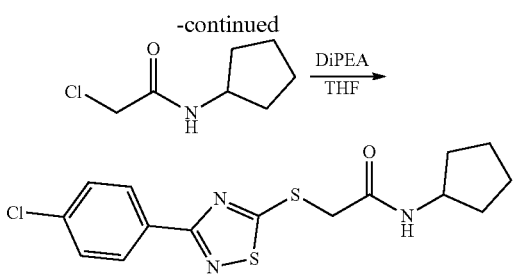

(N-(cyclopentyl))-2-chloroacetamide (16 mg, 0.10 mmol, 1.0 eq.) was dissolved in THF (3 mL), to which 3-(4-chlorophenyl)-1,2,4-thiadiazole-5-thiol (25 mg, 0.10 mmol, 1.0 eq.) was added, after which N,N-diisopropylethylamine (0.04 mL, 0.22 mmol, 2.2 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated. The resulting solid was purified by column chromatography (eluent: 3:7 EtOAc:cyclohexane; $R_f$=0.24) and evaporated to provide I-17 as a white solid (3 mg, 0.01 mmol, 8%). If necessary, any remaining impurities may be washed off with pentane (10 mL). $^1$H-NMR (500.23 MHz, $CDCl_3$): δ 8.20-8.15 (m, 2H, o-ArH), 7.48-7.43 (m, 2H, m-ArH), 6.82 (br. s, 1H, NH), 4.24-4.15 (m, 1H, N(H)—CH)), 3.96 (s, 2H, S—$CH_2$), 1.96-1.86 (m, 2H, CH—$(C(H)H)_2$), 1.56-1.45 (m, 4H, CH—$(CH_2—CH_2)_2$), 1.36-1.26 (m, 2H, CH—$(C(H)H)_2$)). $^{13}C\{^1H\}$-NMR (125.78 MHz, $CDCl_3$): δ 186.5 (s, SCS), 170.9 (s, NCN), 166.9 (s, CO), 137.1 (s, ArC—Cl), 130.5 (s, C—$CN_2$), 129.6 (s, o-ArCH), 129.2 (s, m-ArCH), 51.8 (s, N(H)—CH), 37.3 (s, S—$CH_2$), 33.0 (s, CH—$CH_2$), 23.7 (s, CH—$(CH_2—CH_2)_2$). HRMS (ESI-Q-TOF): calcd. for $[C_{15}H_{17}ClN_3O]$: 354.0496; found: 354.0483.

I-18 (comparative)

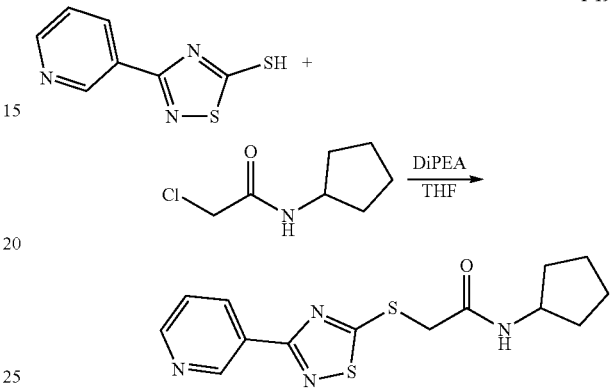

2-chloro-1-(piperidinyl)ethanone (17 mg, 0.11 mmol, 1.0 eq.) was dissolved in THF (3 mL), to which 3-(3-methylphenyl)-1,2,4-thiadiazole-5-thiol (22 mg, 0.11 mmol, 1.0 eq.) was added, after which N,N-diisopropylethylamine (0.04 mL, 0.22 mmol, 2.0 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-18 as a yellow solid (28 mg, 0.08 mmol, 76%). If necessary, any remaining impurities may be washed off with pentane (10 mL). $^1$H-NMR (500.23 MHz, $CDCl_3$): δ 8.06 (s, 1H, $CH_3$—C—CH), 8.04 (d, $J_{HH}$=7.7 Hz, 1H, p-ArH), 7.35 (t, $J_{HH}$=7.5 Hz, 1H, m-ArH), 7.27 (d, $J_{HH}$=7.7 Hz, 1H o-ArH), 4.35 (s, 2H, S—$CH_2$), 3.61 (t, $J_{HH}$=5.5 Hz, 2H, N—$CH_2$), 3.57-3.50 (m, 2H N—$CH_2$), 2.42 (s, 3H, Ar-$CH_3$), 1.71-1.62 (m, 4H, N—$CH_2$—$CH_2$), 1.62-1.56 (m, 2H, $CH_2CH_2$—$CH_2$).

I-19

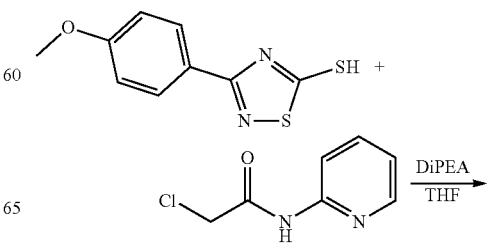

(N-(cyclopentyl))-2-chloroacetamide (16 mg, 0.10 mmol, 1.0 eq.) was dissolved in THF (3 mL), to which 3-(3-pyridyl)-1,2,4-thiadiazole-5-thiol (20 mg, 0.10 mmol, 1.0 eq.) was added, after which N,N-diisopropylethylamine (0.04 mL, 0.22 mmol, 2.2 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated. The resulting solid was purified by column chromatography (eluent: 2:1 EtOAc:cyclohexane; $R_f$=0.24) and evaporated to provide I-19 as a white solid (3 mg, 0.01 mmol, 9%). If necessary, any remaining impurities may be washed off with pentane (10 mL). $^1$H-NMR (500.23 MHz, $CDCl_3$): δ 9.74 (s, 1H, NC—CH—C), 9.19 (d, $J_{HH}$=8.3 Hz, 1H, p-ArH), 8.82 (d, $J_{HH}$=5.7 Hz, 1H o-ArH), 8.03 (dd, $J_{HH}$=8.5, 5.7 Hz, 1H, m-ArH), 6.53 (br. d, $J_{HH}$=6.0 Hz, 1H, NH), 4.26-4.18 (m, 1H, N(H)—CH)), 4.13 (s, 2H, S—$CH_2$), 2.04-1.89 (m, 2H, CH—$(C(H)H)_2$), 1.70-1.52 (m, 4H, CH—$(CH_2—CH_2)_2$), 1.47-1.36 (m, 2H, CH—$(C(H)H)_2$)). $^{13}C\{^1H\}$-NMR (125.78 MHz, $CDCl_3$): δ 189.4 (s, SCS), 165.4 (s, CO), 143.4 (s, p-ArCH), 141.6 (s, o-ArCH), 131.9 q (s, C—$CN_2$), 127.0 (s, m-ArCH), 52.2 (s, N(H)—CH), 38.3 (s, S—$CH_2$), 33.1 (s, CH—$CH_2$), 23.8 (s, CH—$(CH_2—CH_2)_2$). Signal for NCN is unresolved. HRMS (ESI-Q-TOF): calcd. for $[C_{14}H_{17}N_4O_2S_2]$: 321.0838; found: 321.0837.

I-20

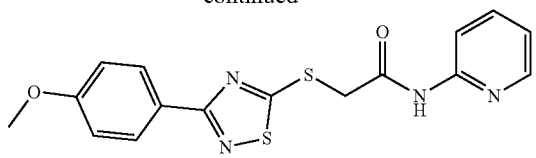

(N-(2-pyridyl))-2-chloroacetamide (18 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-20 as a light orange solid (30 mg, 0.08 mmol, 76%). If necessary, any remaining impurities may be washed off with pentane (10 mL). $^1$H-NMR (500.23 MHz, $CDCl_3$): δ 11.36 (br. s, 1H, NH), 8.47 (d, $J_{HH}$=8.5 Hz, 1H, NCH), 8.28-8.23 (m, 2H, m-ArH), 8.23 (d, $J_{HH}$=6.0 Hz, 1H, N(H)—C—CH), 7.98 (t, $J_{HH}$=8.0 Hz, 1H, N(H)—C—C(H)—CH), 7.23 (t, $J_{HH}$=6.4 Hz, 1H, NC(H)—CH), 6.97-6.93 (m, 2H, o-ArH), 4.29 (s, 2H, S—$CH_2$), 3.86 (s, 3H, $OCH_3$). $^{13}C\{^1H\}$-NMR (125.78 MHz, $CDCl_3$): δ 184.7 (s, SCS), 171.9 (s, NCN), 167.0 (s, CO), 161.6 (s, $CH_3$—O—C), 150.1 (s, N(H)—CN), 142.7 (s, NCH), 142.5 (s, N(H)—C—C(H)—CN), 130.3 (s, m-ArCH), 125.1 (s, C—$CN_2$), 120.1 (s, NC(H)—CH), 115.9 (s, N(H)—C—CH), 114.1 (s, o-ArCH), 55.5 (s, $OCH_3$), 38.5 (s, S—$CH_2$). HRMS (ESI-Q-TOF): calcd. for $[C_{16}H_{15}N_4O_2S_2]$: 359.0631; found: 359.0633.

I-21

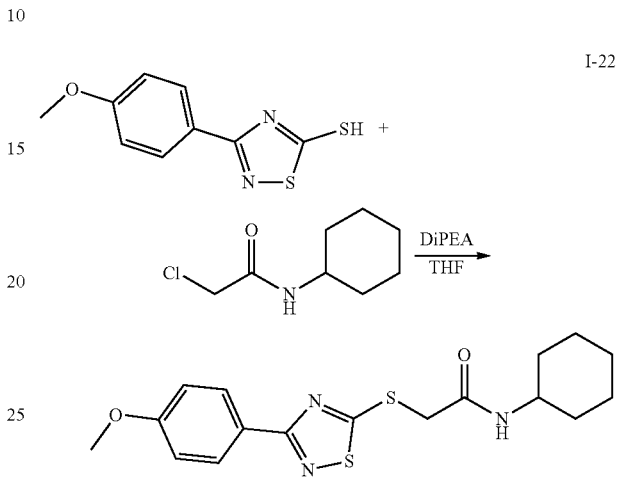

(N-(phenyl))-2-chloroacetamide (18 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-21 as a light-yellow solid (30 mg, 0.08 mmol, 76%). If necessary, any remaining impurities may be washed off with pentane (10 mL). $^1$H-NMR (500.23 MHz, $CDCl_3$): δ 9.45 (br. s, 1H, NH), 8.26-8.21 (m, 2H, m-ArH), 7.42 (d, $J_{HH}$=7.7 Hz, 1H, o-Ph-H), 7.28-7.23 (m, 2H, m-Ph-H), 7.07 (t, $J_{HH}$=7.4 Hz, 1H, p-Ph-H), 7.03-6.99 (m, 2H, o-ArH), 4.12 (s, 2H, S—$CH_2$), 3.89 (s, 3H, $OCH_3$). $^{13}C\{^1H\}$-NMR (125.78 MHz, $CDCl_3$): δ 186.5 (s, SCS), 171.4 (s, NCN), 166.0 (s, CO), 161.9 (s, $CH_3$—O—C), 137.9 (s, i-Ph-C), 129.9 (s, m-ArCH), 129.2 (s, m-Ph-CH), 124.7 (s, C—$CN_2$), 124.7 (s, p-Ph-CH), 119.8 (s, o-Ph-CH), 114.5 (s, o-ArCH), 55.6 (s, $OCH_3$), 38.1 (s, S—$CH_2$). HRMS (ESI-Q-TOF): calcd. for $[C_{17}H_{16}N_3O_2S_2]$: 358.0678; found: 358.0674.

I-22

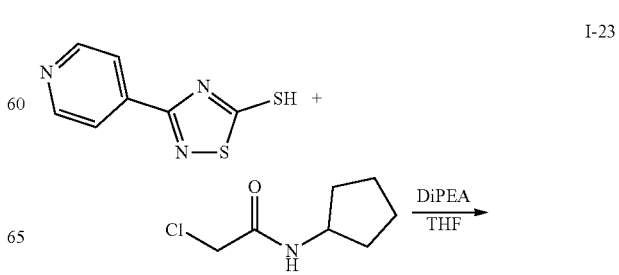

(N-(cyclohexyl))-2-chloroacetamide (21 mg, 0.12 mmol, 1.0 eq.) was dissolved in THF (3 mL), to which 3-(4-methoxyphenyl)-1,2,4-thiadiazole-5-thiol (27 mg, 0.12 mmol, 1.0 eq.) was added, after which N,N-diisopropylethylamine (0.04 mL, 0.22 mmol, 1.8 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-22 as a white solid (40 mg, 0.11 mmol, 92%). If necessary, any remaining impurities may be washed off with pentane (10 mL). $^1$H-NMR (500.23 MHz, $CDCl_3$): δ 8.21-8.16 (m, 2H, m-ArH), 7.02-6.95 (m, 2H, o-ArH), 7.29 (br. d, $J_{HH}$=5.8 Hz, 1H, NH), 3.96 (s, 2H, S—$CH_2$), 3.88 (s, 3H, O—$CH_3$), 3.82-3.72 (m, 1H, N—CH), 1.87-1.79 (m, 2H, Cy-H), 1.63-1.47 (m, 3H, Cy-H), 1.36-1.23 (m, 2H, Cy-H), 1.12-1.00 (m, 3H, Cy-H). $^{13}C\{^1H\}$-NMR (125.78 MHz, $CDCl_3$): δ 185.8 (s, SCS), 171.7 (s, NCN), 166.4 (s, CO), 161.8 (s, $CH_3$—O—C), 129.9 (s, m-ArC), 125.0 (s, C—$CN_2$), 114.2 (s, o-ArC), 55.6 (s, O—$CH_3$), 48.8 (s, N—CH), 37.3 (s, S—$CH_2$), 37.3 (s, Cy-$CH_2$), 32.8 (s, Cy-$CH_2$), 25.5 (s, Cy-$CH_2$), 24.7 (s, Cy-$CH_2$). HRMS (ESI-Q-TOF): calcd. for $[C_{17}H_{22}N_3O_2S_2]$: 364.1148; found: 364.1149.

I-23

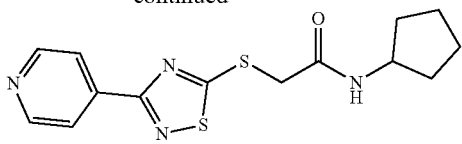

(N-(cyclopentyl))-2-chloroacetamide (18 mg, 0.11 mmol, 1.0 eq.) was dissolved in THF (3 mL), to which 3-(4-pyridyl)-1,2,4-thiadiazole-5-thiol (22 mg, 0.11 mmol, 1.0 eq.) was added, after which N,N-diisopropylethylamine (0.04 mL, 0.22 mmol, 2.2 eq.) was added dropwise. The resulting solution was stirred for 90 h at room temperature. After evaporation, the residue was redissolved in DCM (10 mL) and washed with a saturated aqueous NaHCO$_3$ solution (3×10 mL) and brine (1×10 mL). The organic fraction was dried over Na$_2$SO$_4$ and evaporated. The resulting solid was extracted in DCM (10 mL), filtered and the filtrate evaporated to provide I-23 as a yellow solid (34 mg, 0.11 mmol, 95%). If necessary, any remaining impurities may be washed off with pentane (10 mL). $^1$H-NMR (600.13 MHz, CDCl$_3$): δ 8.77 (d, J$_{HH}$=4.9 Hz, 2H, m-ArH), 8.07 (d, J$_{HH}$=4.9 Hz, 2H, m-ArH), 6.68 (br. d, J$_{HH}$=2.9 Hz, NH), 4.24-4.17 (m, 1H, N(H)—CH), 3.96 (s, 2H, S—CH$_2$), 1.98-1.88 (m, 2H, CH—(C(H)H)$_2$), 1.59-1.49 (m, 4H, CH—(CH$_2$—CH$_2$)$_2$), 1.36-1.27 (m, 2H, CH—(C(H)H)$_2$)). $^{13}$C{$^1$H}-NMR (150.90 MHz, CDCl$_3$): δ 187.3 (s, SCS), 169.8 (s, NCN), 166.1 (s, CO), 150.9 (s, m-ArC), 138.7 (s, C—CN$_2$), 122.0 (s, o-ArC), 51.9 (s, N(H)—CH), 37.4 (s, S—CH$_2$), 33.1 (s, CH—CH$_2$), 23.7 (s, CH—(CH$_2$—CH$_{o2}$). HRMS (ESI-Q-TOF): calcd. for [C$_{14}$H$_{17}$N$_4$OS$_2$]: 321.0838; found: 321.0824.

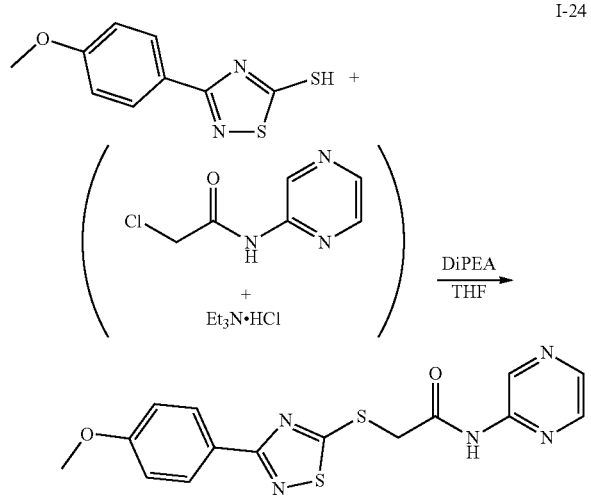

An unpurified 1:1 mixture of (N-(2-pyrazinyl))-2-chloroacetamide and triethylammonium chloride (33 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.04 mL, 0.22 mmol, 2.0 eq.) was added dropwise. The resulting solution was stirred for 90 h at room temperature. After evaporation, the residue was redissolved in DCM (10 mL) and washed with a 2:1 mixture of H$_2$O:brine (3×10 mL) and brine (1×10 mL). The organic fraction was dried over Na$_2$SO$_4$ and evaporated. The resulting solid was purified by column chromatography (eluent: 6:4 EtOAc:cyclohexane, 1% NEt$_3$; R$_f$=0.53) and evaporated to provide I-24 as a white solid (31 mg, 0.09 mmol, 81%). If necessary, any remaining impurities may be washed off with pentane (10 mL). $^1$H-NMR (500.23 MHz, CDCl$_3$): δ 10.24 (br. s, 1H, NH), 9.54 (s, 1H, C—CH—N), 8.35 (d, J$_{HH}$=2.6 Hz, 1H, CH—N—CH—CH), 8.33-8.28 (m, 2H, m-ArH), 8.25 (dd, J$_{HH}$=2.7, 1.6 Hz, 1H, CH—N—CH), 7.02-6.96 (m, 2H, o-ArH), 4.15 (s, 2H, S—CH$_2$), 3.89 (s, 3H, OCH$_3$). $^{13}$C{$^1$H}-NMR (125.78 MHz, CDCl$_3$): δ 185.6 (s, SCS), 171.9 (s, NCN), 166.6 (s, CO), 161.9 (s, CH$_3$—O—C), 148.4 (s, N(H)—CN), 142.7 (s, CH—N—CH), 140.0 (s, CH—N—CH—CH), 136.5 (s, C—CH—N), 130.3 (s, m-ArCH), 124.7 (s, C—CN$_2$), 114.2 (s, o-ArCH), 55.6 (s, OCH$_3$), 38.2 (s, S—CH$_2$). HRMS (ESI-Q-TOF): calcd. for [C$_{15}$H$_{14}$N$_5$O$_2$S$_2$]: 360.0583; found: 360.0570.

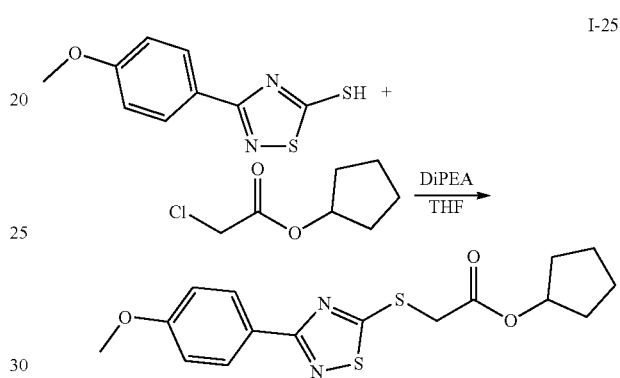

(O-(cyclopentyl))chloroacetate (16 mg, 0.10 mmol, 1.0 eq.) was dissolved in THF (3 mL), to which 3-(4-methoxyphenyl)-1,2,4-thiadiazole-5-thiol (22 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-25 as an orange oil (24 mg, 0.07 mmol, 68%). If necessary, any remaining impurities may be washed off with pentane (10 mL). $^1$H-NMR (500.23 MHz, CDCl$_3$): δ $^1$H-NMR (500.23 MHz, CDCl$_3$): δ 8.21-8.16 (m, 2H, ArH), 6.98-6.94 (m, 2H, ArH), 5.27-5.23 (m, 1H, O—CH), 4.08 (s, 2H, S—CH$_2$), 3.86 (s, 3H, OCH$_3$), 1.90-1.78 (m, 2H, CH—(C(H)H)$_2$), 1.76-1.62 (m, 4H, CH—(CH$_2$—CH$_2$)$_2$), 1.62-1.50 (m, 2H, CH—(C(H)H)$_2$). $^{13}$C{$^1$H}-NMR (125.78 MHz, CDCl$_3$): δ 185.0 (s, SCS), 171.8 (s, NCN), 167.7 (s, CO), 161.5 (s, CH$_3$—O—C), 130.0 (s, ArCH), 125.4 (s, C—CN$_2$), 114.1 (s, ArCH), 79.5 (s, O—CH), 55.5 (s, OCH$_3$), 36.3 (s, S—CH$_2$), 32.7 (s, CH—CH$_2$), 23.8 (s, CH—(CH$_2$—CH$_2$)$_2$). HRMS (ESI-Q-TOF): calcd. for [C$_{16}$H$_{19}$N$_2$O$_3$S$_2$]: 351.0832; found: 351.0826.

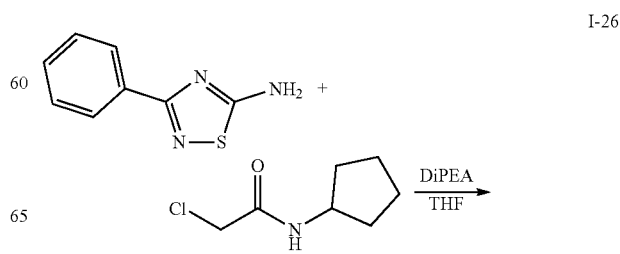

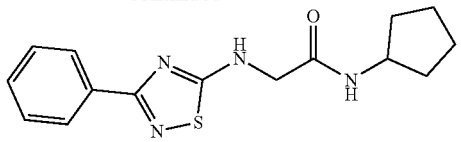

(N-(cyclopentyl))-2-chloroacetamide (20 mg, 0.12 mmol, 1.0 eq.) was dissolved in THF (3 mL), to which 3-(phenyl)-1,2,4-thiadiazole-5-amine (20 mg, 0.12 mmol, 1.0 eq.) was added, after which N,N-diisopropylethylamine (0.03 mL, 0.17 mmol, 1.4 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-26 as a white solid (36 mg, 0.12 mmol, quant.). If necessary, any remaining impurities may be washed off with pentane (10 mL). $^1$H-NMR (500.23 MHz, $CDCl_3$): δ 8.15-8.09 (m, 2H, m-ArH), 7.50-7.44 (m, 3H, o,p-ArH), 6.96 (br. s, 1H, C(O)—NH), 6.49 (br. s, 1H, NH—$CH_2$), 4.26-4.18 (m, 1H, N(H)—CH), 4.03 (s, 2H, N(H)—$CH_2$), 2.07-1.98 (m, 2H, CH—(C(H)$H$)$_2$), 1.76-1.58 (m, 4H, CH—($CH_2$—$CH_2$)$_2$), 1.48-1.39 (m, 2H, CH—(C(H)$H$)$_2$)). $^{13}$C{$^1$H}-NMR (125.78 MHz, $CDCl_3$): δ 182.2 (s, SCN), 165.5 (s, CO), 131.1 (s, p-ArCH), 129.0 (s, o-ArCH), 127.9 (s, m-ArCH), 51.7 (s, N(H)—CH), 42.8 (s, N(H)—$CH_2$), 33.1 (s, CH—$CH_2$), 23.8 (s, CH—($CH_2$—$CH_2$). The signals for NCN and C—$CN_2$ are unresolved. HRMS (ESI-Q-TOF): calcd. for [$C_{15}H_{19}N_4OS$]: 303.1274; found: 303.1277.

I-27

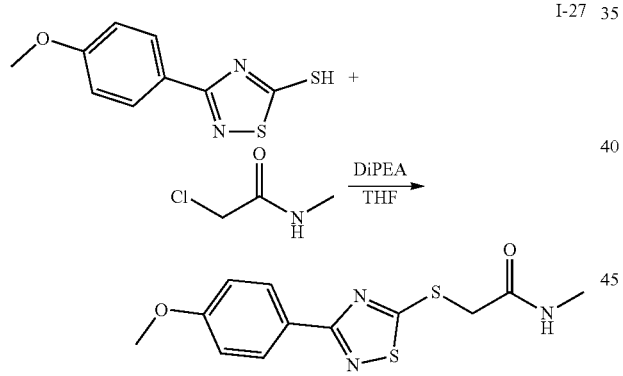

(N-(methyl))-2-chloroacetamide (11 mg, 0.10 mmol, 1.0 eq.) was dissolved in THF (3 mL), to which 3-(4-methoxyphenyl)-1,2,4-thiadiazole-5-thiol (23 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-27 as a white solid (28 mg, 0.09 mmol, 95%). If necessary, any remaining impurities may be washed off with pentane (10 mL). $^1$H-NMR (500.23 MHz, $CDCl_3$): δ 8.20-8.14 (m, 2H, ArH), 7.05-6.94 (m, 3H, NH+ArH), 4.01 (s, 2H, S—$CH_2$), 3.88 (s, 3H, O—$CH_3$), 2.84 (d, $J_{HH}$=4.9 Hz, 3H, NH—$CH_3$). $^{13}$C{$^1$H}-NMR (125.78 MHz, $CDCl_3$): δ 185.6 (s, SCS), 171.8 (s, NCN), 167.9 (s, CO), 161.7 (s, $CH_3$—O—C), 129.9 (s, ArCH), 125.1 (s, C—$CN_2$), 114.3 (s, ArCH), 55.6 (s, O—$CH_3$), 36.9 (s, S—$CH_2$), 26.9 (s, NH—$CH_3$). HRMS (ESI-Q-TOF): calcd. for [$C_{12}H_{14}N_3O_2S_2$]: 296.0522; found: 296.0509.

I-28

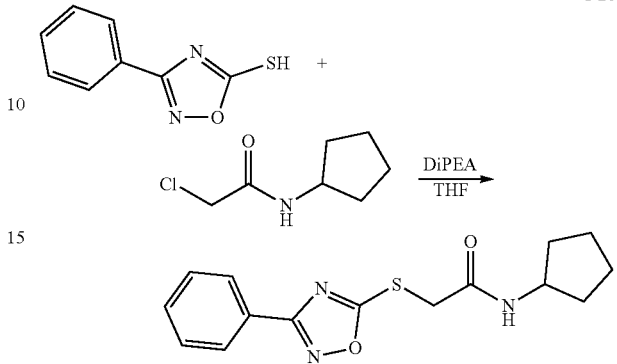

(N-(cyclopentyl))-2-chloroacetamide (18 mg, 0.11 mmol, 1.0 eq.) was dissolved in THF (3 mL), to which 3-(phenyl)-1,2,4-oxadiazole-5-thiol (20 mg, 0.11 mmol, 1.0 eq.) was added, after which N,N-diisopropylethylamine (0.03 mL, 0.17 mmol, 1.5 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-28 as a colorless oil (30 mg, 0.10 mmol, 90%). If necessary, any remaining impurities may be washed off with pentane (10 mL). $^1$H-NMR (500.23 MHz, $CDCl_3$): δ 8.06-8.00 (m, 2H, m-ArH), 7.57-7.45 (m, 3H, o,p-ArH), 6.75 (br. s, 1H, NH), 4.25-4.15 (m, 1H, N(H)—CH), 3.91 (s, 2H, S—$CH_2$), 2.00-1.87 (m, 2H, CH—(C(H)$H$)$_2$), 1.60-1.51 (m, 4H, CH—($CH_2$—$CH_2$)$_2$), 1.41-1.31 (m, 2H, CH—(C(H)$H$)$_2$)). $^{13}$C{$^1$H}-NMR (125.78 MHz, $CDCl_3$): δ 178.0 (s, OCS), 168.3 (s, NCN), 166.2 (s, CO), 131.8 (s, m-ArC), 129.1 (s, p-ArC), 127.5 (s, o-ArC), 126.0 (s, C—$CN_2$), 51.9 (s, N(H)—CH), 36.1 (s, S—$CH_2$), 33.1 (s, CH—$CH_2$), 23.7 (s, CH—($CH_2$—$CH_2$)$_2$). HRMS (ESI-Q-TOF): calcd. for [$C_{16}H_{18}N_3O_2S$]: 304.1114; found: 304.1101.

I-29

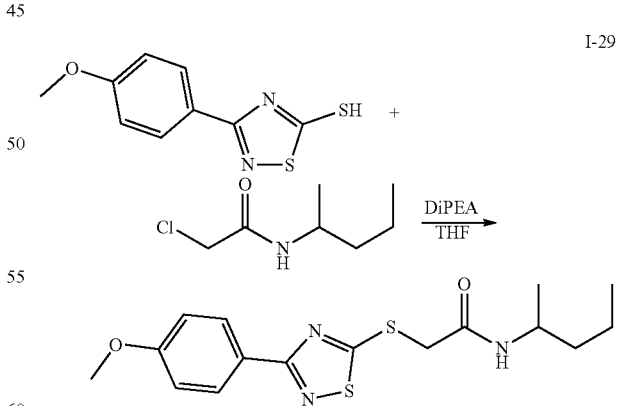

(N-(2-pentyl))-2-chloroacetamide (16 mg, 0.10 mmol, 1.0 eq.) was dissolved in THF (3 mL), to which 3-(4-methoxyphenyl)-1,2,4-thiadiazole-5-thiol (22 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature.

After evaporation, the residue was redissolved in DCM (10 mL) and washed with H₂O (3×10 mL) and brine (1×10 mL). The organic fraction was dried over Na₂SO₄ and evaporated to provide I-29 as a white solid (26 mg, 0.07 mmol, 74%). If necessary, any remaining impurities may be washed off with pentane (10 mL). $^1$H-NMR (500.23 MHz, CDCl₃): δ 8.20-8.15 (m, 2H, m-ArH), 7.01-6.96 (m, 2H, o-ArH), 6.82 (br. d, $J_{HH}$=7.8 Hz, 1H, NH), 4.02-3.92 (m, 3H, S—CH₂+N(H)—CH), 3.88 (s, 3H, O—CH₃), 1.37-1.24 (m, 2H, CH—CH₂), 1.24-1.14 (m, 2H, CH₂—CH₃), 1.06 (d, $J_{HH}$=6.6 Hz, 3H, CH—CH₃), 0.77 (t, $J_{HH}$=7.3 Hz, 3H, CH₂—CH₃). $^{13}$C{$^1$H}-NMR (125.78 MHz, CDCl₃): δ 185.8 (s, SCS), 171.7 (s, NCN), 166.6 (s, CO), 161.8 (s, CH₃—O—C), 129.9 (s, m-ArC), 125.0 (s, C—CN₂), 114.3 (s, o-ArC), 55.6 (s, O—CH₃), 45.8 (s, N—CH), 39.0 (s, CH—CH₂), 37.2 (s, S—CH₂), 21.0 (s, CH—CH₃), 19.2 (s, CH₂—CH₂), 13.9 (s, CH₂—CH₃). HRMS (ESI-Q-TOF): calcd. for [C₁₆H₂₂N₃O₂S₂]: 352.1148; found: 352.1138.

I-30

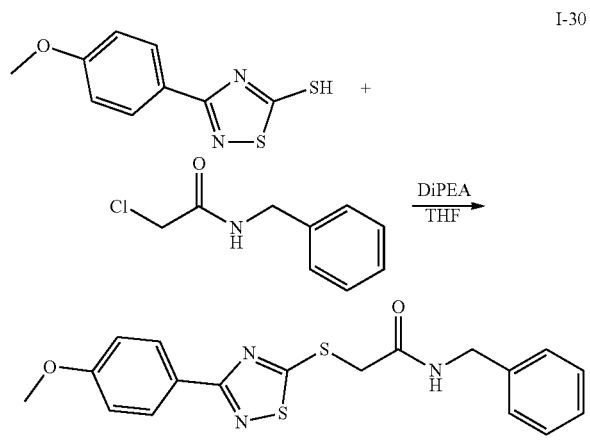

(N-(benzyl))-2-chloroacetamide (23 mg, 0.12 mmol, 1.0 eq.) was dissolved in THF (3 mL), to which 3-(4-methoxyphenyl)-1,2,4-thiadiazole-5-thiol (27 mg, 0.12 mmol, 1.0 eq.) was added, after which N,N-diisopropylethylamine (0.03 mL, 0.17 mmol, 1.4 eq.) was added dropwise. The resulting solution was stirred for 90 h at room temperature. After evaporation, the residue was redissolved in DCM (10 mL) and washed with H₂O (3×10 mL) and brine (1×10 mL). The organic fraction was dried over Na₂SO₄ and evaporated to provide I-30 as a yellow solid (36 mg, 0.10 mmol, 84%). If necessary, any remaining impurities may be washed off with pentane (10 mL). $^1$H-NMR (500.23 MHz, CDCl₃): δ 8.06-7.99 (m, 2H, N₂C-m-ArH), 7.44 (br. s, 1H, NH), 7.22-7.14 (m, 5H, CH₂—C₆H₅), 6.92-6.85 (m, 2H, N₂C-o-ArH), 4.46 (d, $J_{HH}$=5.7 Hz, 2H, N(H)—CH₂), 4.03 (s, 2H, S—CH₂), 3.87 (s, 3H, O—CH₃). $^{13}$C{$^1$H}-NMR (125.78 MHz, CDCl₃): δ 185.8 (s, SCS), 171.7 (s, NCN), 167.3 (s, CO), 161.6 (s, CH₃—O—C), 137.6 (s, N(H)—CH₂—C), 129.8 (s, N₂C-m-ArC), 128.8 (s, CH₂-ArC), 127.8 (s, CH₂-ArC), 127.7 (s, CH₂-ArC), 124.9 (s, C—CN₂), 114.2 (s, N₂C-o-ArC), 55.6 (s, O—CH₃), 44.1 (s, N—CH₂), 37.0 (s, S—CH₂). HRMS (ESI-Q-TOF): calcd. for [C₁₈H₁₈N₃O₂S₂]: 372.0835; found: 372.0817.

I-31

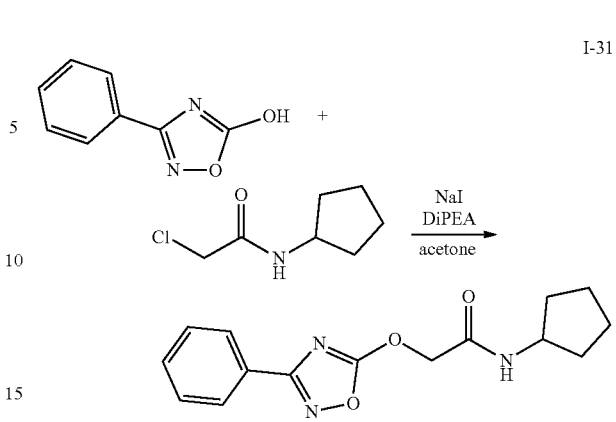

(N-(cyclopentyl))-2-chloroacetamide (20 mg, 0.12 mmol, 1.0 eq.) was dissolved in acetone (3 mL), to which 3-(phenyl)-1,2,4-oxadiazole-5-ol (20 mg, 0.12 mmol, 1.0 eq.) and sodium iodide (19 mg, 0.13 mmol, 1.1 eq.) were added, after which N,N-diisopropylethylamine (0.04 mL, 0.22 mmol, 1.8 eq.) was added dropwise. The resulting solution was stirred for 90 h at room temperature. After evaporation, the residue was redissolved in DCM (10 mL) and washed with H₂O (3×10 mL) and brine (1×10 mL). The organic fraction was dried over Na₂SO₄ and evaporated to provide I-31 as a yellow solid (17 mg, 0.06 mmol, 49%). If necessary, any remaining impurities may be washed off with pentane (10 mL). $^1$H-NMR (500.23 MHz, CDCl₃): δ 7.74-7.69 (m, 2H, o-ArH), 7.64-7.59 (m, 1H, p-ArH), 7.57-7.51 (m, 2H, m-ArH), 6.14 (br. d, $J_{HH}$=6.4 Hz, 1H, NH), 4.23-4.13 (m, 1H, N(H)—CH), 4.19 (s, 2H, O—CH₂), 2.02-1.91 (m, 2H, CH—(C(H)H)₂), 1.73-1.54 (m, 4H, CH—(CH₂—CH₂)₂), 1.43-1.32 (m, 2H, CH—(C(H)H)₂). $^{13}$C{$^1$H}-NMR (125.78 MHz, CDCl₃): δ 164.6 (s, CO), 159.9 (s, 000), 159.2 (s, NCN), 132.5 (s, p-ArC), 129.6 (s, m-ArC), 128.8 (s, o-ArC), 122.8 (s, C—CN₂), 52.0 (s, N(H)—CH), 46.1 (s, O—CH₂), 33.0 (s, CH—CH₂), 23.8 (s, CH—(CH₂—CH₂)₂). HRMS (ESI-Q-TOF): calcd. for [C₁₅H₁₈N₃O₃]: 288.1343; found: 288.1332.

I-32

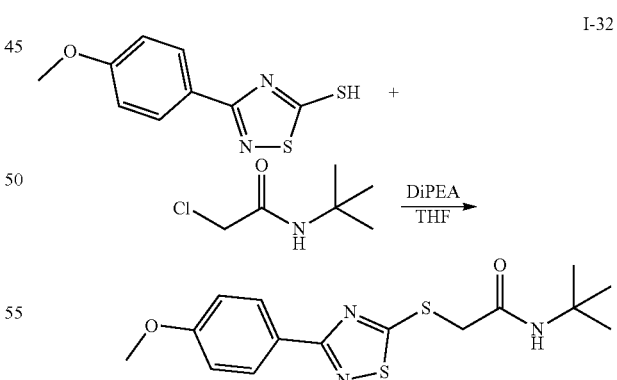

(N-(tert-butyl))-2-chloroacetamide (16 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.02 mL, 0.11 mmol, 1.0 eq.) was added dropwise. The resulting solution was stirred for 90 h at room temperature. After evaporation, the residue was redissolved in DCM (10 mL) and washed with H₂O (3×10 mL) and brine (1×10 mL). The organic fraction was dried over Na₂SO₄ and evaporated to provide I-32 as a light-yellow solid (35 mg, 0.10 mmol, 94%). If necessary, any remaining impurities may be washed off with pentane (10 mL). ¹H-NMR (500.23 MHz, CDCl₃): δ 8.22-8.17 (m, 2H, m-ArH), 7.01-6.96 (m, 2H, o-ArH), 6.83 (br. s, 1H, NH), 3.89 (s, 2H, S—CH₂), 3.88 (s, 3H, O—CH₃), 1.28 (s, 9H, C(CH₃)₃). ¹³C{¹H}-NMR (125.78 MHz, CDCl₃): δ 186.0 (s, SCS), 171.7 (s, NCN), 166.5 (s, CO), 161.7 (s, CH₃—O—C), 130.0 (s, m-ArCH), 125.0 (s, C—CN₂), 114.2 (s, o-ArCH), 55.5 (s, O—CH₃), 51.8 (s, N—C), 38.0 (s, S—CH₂), 28.7 (s, C(CH₃)₃). HRMS (ESI-Q-TOF): calcd. for [C₁₅H₂₀N₃O₂S₂]: 338.0991; found: 338.0985.

I-33

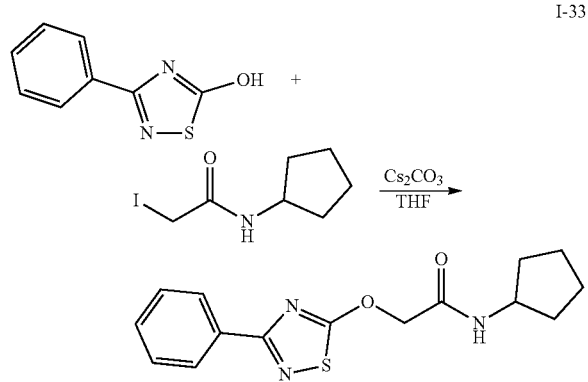

(N-(cyclopentyl))-2-iodoacetamide (27 mg, 0.11 mmol, 1.0 eq.) was dissolved in THF (3 mL), to which 3-phenyl-1,2,4-thiadiazole-5-ol (19 mg, 0.11 mmol, 1.0 eq.) was added, after which cesium carbonate (18 mg, 0.06 mmol, 0.5 eq.) was added. The resulting suspension was stirred for 12 h at room temperature and then heated under reflux for 4 hours. The resulting yellow suspension was cooled to room temperature, filtered and the filtrate was evaporated to provide crude I-33 as a light-yellow solid (26 mg), which was used without further purification. HRMS (ESI-Q-TOF): calcd. for [C₁₅H₁₇N₃NaO₂S]: 326.0934; found: 326.0919.

I-34

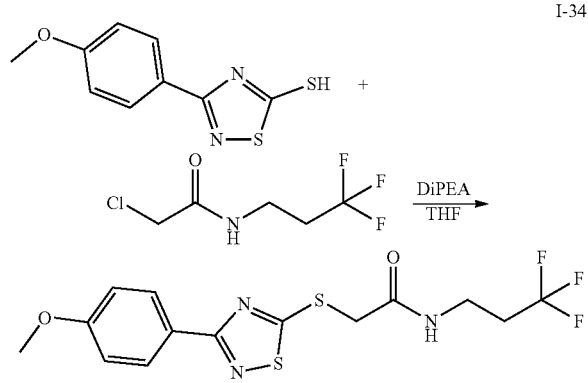

(N-(3,3,3-trifluoro-n-propyl))-2-chloroacetamide (20 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with H₂O (3×10 mL) and brine (1×10 mL). The organic fraction was dried over Na₂SO₄ and evaporated to provide I-34 as a light-yellow solid (31 mg, 0.08 mmol, 78%). If necessary, any remaining impurities may be washed off with pentane (10 mL). NMR (600.13 MHz, CDCl₃): δ 8.19-8.12 (m, 2H, m-ArH), 7.38 (br. s, 1H, NH), 7.01-6.96 (m, 2H, o-ArH), 4.00 (s, 2H, S—CH₂), 3.88 (s, 3H, O—CH₃), 3.52 (q, ³J$_{HH}$=6.4 Hz, 2H, N—CH₂), 2.31 (qt, ³J$_{HF}$=10.6 Hz, ³J$_{HH}$=6.4 Hz, 2H, CH₂—CF₃). ¹³C{¹H}-NMR (150.90 MHz, CDCl₃): δ 185.5 (s, SCS), 171.7 (s, NCN), 167.8 (s, CO), 161.8 (s, CH₃—O—C), 129.9 (s, ArCH), 127.6 (q, ¹J$_{CF}$=279.4 Hz, CFO, 125.0 (s, C—CN₂), 114.3 (s, ArCH), 55.6 (s, O—CH₃), 36.8 (s, S—CH₂) 33.6 (q, ³J$_{CF}$=3.7 Hz, NH—CH₂), 33.6 (q, ²J$_{CF}$=27.7 Hz, CH₂CF₃). ¹⁹F{¹H}-NMR (470.66 MHz, CDCl₃): δ -65.2 (s). HRMS (ESI-Q-TOF): calcd. for [C₁₄H₁₅F₃N₃O₂S₂]: 378.0552; found: 378.0537.

I-35

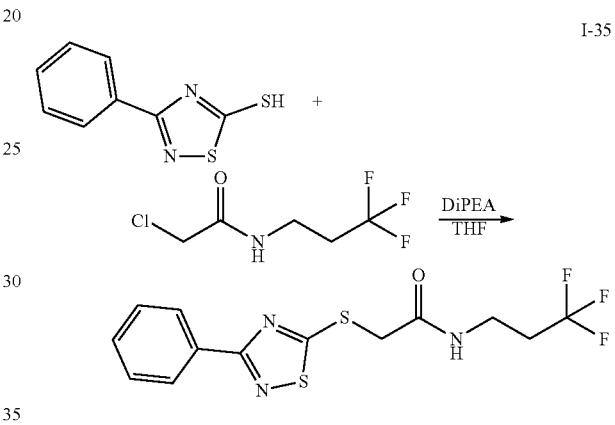

(N-(3,3,3-trifluoro-n-propyl))-2-chloroacetamide (20 mg, 0.11 mmol, 1.0 eq.) was dissolved in THF (3 mL), to which 3-phenyl-1,2,4-thiadiazole-5-thiol (21 mg, 0.11 mmol, 1.0 eq.) was added, after which N,N-diisopropylethylamine (0.02 mL, 0.11 mmol, 1.1 eq.) was added dropwise. The resulting solution was stirred for 90 h at room temperature. After evaporation, the residue was redissolved in DCM (10 mL) and washed with H₂O (3×10 mL) and brine (1×10 mL). The organic fraction was dried over Na₂SO₄ and evaporated to provide I-35 as a light-yellow solid (17 mg, 0.05 mmol, 47%). If necessary, any remaining impurities may be washed off with pentane (10 mL). ¹H-NMR (600.13 MHz, CDCl₃): δ 8.24-8.19 (m, 2H, m-ArH), 7.52-7.46 (m, 3H, o,p-ArH), 7.35 (br. s, 1H, NH), 4.00 (s, 2H, S—CH₂), 3.53 (q, ³J$_{HH}$=6.3 Hz, 2H, N—CH₂), 2.31 (qt, ³J$_{HF}$=10.7 Hz, ³J$_{HH}$=6.3 Hz, 2H, CH₂—CF₃). ¹³C{¹H}-NMR (150.90 MHz, CDCl₃): δ 185.8 (s, SCS), 171.9 (s, NCN), 167.8 (s, CO), 132.0 (s, C—CN₂), 131.0 (s, p-ArC), 129.0 (s, o-ArC), 128.2 (s, m-ArC), 126.4 (q, ¹J$_{CF}$=277.3 Hz, CFO, 36.9 (s, S—CH₂), 33.6 (q, ³J$_{CF}$=3.6 Hz, NH—CH₂), 33.6 (q, ²J$_{CF}$=27.6 Hz, CH₂CF₃). ¹⁹F{¹H}-NMR (470.66 MHz, CDCl₃): δ -65.2 (s). HRMS (ESI-Q-TOF): calcd. for [C₁₃H₁₃F₃N₃OS₂]: 348.0447; found: 348.0437.

I-36

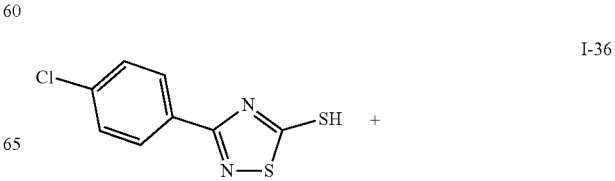

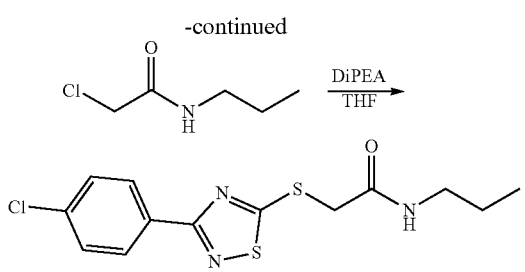

(N-(n-propyl))-2-chloroacetamide (14 mg, 0.10 mmol, 1.0 eq.) was dissolved in THF (3 mL), to which 3-(4-chlorophenyl)-1,2,4-thiadiazole-5-thiol (24 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-36 as a light-yellow solid (16 mg, 0.05 mmol, 48%). If necessary, any remaining impurities may be washed off with pentane (10 mL). $^1$H-NMR (600.13 MHz, CDCl$_3$): δ 8.20-8.14 (m, 2H, ArH), 7.49-7.42 (m 2H, ArH), 6.83 (br. s, 1H, NH), 4.00 (s, 2H, S—CH$_2$), 3.24 (q, J$_{HH}$=6.5 Hz, 2H, NH—CH$_2$), 1.46 (sex., J$_{HH}$=7.3 Hz, 2H, NH—CH$_2$—CH$_2$), 0.81 (t, 3J$_{HH}$=7.4 Hz, 3H, CH$_2$—CH$_3$). $^{13}$C{$^1$H}-NMR (150.90 MHz, CDCl$_3$): δ 186.4 (s, SCS), 171.0 (s, NCN), 166.9 (s, CO), 137.0 (s, Cl—C), 130.6 (s, C—CN$_2$), 129.6 (s, ArCH), 129.2 (s, ArCH), 41.9 (s, NH—CH$_2$), 37.2 (s, S—CH$_2$), 22.7 (s, NH—CH$_2$—CH$_2$), 11.4 (s, CH$_2$—CH$_3$). HRMS (ESI-Q-TOF): calcd. for [C$_{13}$H$_{15}$ClN$_3$OS$_2$]: 328.0340; found: 328.0323.

I-37

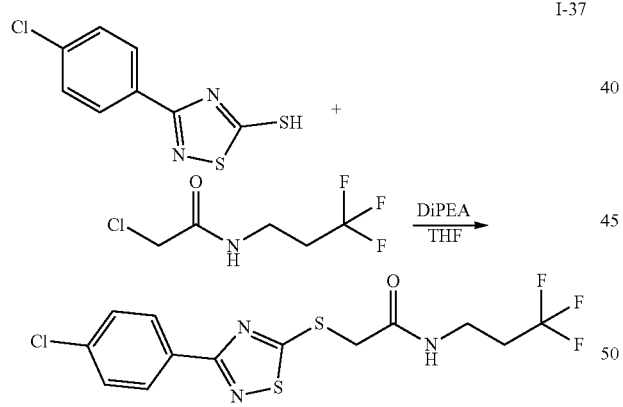

(N-(3,3,3-trifluoro-n-propyl))-2-chloroacetamide (19 mg, 0.10 mmol, 1.0 eq.) was dissolved in THF (3 mL), to which 3-(4-chlorophenyl)-1,2,4-thiadiazole-5-thiol (23 mg, 0.10 mmol, 1.0 eq.) was added, after which N,N-diisopropylethylamine (0.03 mL, 0.17 mmol, 1.7 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-37 as a light-yellow solid (15 mg, 0.04 mmol, 39%). If necessary, any remaining impurities may be washed off with pentane (10 mL). $^1$H-NMR (600.13 MHz, CDCl$_3$): δ 8.18-8.14 (m, 2H, ArH), 7.48-7.43 (m 2H, ArH), 7.17 (br. s, 1H, NH), 4.01 (s, 2H, S—CH$_2$), 3.53 (q, $^3$J$_{HH}$=6.2 Hz, 2H, N—CH$_2$), 2.31 (qt, $^3$J$_{HF}$=10.7 Hz, $^3$J$_{HH}$=6.3 Hz, 2H, CH$_2$—CF$_3$). $^{13}$C{$^1$H}-NMR (150.90 MHz, CDCl$_3$): δ 186.0 (s, SCS), 170.9 (s, NCN), 167.5 (s, CO), 137.1 (s, Cl—C), 130.5 (s, C—CN$_2$), 129.5 (s, ArCH), 129.3 (s, ArCH), 126.4 (q, $^1$J$_{CF}$=276.9 Hz, CF$_3$), 36.9 (s, S—CH$_2$), 33.6 (q, $^3$J$_{CF}$=3.4 Hz, NH—CH$_2$), 33.6 (q, $^2$J$_{CF}$=28.4 Hz, CH$_2$CF$_3$). $^{19}$F{$^1$H}-NMR (470.66 MHz, CDCl$_3$): δ −65.2 (s). HRMS (ESI-Q-TOF): calcd. for [C$_{13}$H$_{12}$ClF$_3$N$_3$OS$_2$]: 382.0057; found: 382.0042.

I-38 (comparative)

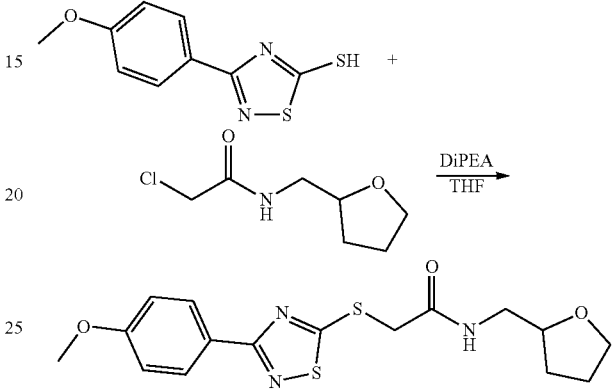

(N-(tetrahydrofurfuryl))-2-chloroacetamide (19 mg, 0.11 mmol, 1.0 eq.) was dissolved in THF (3 mL), to which 3-(4-methoxyphenyl)-1,2,4-thiadiazole-5-thiol (24 mg, 0.11 mmol, 1.0 eq.) was added, after which N,N-diisopropylethylamine (0.04 mL, 0.22 mmol, 2.0 eq.) was added dropwise. The resulting solution was stirred for 90 h at room temperature. After evaporation, the residue was redissolved in DCM (10 mL) and washed with H$_2$O (3×10 mL) and brine (1×10 mL). The organic fraction was dried over Na$_2$SO$_4$ and evaporated to provide I-38 as a light-yellow solid (29 mg, 0.08 mmol, 74%). If necessary, any remaining impurities may be washed off with pentane (10 mL). $^1$H-NMR (500.23 MHz, CDCl$_3$): δ 8.23-8.18 (m, 2H, ArH), 7.24 (br s., 1H, NH), 7.00-6.95 (m, 2H, ArH), 4.06-3.98 (m, 2H, S—CH$_2$), 3.91-3.85 (m, 1H, CH), 3.88 (s, 3H$_2$O—CH$_3$), 3.61-3.55 (m, 2H, CH$_2$), 3.55-3.50 (m, 1H, CHH), 3.29-3.22 (m, 1H, CHH), 1.89-1.81 (m, 1H, CHH), 1.81-1.71 (m, 1H, CHH), 1.71-1.62 (m, 1H, CHH), 1.47-1.39 (m, 1H, CHH).

I-39 (comparative)

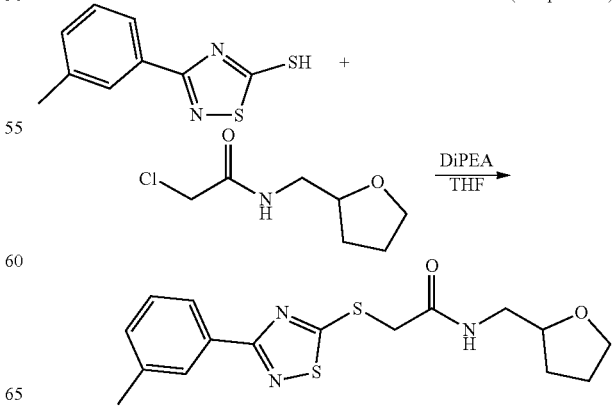

(N-(tetrahydrofurfuryl))-2-chloroacetamide (9 mg, 0.05 mmol, 1.0 eq.) was dissolved in THF (3 mL), to which 3-(3-methylphenyl)-1,2,4-thiadiazole-5-thiol (11 mg, 0.05 mmol, 1.0 eq.) was added, after which N,N-diisopropylethylamine (0.02 mL, 0.11 mmol, 2.1 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-39 as a light-yellow solid (4 mg, 0.01 mmol, 20%). If necessary, any remaining impurities may be washed off with pentane (10 mL). $^1$H-NMR (500.23 MHz, CDCl$_3$): δ 8.07 (s, 1H, CH$_3$—C—CH), 8.06 (d, $^3J_{HH}$=8.1 Hz, 1H, p-ArH), 7.37 (t, $^3J_{HH}$=7.6 Hz, 1H, m-ArH), 7.29 (d, $^3J_{HH}$=8.2 Hz, 1H, o-ArH), 7.19 (br. s, 1H, NH), 4.07 (s, 2H, S—CH$_2$), 4.07-3.97 (m, 2H, CH$_2$), 3.92-3.85 (m, 1H, CHH), 3.63-3.51 (m, 1H, CHH), 3.28-3.20 (m, 1H, CHH), 2.44 (s, 3H, C—CH$_3$), 1.89-1.82 (m, 1H, CHH), 1.81-1.64 m, 2H, CHH+CHH), 1.48-1.39 (m, 1H, CHH).

I-40 (comparative)

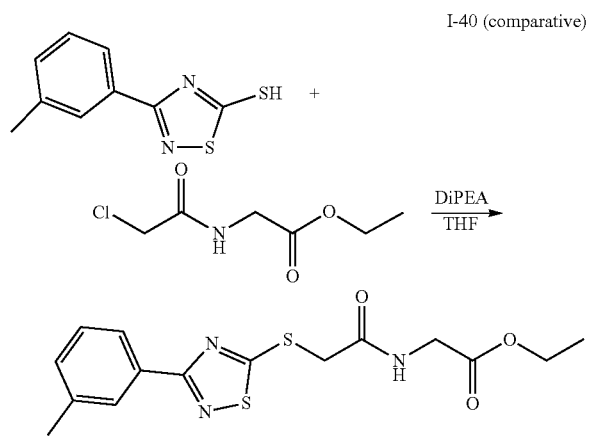

Ethyl (2-chloroacetyl)glycinate (10 mg, 0.06 mmol, 1.0 eq.) was dissolved in THF (3 mL), to which 3-(3-methylphenyl)-1,2,4-thiadiazole-5-thiol (12 mg, 0.06 mmol, 1.0 eq.) was added, after which N,N-diisopropylethylamine (0.02 mL, 0.11 mmol, 1.9 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-40 as a light-yellow solid (10 mg, 0.03 mmol, 51%). If necessary, any remaining impurities may be washed off with pentane (10 mL). $^1$H-NMR (500.23 MHz, CDCl$_3$): δ 8.09 (s, 1H, CH$_3$—C—CH), 8.05 (d, $^3J_{HH}$=7.9 Hz, 1H, p-ArH), 7.43 (br. s, 1H, NH), 7.37 (t, $^3J_{HH}$=7.6 Hz, 1H, m-ArH), 7.29 (d, $^3J_{HH}$=7.6 Hz, 1H, o-ArH), 4.15 (q, $^3J_{HH}$=7.1 Hz, 2H, O—CH$_2$), 4.08 (s, 2H, S—CH$_2$), 4.06 (d, $^3J_{HH}$=5.2 Hz, 2H, N—CH$_2$), 2.44 (s, 3H, C—CH$_3$), 1.22 (t, $^3J_{HH}$=7.1 Hz, 3H, CH$_2$CH$_3$).

I-41 (comparative)

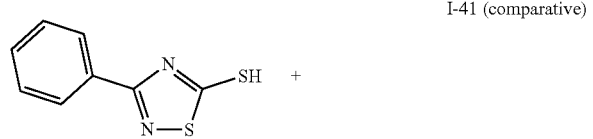

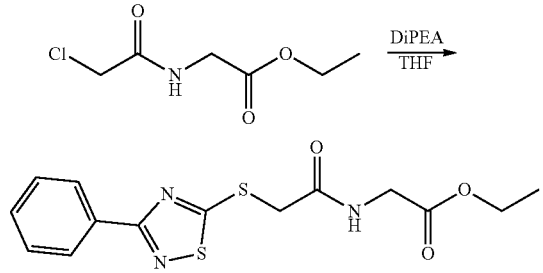

Ethyl (2-chloroacetyl)glycinate (19 mg, 0.11 mmol, 1.0 eq.) was dissolved in THF (3 mL), to which 3-phenyl-1,2,4-thiadiazole-5-thiol (21 mg, 0.11 mmol, 1.0 eq.) was added, after which N,N-diisopropylethylamine (0.04 mL, 0.23 mmol, 2.2 eq.) was added dropwise. The resulting solution was stirred for 90 h at room temperature. After evaporation, the residue was redissolved in DCM (10 mL) and washed with $H_2O$ (3×10 mL) and brine (1×10 mL). The organic fraction was dried over $Na_2SO_4$ and evaporated to provide I-41 as a light-yellow solid (22 mg, 0.06 mmol, 60%). If necessary, any remaining impurities may be washed off with pentane (10 mL). $^1$H-NMR (500.23 MHz, CDCl$_3$): δ 8.29-8.23 (m, 2H, m-ArH), 7.50-7.46 (m, 3H, o,p-ArH), 7.39 (br. s, 1H, NH), 4.15 (q, $J_{HH}$=7.1 Hz, 2H, N—CH$_2$), 4.08 (s, 2H, S—CH$_2$), 4.06 (d, $^3J_{HH}$=5.2 Hz, 2H, O—CH$_2$), 1.21 (t, $^3J_{HH}$=7.1 Hz, 3H, CH$_2$CH$_3$).

I-42

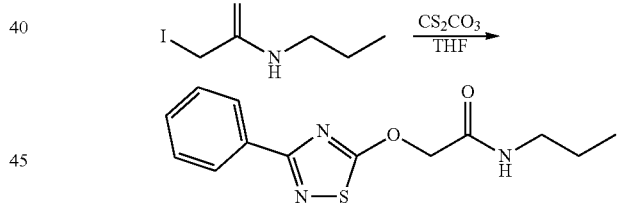

(N-(n-propyl))-2-iodoacetamide (24 mg, 0.11 mmol, 1.0 eq.) was dissolved in THF (3 mL), to which 3-phenyl-1,2,4-thiadiazole-5-ol (19 mg, 0.11 mmol, 1.0 eq.) was added, after which cesium carbonate (18 mg, 0.06 mmol, 0.5 eq.) was added. The resulting suspension was stirred for 12 h at room temperature and then 4 hours heated under reflux. The resulting yellow suspension was cooled to room temperature, filtered and the filtrate was evaporated to provide I-42 as a light-yellow solid (19 mg, 0.07 mmol, 65%). $^1$H-NMR (600.13 MHz, CDCl$_3$): δ 7.65 (d, $^3J_{HH}$=7.0 Hz, 2H, o-ArH), 7.56-7.52 (m, 1H, p-ArH), 7.51-7.47 (m, 2H, m-ArH), 4.32 (s, 2H, O—CH$_2$), 3.24 (q, $J_{HH}$=6.6 Hz, 2H, NH—CH$_2$), 1.55-1.48 (m, 2H, NH—CH$_2$—CH$_2$), 0.90 (t, $3J_{HH}$=7.3 Hz, 3H, CH$_2$—CH$_3$). $^{13}$C{$^1$H}-NMR (150.90 MHz, CDCl$_3$): δ 179.4 (s, SCO), 165.8 (s, CO), 157.1 (s, NCN), 131.4 (s, p-ArC), 129.2 (s, o-ArC), 128.9 (s, m-ArC), 48.2 (s, O—CH$_2$), 41.7 (s, NH—CH$_2$), 22.8 (s, NH—CH$_2$—CH$_2$), 11.4 (s, CH$_2$—CH$_3$).

Test Results

Test results of the compounds against tuberculosis according to the assay(s) described in the example above. As can be seen some compounds can inhibit the growth of tuberculosis, whereas others are more selective or completely selective. The results are shown in table 1. I-18 is a comparative compound. Compound I-11 is added to the table to show the effect hybridization of compound I-18 has on inhibiting growth of tuberculosis. I-38, I-39, I-40 and I-41 are comparative compounds in view of Maddry et al. (2009).

TABLE 1

| No. | Compound | IC50 (μM) M.tb/REMA | IC90 (μM) M.tb/REMA |
|---|---|---|---|
| I-1 | | 0.083 | 0.16 |
| I-2 | | 0.098 | 0.31 |
| I-3 | | 0.123 | 0.63 |
| I-4 | | 0.133 | 0.63 |
| I-5 | | 0.256 | 0.63 |
| I-6 | | 0.291 | 0.63 |
| I-7 | | 0.306 | 0.63 |
| I-8 | | 0.076 | 1.25 |
| I-9 | | 0.152 | 1.25 |

TABLE 1-continued

| No. | Compound | IC50 (µM) M.tb/REMA | IC90 (µM) M.tb/REMA |
|---|---|---|---|
| I-10 | *(structure)* | 0.383 | 1.25 |
| I-11 | *(structure)* | 0.5312 | 1.25 |
| I-12 | *(structure)* | 0.535 | 1.25 |
| I-13 | *(structure)* | 0.478 | 1.25 |
| I-14 | *(structure)* | 0.496 | 1.25 |
| I-15 | *(structure)* | 0.121 | 2.5 |
| I-16 | *(structure)* | 0.121 | 2.5 |
| I-17 | *(structure)* | 0.21 | 2.5 |
| I-18 | *(structure)* | 0.251 | 2.5 |

TABLE 1-continued

| No. | Compound | IC50 (μM) M.tb/REMA | IC90 (μM) M.tb/REMA |
|---|---|---|---|
| I-19 | ![structure] | 0.502 | 2.5 |
| I-20 | ![structure] | 0.502 | 2.5 |
| I-21 | ![structure] | 0.559 | 2.5 |
| I-22 | ![structure] | 0.663 | 2.5 |
| I-23 | ![structure] | 0.762 | 2.5 |
| I-24 | ![structure] | 4.1 | 2.5 |
| I-25 | ![structure] | 0.5262 | 5 |
| I-26 | ![structure] | 1.168 | 5 |
| I-27 | ![structure] | 1.853 | 5 |

TABLE 1-continued

| No. | Compound | IC50 (μM) M.tb/REMA | IC90 (μM) M.tb/REMA |
|---|---|---|---|
| I-28 | | 2.106 | 5 |
| I-29 | | 1.249 | 10 |
| I-30 | | 2.42 | 10 |
| I-31 | | 2.714 | 10 |
| I-32 | | 0.109 | >10 |
| I-33 | | 7.85 | 10 |
| I-34 | | 0.038 | 0.31 |
| I-35 | | 0.224 | 0.63 |
| I-36 | | 0.058 | 0.16 |
| I-37 | | 0.116 | 0.31 |

TABLE 1-continued

| No. | Compound | IC50 (μM) M.tb/REMA | IC90 (μM) M.tb/REMA |
|---|---|---|---|
| I-38 | [4-methoxyphenyl-1,2,4-thiadiazol-5-yl thio acetamide N-cyclopentylmethyl] | 0.447 | 1.25 |
| I-39 | [3-methylphenyl-1,2,4-thiadiazol-5-yl thio acetamide N-(tetrahydrofuran-2-yl)methyl] | 0.248 | 0.63 |
| I-40 | [3-methylphenyl-1,2,4-thiadiazol-5-yl thio acetamide N-glycine ethyl ester] | 0.169 | 0.31 |
| I-41 | [phenyl-1,2,4-thiadiazol-5-yl thio acetamide N-glycine ethyl ester] | 0.269 | 0.63 |
| I-42 | [phenyl-1,2,4-thiadiazol-5-yl oxy acetamide N-propyl] | >10 | >10 |

TABLE 2

Calculated partition coefficients (1-octanol/water) of compounds I-1 to I-42.

| Compound | LogP |
|---|---|
| I-1 | 3.06 |
| I-2 | 3.69 |
| I-3 | 3.04 |
| I-4 | 2.27 |
| I-5 | 3.70 |
| I-6 | 2.85 |
| I-7 | 2.51 |
| I-8 | 3.46 |
| I-9 | 2.90 |
| I-10 | 2.67 |
| I-11 | 3.54 |
| I-12 | 3.50 |
| I-13 | 2.94 |
| I-14 | 3.46 |
| I-15 | 2.49 |
| I-16 | 3.86 |
| I-17 | 4.09 |
| I-18 | 3.68 |
| I-19 | 2.79 |
| I-20 | 3.16 |
| I-21 | 3.90 |
| I-22 | 4.01 |
| I-23 | 2.81 |
| I-24 | 2.32 |
| I-25 | 4.12 |
| I-26 | 3.25 |
| I-27 | 2.36 |
| I-28 | 3.18 |
| I-29 | 3.94 |
| I-30 | 3.64 |
| I-31 | 2.83 |
| I-32 | 3.54 |
| I-33 | 3.27 |
| I-34 | 3.23 |
| I-35 | 3.31 |
| I-36 | 3.66 |
| I-37 | 3.86 |
| I-38 | 2.56 |
| I-39 | 2.57 |
| I-40 | 2.82 |
| I-41 | 2.60 |
| I-42 | 2.68 |

Clearance of Selected Compounds by Human Liver Microsomes

Each test compound (15 μM; from stock solutions of 5 mM in acetonitrile) was mixed with 0.5 mg/mL human liver microsome (Xenotech) in reaction buffer (100 μM NADPH, 10 μM glucose 6-phosphate, 0.5 U/mL glucose 6-phosphate dehydrogenase, 3.3 mM $MgCl_2$ and 5 mM EDTA, 100 mM potassium phosphate buffer, pH 7.4. The resulting mixture was incubated at 37° C. After 30 minutes, the samples were cooled on ice, centrifuged and the supernatant was analyzed by LC-MS (Column: Luna 5 μm C18, 100 Å, 150×4.6 mm; MeCN/$H_2O$, 0.1% formic acid; Table 3). Calculations and the experiment set-up are based on Kerns, E. H. et al., Drug-like Properties: Concepts, Structure Design and Methods; from ADME to Toxicity Optimization, Academic Press, 2008. The intrinsic clearance values are calculated based on the teachings in Obach, R. S., *Drug Metabolism and Disposition* 1999, 27(110, 1350-1359.

TABLE 3

| Compound | Compound remaining (%) | Half-life [h] | Intrinsic Clearance [L/h/kg] |
| --- | --- | --- | --- |
| I-1 | 64% | 0.76 | 0.817 |
| I-3 | 11% | 0.15 | 4.041 |
| I-5 | 75% | 1.18 | 0.527 |
| I-33* | 72% | 1.03 | 0.604 |
| I-35 | 65% | 0.81 | 0.767 |
| I-36 | 62% | 0.72 | 0.863 |
| I-37 | 55% | 0.58 | 1.081 |

*15 µM; from a stock solution of 1.25 mM in MeCN

The invention claimed is:

1. A method of treating or inhibiting a bacterial infection in a subject in need thereof, comprising administering a therapeutically effective amount of a compound of formula (Ia), wherein the formula is

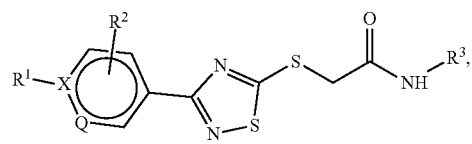

(Ia)

wherein

Q and X are, respectively, CH and C, $CR^2$ and C, CH and N, $CR^2$ and N, or N and C;

$R^1$ is hydrogen, halide or optionally substituted linear or branched alkoxy having 1 or 2 carbon atoms;

$R^2$ is independently selected from hydrogen, halide or optionally substituted linear or branched alkoxy having 1 or 2 carbon atoms, and $R^3$ is optionally substituted linear or branched alkoxy having 1-6 carbon atoms, haloalkyl having 1-6 carbon atoms, n-propyl, 2-propenyl, 2-propynyl, or n-pentyl, or a pharmaceutically acceptable salt of the compound.

2. The method according to claim 1,
wherein
$R^1$ is hydrogen, chloride or methoxy; and/or
$R^2$ is independently hydrogen, chloride or methoxy, and/or
$R^3$ is n-propyl, n-pentyl, 2-methoxyethyl, or 3,3,3-trifluoropropyl.

3. The method according to claim 1, wherein the compound is selected from

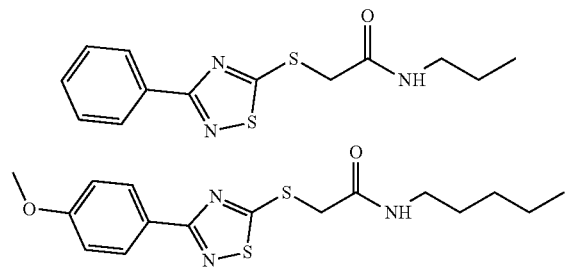

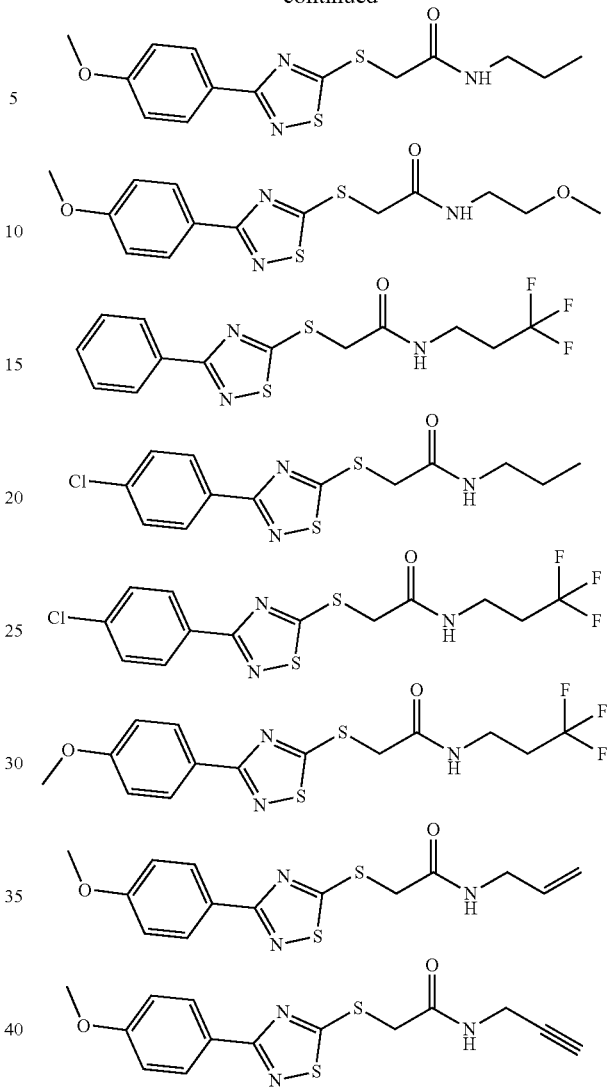

or a pharmaceutically acceptable salt of any of the compounds.

4. The method according to claim 1, wherein the bacterial infection is a mycobacterial infection.

5. The method according to claim 4, wherein the bacterial infection is a *Mycobacterium tuberculosis* infection.

6. The method according to claim 1, wherein the bacterial infection is a bacterial infection in a respiratory system.

7. The method according to claim 6, wherein the bacterial infection is extrapulmonic.

8. The method according to claim 1, wherein the compound or the pharmaceutically acceptable salt is administered to substantially inhibit type VII secretion of a bacterium.

9. The method according to claim 1, wherein the compound or the pharmaceutically acceptable salt is administered to substantially inhibit type VII secretion of a mycobacterium.

10. The method according to claim 1, wherein the compound or the pharmaceutically acceptable salt is administered to substantially inhibit ESX-1 dependent secretion.

11. The method according to claim 1, wherein the compound or the pharmaceutically acceptable salt is administered to substantially inhibit ESX-5 dependent secretion.

12. The method according to claim 1, wherein the bacterial infection is pulmonary tuberculosis.

13. The method according to claim 1, wherein the administration is parenteral, subcutaneous, intravenous, intramuscular, intraperitoneal, transdermal, oral, buccal, sublingual, ocular, intravaginal, or by inhalation.

* * * * *